(12) United States Patent
Olsson et al.

(10) Patent No.: US 12,489,871 B2
(45) Date of Patent: Dec. 2, 2025

(54) VIDEO INSPECTION AND CAMERA HEAD TRACKING SYSTEMS AND METHODS

(71) Applicant: SeeScan, Inc., San Diego, CA (US)

(72) Inventors: Mark S. Olsson, La Jolla, CA (US); Michael J. Martin, San Diego, CA (US); Alexander L. Warren, Escondido, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

(21) Appl. No.: 18/611,449

(22) Filed: Mar. 20, 2024

(65) Prior Publication Data

US 2024/0333883 A1 Oct. 3, 2024

Related U.S. Application Data

(60) Provisional application No. 63/599,890, filed on Nov. 16, 2023, provisional application No. 63/492,473, filed on Mar. 27, 2023.

(51) Int. Cl.
| | |
|---|---|
| *H04N 7/18* | (2006.01) |
| *F16L 55/48* | (2006.01) |
| *G06T 7/20* | (2017.01) |
| *H04N 23/50* | (2023.01) |
| *H04N 23/66* | (2023.01) |
| *F16L 101/30* | (2006.01) |

(52) U.S. Cl.
CPC .............. *H04N 7/183* (2013.01); *F16L 55/48* (2013.01); *G06T 7/20* (2013.01); *H04N 23/555* (2023.01); *H04N 23/66* (2023.01); *F16L 2101/30* (2013.01); *G06T 2207/10016* (2013.01); *G06T 2207/30244* (2013.01)

(58) Field of Classification Search
CPC .......... H04N 7/183; H04N 23/66; F16L 55/48
See application file for complete search history.

(56) References Cited

U.S. PATENT DOCUMENTS

| | | | | |
|---|---|---|---|---|
| 8,395,661 | B1 * | 3/2013 | Olsson | G01N 21/954 348/207.99 |
| 8,547,428 | B1 * | 10/2013 | Olsson | G01N 21/8803 348/374 |
| 12,374,875 | B2 * | 7/2025 | Olsson | B65H 75/364 |
| 12,374,876 | B2 * | 7/2025 | Martin | H02G 11/02 |

(Continued)

OTHER PUBLICATIONS

Aitken Jonathan M et al, "Simultaneous Localization and Mapping for Inspection Robots in Water and Sewer Pipe Networks; A Review" for IEEE Access, Sep. 27, 2021, pp. 140173-140198, vol. 9, IEEE, USA.

(Continued)

*Primary Examiner* — Irfan Habib
(74) *Attorney, Agent, or Firm* — Steven C. Tietsworth, Esq.; Michael J. Pennington, Esq.

(57) ABSTRACT

Various systems and methods are disclosed for tracking a camera head deployed into a pipe or other cavity. The systems and methods may include inertial navigation sensors for generating inertial navigation data to direct a user towards a location where the signal emitted by a pipe Sonde may be found at startup or, when in use, the pipe Sonde signal has been temporarily lost by the utility locator device. Various other sensors and elements may generate camera head position data.

23 Claims, 36 Drawing Sheets

(56) References Cited

U.S. PATENT DOCUMENTS

| | | | |
|---|---|---|---|
| 2012/0043411 A1* | 2/2012 | Beck | F41F 3/042 |
| | | | 102/374 |
| 2016/0261829 A1* | 9/2016 | Olsson | G03B 17/08 |
| 2018/0038093 A1* | 2/2018 | Olsson | H01B 3/08 |
| 2018/0169719 A1* | 6/2018 | Turner | B65H 75/403 |
| 2019/0331284 A1* | 10/2019 | Phillips | G05D 1/0011 |
| 2020/0173602 A1* | 6/2020 | Olsson | G06F 11/0709 |
| 2024/0048666 A1* | 2/2024 | Nichols | G03B 37/005 |
| 2024/0167608 A1* | 5/2024 | Martin | F16L 55/30 |

OTHER PUBLICATIONS

International Searching Authority, "Written Opinion of the International Searching Authority" for PCT Patent Application No. PCT/US2024/020773, Aug. 12, 2024, European Patent Office, Munich.

* cited by examiner

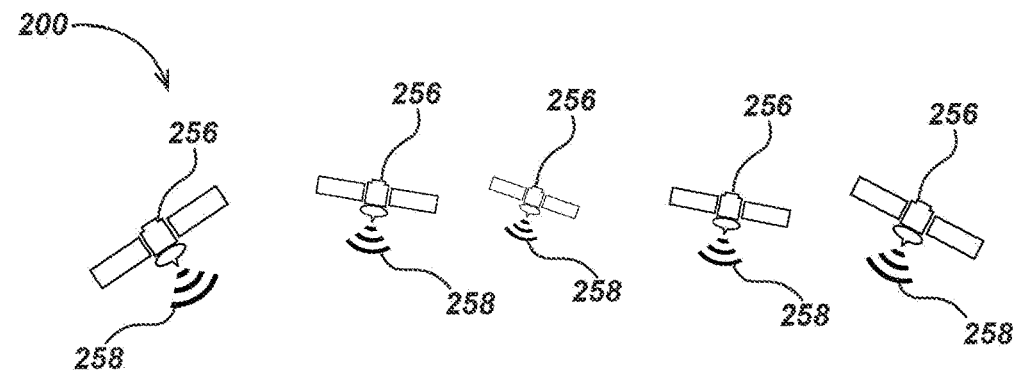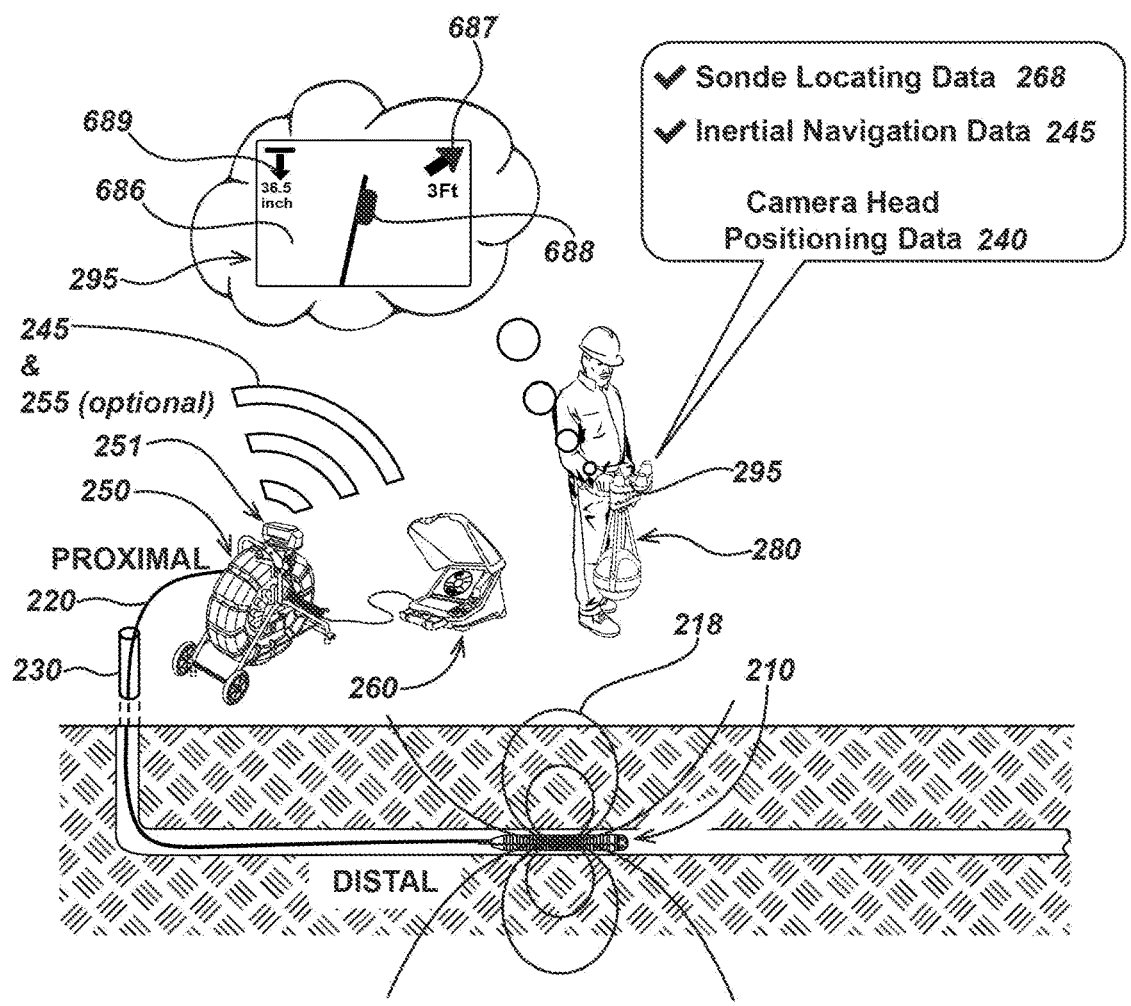
FIG. 6A

Method 900

Receive, at a processing element, camera head position data from a multitude of sources such as inertial navigation data from the INS in the camera head, Sonde locating data sourced from a utility locator device locating a signal emitted by a pipe Sonde, line locating data sourced from a utility locator device locating a signal emitted by a pipe or push-cable, push-cable payout data sourced via the cable counting device of the cable storage drum, visual motion data generated via image data from the camera head, line locating data from signal coupled onto the push-cable or utility line, and other position data that may be sourced from other sensors sourced at the camera head.
902

Determine error metrics for the camera head position data from each of the sources.
904

Sort the camera head position data from the various sources based on error metrics wherein the camera head position data is sorted from that having the least error to that having the most error.
906

Select the camera head position data having the least error in generating a singular camera head position result.
908

FIG. 9A

Method 920

```
Receive, at a processing element, camera head position data from a multitude of sources such as
    inertial navigation data from the INS in the camera head, Sonde locating data sourced from a
  utility locator device locating a signal emitted by a pipe Sonde, line locating data sourced from a
    utility locator device locating a signal emitted by a pipe or push-cable, push-cable payout data
  sourced via the cable counting device of the cable storage drum, visual motion data generated via
   image data from the camera head, line locating data from signal coupled onto the push-cable or
  utility line, and other position data that may be sourced from other sensors sourced at the camera
                                              head.
                                                                                                 922
```

↓

```
   Optionally, weight the camera head position data from each source based on preference for the
                               data source, error metrics, or the like.
                                                                                                 924
```

↓

```
  Average or, optionally, perform a weighted average of camera head position data from the
               various sources in generating a singular camera head position result.
                                                                                                 926
```

FIG. 9B

Method 940

Receive, at a processing element, camera head position data from a multitude of sources such as inertial navigation data from the INS in the camera head, Sonde locating data sourced from a utility locator device locating a signal emitted by a pipe Sonde, line locating data sourced from a utility locator device locating a signal emitted by a pipe or push-cable, push-cable payout data sourced via the cable counting device of the cable storage drum, visual motion data generated via image data from the camera head, line locating data from signal coupled onto the push-cable or utility line, and other position data that may be sourced from other sensors sourced at the camera head.
942

Sort the camera head position data from the various sources based on a hierarchy having the most desirable camera head data source at the top and least desirable data sources at the bottom.
944

Select the camera head position data from the top of the hierarchy in generating a singular camera head position result.
946

*FIG. 9C*

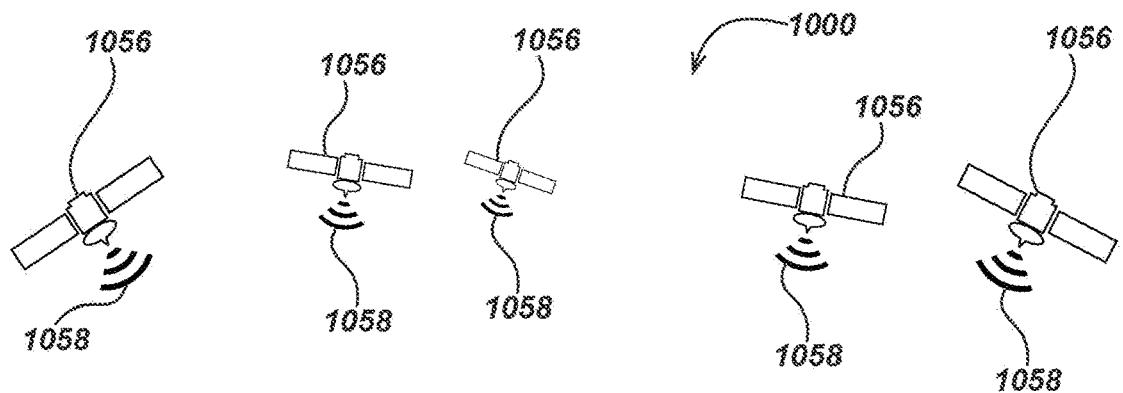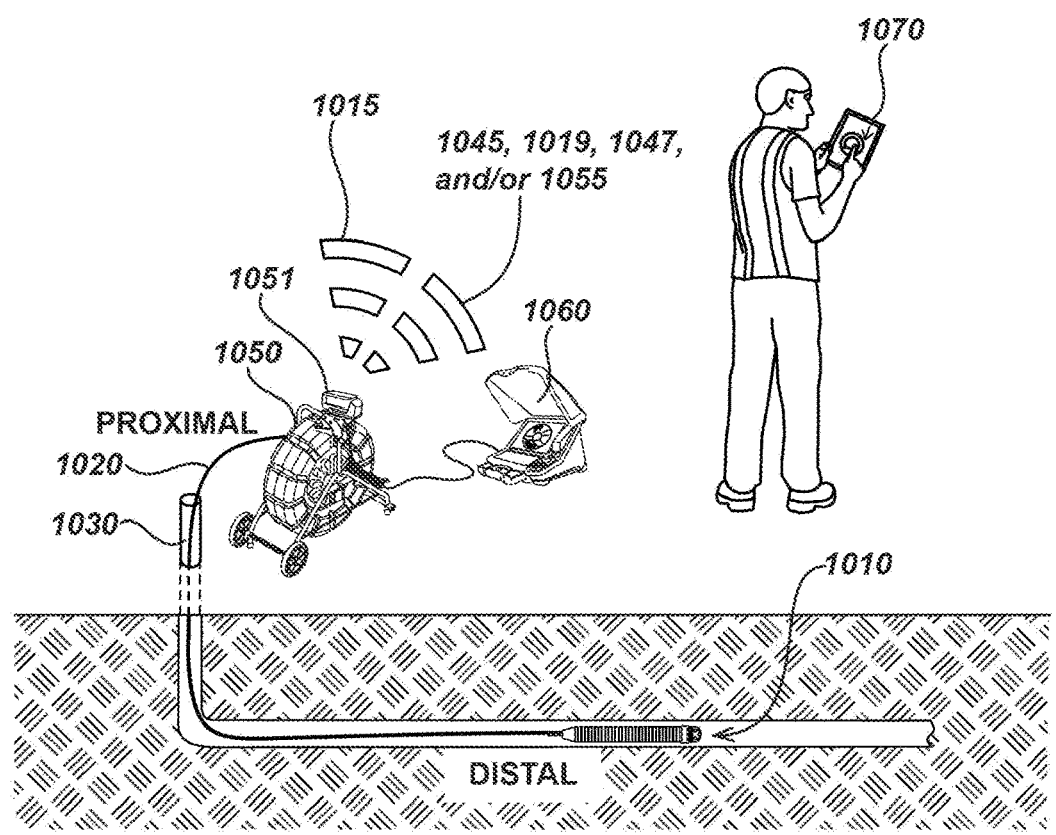
FIG. 10A

Method 1600

```
Determine and record movements of a camera head moving through a pipe or other cavity.
                                                                                    1605

Generate a camera head position map from the camera head movements of step 1605.
                                                                                    1610

Merge the camera head position map with a map of the ground surface.
                                                                                    1615

Store combined map from step 1615
                                                                                    1620
```

FIG. 16

Method 2300

| Place the cable storage drum outside the entry point to a pipe or other cavity. 2305 |

↓

| Use one or more devices to generate images and/or video of the inspection environment including the cable storage drum and entry point to the pipe or other cavity. 2310 |

↓

| Optionally, orthorectify images of the inspection environment with pre-existing maps containing the inspection environment and the inspection environment including the cable storage drum and entry point to the pipe or other cavity. 2315 |

*FIG. 23*

Method 2500

| Place the cable storage drum outside at the entry point to a pipe or other cavity. 2505 |

↓

| Adjust the orientation and position of the cable storage drum to conform to the predetermined set up procedure parameter. 2510 |

FIG. 25A

Method 2550

| Place the cable storage drum outside at the entry point to a pipe or other cavity. 2555 |

↓

| Generate orientation and distance data by measuring or estimating the orientation of the cable storage drum relative to the entry point to a pipe or other cavity and the distance to the entry point to a pipe or other cavity. 2560 |

↓

| Input or otherwise communicate orientation and distance data into the cable storage drum, CCU, or other system device. 2565 |

FIG. 25B

VIDEO INSPECTION AND CAMERA HEAD TRACKING SYSTEMS AND METHODS

CROSS-REFERENCE TO RELATED APPLICATIONS

This application claims priority under 35 U.S.C. § 119(e) to U.S. Provisional Patent Application Ser. No. 63/492,473, entitled VIDEO INSPECTION AND CAMERA HEAD TRACKING SYSTEMS AND METHODS, filed on Mar. 27, 2023 and U.S. Provisional Patent Application Ser. No. 63/599,890, entitled VIDEO INSPECTION AND CAMERA HEAD TRACKING SYSTEMS AND METHODS, filed on Nov. 16, 2023, the content of which is hereby incorporated by reference herein in its entirety for all purpose.

FIELD

This disclosure relates generally to systems and methods used to inspect pipes or other cavities. More specifically, but not exclusively, the disclosure relates to systems and methods for tracking camera heads used in inspect pipes and other cavities.

BACKGROUND

There are many applications where a camera may be deployed into a pipe or other cavity to inspect for issues that may otherwise be inaccessible for inspection. In some applications, it may be necessary or advantageous to know the location of the camera disposed in the pipe or other cavity at the ground surface. One solution known in the art is found in pipe inspection systems having a pipe Sonde in or near a camera head wherein the camera head and pipe Sonde are both coupled to the distal end of a push-cable. The push-cable may facilitate forcing the camera head and associated pipe Sonde through a pipe or other cavity. The pipe Sonde, emitting electromagnetic signals, may be sensed at the ground surface via a utility locator device in order to estimate the position of the associated camera head.

There are multiple use scenarios where such a pipe inspection system including a pipe Sonde and a utility locator device may be employed. In one such use scenario, a user may deploy the inspection camera and pipe Sonde into a pipe or other cavity and, upon discovering an issue or other notable location in the inspection, stop movement of the camera/pipe Sonde and attempt to locate an emitted pipe Sonde signal with the utility locator device. At times, the process of wandering an area to initially find the pipe Sonde signal via the utility locator device may be difficult, an unnecessary waste of time, and frustrating for a user.

In another use scenario often referred to as "line tracing," a pipe Sonde that may generally be positioned near or in a camera head, may be moved through a pipe while a utility locator device tracks and follows movements of the pipe Sonde. There are some circumstances wherein the pipe Sonde signal may be lost by the utility locator device. For instance, a pipe Sonde may completely or intermittently fail due to deeply buried pipes, nearby conductive elements, other electromagnetic signal interference, or the like. All such issues may impact the ability of the utility locator device to continuously track or map a pipe Sonde at the ground surface.

Accordingly, there is a need in the art to address the above-described as well as other problems.

SUMMARY

In accordance with one aspect of the present invention, a video inspection and camera head tracking system for use in pipes or other cavities is disclosed. The video inspection and camera head tracking system may include a push-cable and a cable storage drum at a known geolocation/position outside an entry point to a pipe. It should be noted, in some embodiments the geolocation/position may not rely upon GNSS coordinates and may, for instance, be a visual or like identification, measurement, or estimation of the cable storage drum position including an orientation and distance from the entry point of a pipe or other cavity or other reference point. The cable storage drum may store the push-cable and dispense the push-cable into the pipe. Further, the video inspection and camera head tracking system may include a camera head having one or more image sensors for generating image data. The camera head may be coupled at a distal end of the push-cable. One or more camera head position elements (e.g., inertial navigation system (INS), motion estimation algorithms calculate the camera head movements from adjacent video frames in the image data, LiDAR, acoustic motion sensors, or the like) to determine the position of the camera head relative to the cable storage drum position. A radio communication module may be coupled with the cable storage drum. The radio communication module may wirelessly communicate the camera head position data to one or more utility locator devices, tablets, smart phones, and other camera head position tracking devices. The camera head position tracking device may determine a position for the camera head and further communicate the camera head position to a user. The video inspection and camera head tracking system may further include a display device to receive the image data and display the video and still images from the interior of the pipe or cavity.

In accordance with another aspect of the invention, a video inspection and camera head tracking method is disclosed. The method may include, in one step, determining the geolocation/position of a cable storage drum. In another step, the method may include moving a push-cable including a camera head having one or more camera head positioning elements through a pipe generating image data and associated camera head position data. In another step, the method may include communicating image data and camera head position data to a radio communication module coupled with the cable storage drum at the ground surface. In another step, the method may include wirelessly communicating, via the radio communication module, camera head position data relative to the cable storage drum geolocation/position to one or more camera head position tracking devices. Further, the method may include a step communicating the image data to one or more display devices. It should be noted, in some embodiments the geolocation/position may not rely upon GNSS coordinates and may, for instance, be a visual or like identification, measurement, or estimation of the cable storage drum position including an orientation and distance from the entry point of a pipe or other cavity or other reference point. In another step, the method may include determining, via a GNSS or other positioning element, the geolocation/position of the camera head position tracking device. In some embodiments, the cable storage drum and camera head position tracking devices need not rely upon GNSS and instead may direct the user to an estimated camera head position, for instance, via communicating a distance and direction relative to the cable storage drum, the entry point to the pipe or other cavity, or like reference point.

In another step, the method may include determining, via a processing element, the camera head position in the world frame based on the inertial navigation data relative to the cable storage drum geolocation/position. In additional steps, the method may include indicating, via one or more camera head position tracking devices, the camera head position and displaying, via a display device, video and/or images of the interior of the pipe or cavity from the camera head.

In another aspect, the present invention includes a computer implemented method for recognizing patterns and making predictions related to camera head positions, pipe mapping, and utility data and characteristics using Artificial Intelligence (AI). In one step, the method includes collecting Locating and Pipe Inspection Data describing the positions and depths of utility lines in the ground from electromagnetic signals via a utility locator device as well as images and video generated via a pipe inspection camera. In another step, the method includes collecting Camera Head Position Data from various sensors and apparatus describing movements of a camera head. In another step, the method includes assembling a Training Database that includes Locating and Pipe Inspection Data and Camera Head Position Data. In another step, the method includes using deep learning to train a Neural Network (Artificial Intelligence/AI) via the Training Database Data. Predictions regarding the camera head positions, pipe mapping, and utility data and characteristics may be generated in another step using AI. In another step, the method includes outputting predictions regarding camera head positions, pipe mapping, and utility data and characteristics.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein:

FIG. 6A is an illustration of the video inspection and camera head tracking system for use in pipe or other cavities from FIG. 2A during a line tracing procedure.

FIG. 9A is a method for selecting a singular camera head position result from error metrics.

FIG. 9B is a method for generating a singular camera head position result by taking an average or weighted average.

FIG. 9C is a method for selecting a singular camera head position result from a predetermined hierarchy.

FIG. 10A is an illustration of the video inspection and camera head tracking system for use in pipes or other cavities.

FIG. 16 is a method for generating a map from camera head movements via the video inspection and camera head tracking system.

FIG. 23 is a method for identifying the position and orientation of the cable storage drum outside the entry point to a pipe or other cavity.

FIG. 25A is a method for identifying the position and orientation of the cable storage drum outside the entry point to a pipe or other cavity.

FIG. 25B is a method identifying the position and orientation of the cable storage drum outside the entry point to a pipe or other cavity.

DETAILED DESCRIPTION OF EMBODIMENTS

Overview

Figure 1:
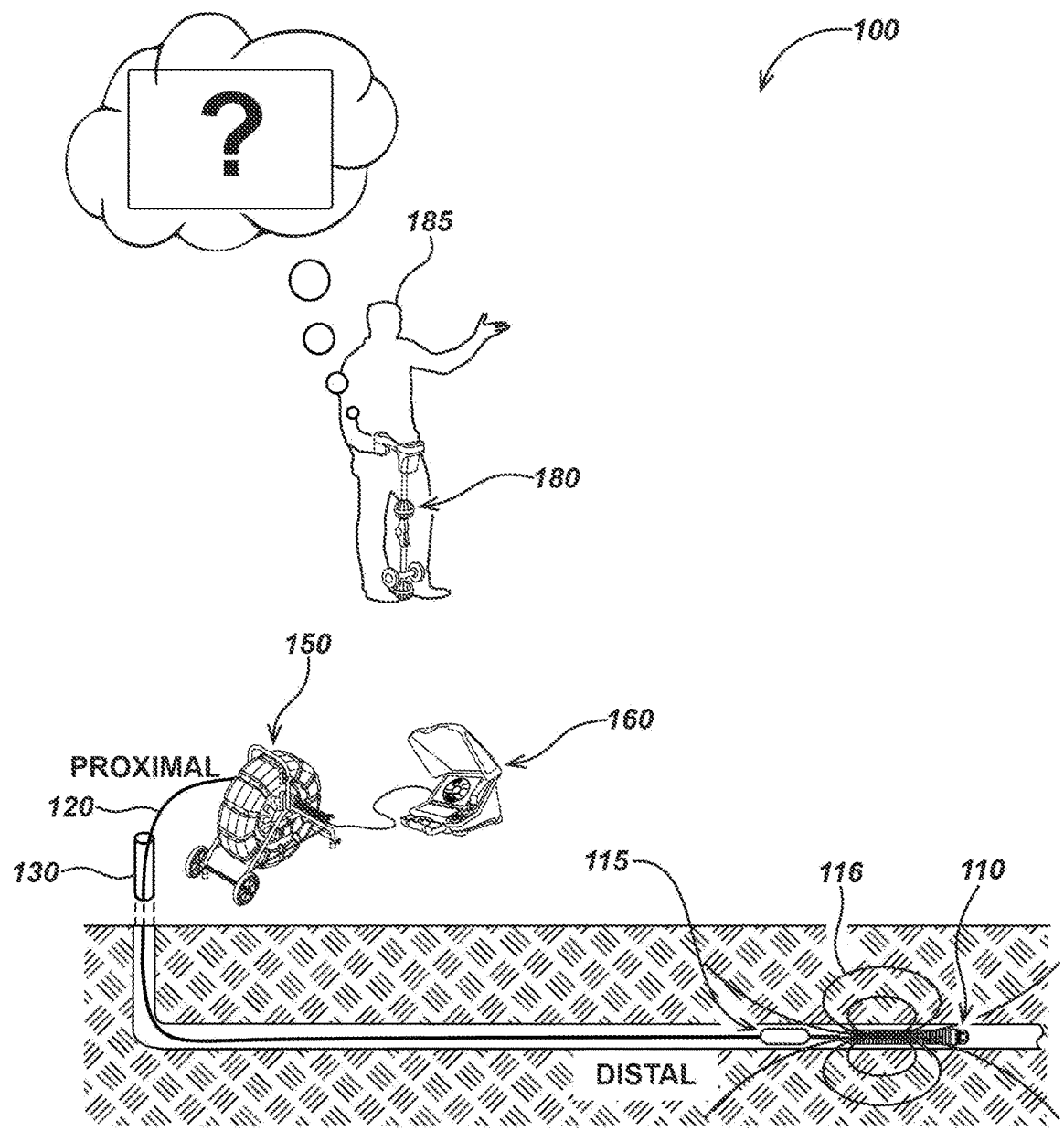
FIG. 1 is an illustration of a prior art inspection system.

In accordance with one aspect of the present invention, a video inspection and camera head tracking system for use in pipes or other cavities is disclosed. The video inspection and camera head tracking system may include a push-cable and a cable storage drum at a known geolocation/position at an entry point to a pipe. The cable storage drum may store the push-cable and dispense the push-cable into the pipe. The geolocation/position of the cable storage drum may, in some embodiments, be determined via GNSS. It should be noted, in some embodiments the geolocation/position may not rely upon GNSS coordinates and may, for instance, be a visual or like identification, measurement, or estimation of the cable storage drum position including an orientation and distance from the entry point of a pipe or other cavity or other reference point. For instance, the geolocation/position of the cable storage drum may be determined through images of the inspection environment that includes the position and orientation of the cable storage drum relative to the entry point of a pipe or other cavity, through one or more sensors and apparatus for generating measurement of the orientation of the cable storage drum and distance of the cable storage drum relative to the entry point of a pipe or other cavity, and/or through a predetermine in a set up procedure. In further embodiments, the geolocation/position of the cable storage drum may be determined via user input (e.g., via selecting the position on a digital map or the like). Likewise, a heading for the cable storage drum may be determined via one or more magnetometers and other inertial navigation sensors. Further, the video inspection and camera head tracking system may include a camera head having one or more image sensors for generating image data. The camera head may be coupled at a distal end of the push-cable. One or camera head positioning element (e.g., inertial navigation system (INS), motion estimation algorithms calculate the camera head movements from adjacent video frames in the image data, LiDAR, acoustic motion sensors, or the like) may generate camera head position data estimating the position of the camera head relative to the cable storage drum position. Likewise, the system may include a pipe Sonde in or near the camera head for emitting an electromagnetic signal detectable at the ground surface. For instance, the system may include a utility locator device having one or more antennas and associated receiver circuitry for receiving electromagnetic signals emitted a pipe Sondes and determine the position of the pipe Sonde in the ground. A radio communication module may be coupled with the cable storage drum. The radio communication module (e.g., Bluetooth, Wi-Fi, ISM, or other radio technology) may wirelessly communicate the camera head position data to one or more utility locator devices, tablets, smart phones, and other camera head position tracking devices. The camera head position tracking device may determine a position of the camera head and further communicate the camera head position to a user. For instance, the camera head position tracking device may indicate the camera head position to a user, via a graphical user interface, a speaker giving audio directions, and steering a user in the correct direction via haptic feedback. The video inspection and camera head tracking system may further include a display device to receive the image data and display the video and still images from the interior of the pipe or cavity. In some embodiments, the camera head position tracking device and display device may be one in the same device.

In another aspect, the display device may be a camera control unit (CCU), tablet, laptop, smartphone, or other portable computing device. In some embodiments, the display device may be a utility locator device to display video and images from inside the pipe.

In another aspect, the video inspection and camera head tracking system may include one or more inertial navigation systems (INS) (e.g., one or more three axis accelerometers, gyroscopic sensors, magnetometers, barometers, and/or other inertial navigation sensors) in the camera head may generate inertial navigation data relative to the cable storage drum position. The INS may generate inertial navigation data describing the camera head position relative to the cable storage drum.

In another aspect, in some video inspection and camera head tracking system embodiments, various other sensors and elements may be included for determining camera head position data. For instance, the system may include a cable counting device in the cable storage drum for measuring the length of push-cable dispensed. In some embodiments, adjacent video frames in the image data may determine camera head movements, further referred to as "visual motion tracking data," via motion estimation algorithms (e.g., block-matching, optical flow, corner detection, or the like). Likewise, in some embodiments, LiDAR, acoustic motion sensors, or other sensors may be included in the system for tracking movements of the camera head.

In another aspect, the system may include a remote or cloud server. For instance, the remote server may store camera head positions and associated image data for future access.

In accordance with another aspect of the invention, a video inspection and camera head tracking method is disclosed. The method may include, in one step, determining the geolocation/position of a cable storage drum. In some embodiments, this may be determined via GNSS. It should be noted, in some embodiments the geolocation/position may not rely upon GNSS coordinates and may, for instance, be a visual or like identification, measurement, or estimation of the cable storage drum position including an orientation and distance from the entry point of a pipe or other cavity or other reference point. For instance, the geolocation/position of the cable storage drum may be determined through images of the inspection environment that includes the position and orientation of the cable storage drum relative to the entry point of a pipe or other cavity, through one or more sensors and apparatus for generating measurement of the orientation of the cable storage drum and distance of the cable storage drum relative to the entry point of a pipe or other cavity, and/or through a predetermine in a set up procedure. In other embodiments, this step may include a user selecting the geolocation/position on a digital map. In another step, the method may include moving a push-cable including a camera head having one or more camera head positioning elements (e.g., inertial navigation system (INS), motion estimation algorithms calculate the camera head movements from adjacent video frames in the image data, LiDAR, acoustic motion sensors, or the like) generating image data and associated camera head position data. In some embodiments, push-cable payout data measuring the length of push-cable dispensed as determined with a cable counting device may be included for determining camera head position data. In another step, the method may include communicating image data and camera head position data to a radio communication module coupled with the cable storage drum at the ground surface. In another step, the method may include wirelessly communicating, via the radio communication module, camera head data relative to the cable storage drum geolocation/position to one or more camera head position tracking devices. Further, the method may include a step communicating the image data to one or more display devices. In another step, the method may include determining, via a GNSS or other positioning element, the geolocation/position of the camera head position tracking device. In some embodiments, the cable storage drum and camera head position tracking devices need not rely upon GNSS and instead may direct the user to an estimated camera head position, for instance, via communicating a distance and direction relative to the cable storage drum, the entry point to the pipe or other cavity, or like reference point. In another step, the method may include determining, via a processing element, the camera head position in the world frame based on the camera head position data relative to the cable storage drum geolocation/position. In additional steps, the method may include indicating, via one or more camera head position tracking devices, the camera head position and displaying, via a display device, video and/or images of the interior of the pipe or cavity from the camera head.

In another aspect, the method may include directing, via a utility locator device, towards the camera head position to initially find the electromagnetic signal emitted by a pipe Sonde. For instance, upon starting a pipe inspection procedure, the method may steer the user towards the camera head position such that the signal emitted by the pipe Sonde may be found.

In another aspect, the method may include switching between locating a signal emitted by pipe Sonde signal and the other camera head position data from the camera head for determining the camera head position. For instance, during line tracing or other procedure where a user may track the pipe Sonde signal via a utility locator device, the pipe Sonde signal may be used unless the signal is lost and the utility locator device may instead determine the position of the camera head by the other camera head position data.

In another aspect, some method embodiments may include a plurality of sensors and elements each determining the position of the camera head. In such embodiments a singular camera head position result may be determined via error metrics of each calculated camera head position, averaging camera head positions, via a weighted average weighted by preference for the source of the camera head position data, a weighted average weighted by error metrics, a hierarchy listing the preferred source for camera head position data or the like.

In another aspect, some method embodiments may further generate a map of camera head positions merged with a map of the world surface at the same geolocation/position.

In another aspect, a processing element may be present in the cable storage drum or other connected device in some embodiments for generating one or more estimated camera head positions further wirelessly communicated to one or more camera head tracking devices.

In another aspect, the method embodiments may include identifying the entry point to a pipe or other cavity for inspection. For instance, the methods may include utilizing image recognition to identify the entry points of pipe or other cavity and/or a predetermined level or change in illumination levels to determine when a camera head has entered.

In another aspect, the present invention includes a computer implemented method for recognizing patterns and making predictions related to camera head positions, pipe mapping, and utility data and characteristics using Artificial Intelligence (AI). In one step, the method includes collecting Locating and Pipe Inspection Data describing the positions and depths of utility lines in the ground from electromagnetic signals via a utility locator device as well as images and video generated via a pipe inspection camera (e.g., electromagnetic data measured by a utility locator device, Line Locating Data estimating positions and depths of utility lines, Position and Orientation Data of the utility locator device, User Input Data, Map Data of the locate/pipe inspection environment, other data relating to the location/position of utility lines and other characteristics, images and video generated at a camera head of a pipe inspection camera, and other data relating to pipe inspections). In another step, the method includes collecting Camera Head Position Data from various sensors and apparatus describing movements of a camera head (e.g., the Heading Data of a cable storage drum, Entry Point Position Data describing the position of the entry point to a pipe or other cavity, inertial navigation data generated by one or more sensors describing movements of a camera head, Visual Motion Data describing movements of a camera head derived from images/video generated at the that camera head in a pipe inspection camera, Push-Cable Payout Data describing the lengths of push-cable dispensed from a cable storage drum, Pipe Sonde Data describing the position of a pipe Sonde associated with a camera head determined via a utility locator device, and other data related to camera head positions and mapping). In another step, the method includes assembling a Training Database that includes Locating and Pipe Inspection Data and Camera Head Position Data. In another step, the method includes using deep learning to train a Neural Network (Artificial Intelligence/AI) via the Training Database Data. Predictions regarding the camera head positions, pipe mapping, and utility data and characteristics may be generated in another step using AI. In another step, the method includes outputting predictions regarding camera head positions, pipe mapping, and utility data and characteristics.

Details of example devices, systems, and methods that may be used in or combined with the video inspection and camera head tracking systems and methods described herein, are disclosed in co-assigned patents and patent applications including: U.S. Pat. No. 5,939,679, issued Aug. 17, 1999, entitled VIDEO PUSH CABLE; U.S. Pat. No. 6,545,704, issued Apr. 8, 1999, entitled VIDEO PIPE INSPECTION DISTANCE MEASURING SYSTEM; U.S. Pat. No. 6,831,679, issued Dec. 14, 2004, entitled VIDEO CAMERA HEAD WITH THERMAL FEEDBACK LIGHTING CONTROL; U.S. Pat. No. 6,862,945, issued Mar. 8, 2005, entitled CAMERA GUIDE FOR VIDEO PIPE INSPECTION SYSTEM; U.S. Pat. No. 6,958,767, issued Oct. 25, 2005, entitled VIDEO PIPE INSPECTION SYSTEM EMPLOYING NON-ROTATING CABLE STORAGE DRUM; U.S. patent application Ser. No. 12/704,808, filed Feb. 13, 2009, entitled PIPE INSPECTION SYSTEM WITH REPLACEABLE CABLE STORAGE DRUM; U.S. patent application Ser. No. 13/647,310, filed Feb. 13, 2009, entitled PIPE INSPECTION SYSTEM APPARATUS AND METHOD; U.S. patent application Ser. No. 13/346,668, filed Jan. 9, 2012, entitled PORTABLE CAMERA CONTROLLER PLATFORM FOR USE WITH PIPE INSPECTION SYSTEM; U.S. patent application Ser. No. 14/749,545, filed Jan. 30, 2012, entitled ADJUSTABLE VARIABLE RESOLUTION INSPECTION SYSTEMS AND METHODS; U.S. Pat. No. 8,289,385, issued Oct. 16, 2012, entitled PUSH-CABLE FOR PIPE INSPECTION SYSTEM; U.S. Pat. No. 8,395,661, issued Mar. 12, 2013, entitled PIPE INSPECTION SYSTEM WITH SELECTIVE IMAGE CAPTURE; U.S. patent application Ser. No. 13/826,112, filed Mar. 14, 2013, entitled SYSTEMS AND METHODS INVOLVING A SMART CABLE STORAGE DRUM AND NETWORK NODE FOR TRANSMISSION OF DATA; U.S. patent application Ser. No. 14/033,349, filed Sep. 20, 2013, entitled PIPE INSPECTION SYSTEM WITH SNAP-ON PIPE GUIDES; U.S. Pat. No. 8,540,429, issued Sep. 24, 2013, entitled SNAP ON PIPE GUIDE; U.S. Pat. No. 8,587,648, issued Nov. 19, 2013, entitled SELF-LEVELING CAMERA HEAD; U.S. patent application Ser. No. 14/136,104, filed Dec. 20, 2013, entitled ROTATING CONTACT ASSEMBLIES FOR SELF-LEVELING CAMERA HEADS; U.S. patent application Ser. No. 14/203,485, filed Mar. 10, 2014, entitled PIPE INSPECTION CABLE COUNTER AND OVERLAY MANAGEMENT SYSTEM; U.S. patent application Ser. No. 14/207,527, filed Mar. 12, 2014, entitled ROTATING CONTACT ASSEMBLIES FOR SELF-LEVELING CAMERA HEADS; U.S. patent application Ser. No. 14/216,358, filed Mar. 17, 2014, entitled SMART CABLE STORAGE DRUM AND NETWORK NODE SYSTEM AND METHODS; U.S. patent application Ser. No. 14/557,163, filed Dec. 1, 2014, entitled ASYMMETRIC DRAG FORCE BEARINGS; U.S. Pat. No. 8,908,027, issued Dec. 9, 2014, entitled ASYMMETRIC DRAG FORCE BEARING FOR USE WITH PUSH-CABLE STORAGE DRUM; U.S. Pat. No. 8,970,211, issued Mar. 3, 2015, entitled PIPE INSPECTION CABLE COUNTER AND OVERLAY MANAGEMENT SYSTEM; U.S. patent application Ser. No. 14/642,596, filed Mar. 9, 2015, entitled PIPE CLEARING CABLES AND APPARATUS; U.S. Pat. No. 8,984,698, issued Mar. 24, 2015, entitled LIGHT WEIGHT SEWER CABLE; U.S. patent application Ser. No. 14/746,590, filed Jun. 22, 2015, entitled THERMAL EXTRACTION ARCHITECTURES FOR CAMERA AND LIGHTING DEVICES; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. Pat. No. 9,080,992, issued Jul. 14, 2015, entitled ADJUSTABLE VARIABLE RESOLUTION INSPECTION SYSTEMS AND METHODS; U.S. Pat. No. 9,134,255, issued Sep. 15, 2015, entitled PIPE INSPECTION SYSTEM WITH SELECTIVE CAPTURE; U.S. patent application Ser. No. 14/935,878, filed Nov. 9, 2015, entitled INSPECTION CAMERA DEVICES AND METHODS WITH SELECTIVELY ILLUMINATED MULTISENSOR IMAGING; U.S. patent application Ser. No. 14/970,362, filed Dec. 15, 2014, entitled COAXIAL VIDEO PUSH-CABLES FOR USE IN INSPECTION SYSTEMS; U.S. Pat. No. 9,222,809, issued Dec. 29, 2015, entitled PORTABLE PIPE INSPECTION SYSTEMS AND APPARATUS; U.S. patent application Ser. No. 15/050,267, filed Feb. 22, 2016, entitled SELF-LEVELING CAMERA HEADS; U.S. Pat. No. 9,277,105, issued Mar. 1, 2016, entitled SELF-LEVELING CAMERA HEADS; U.S. patent application Ser. No. 15/264,355, filed Sep. 13, 2016, entitled HIGH BANDWIDTH VIDEO PUSH-CABLES FOR PIPE INSPECTION SYSTEMS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,468,954, issued Oct. 18, 2016, entitled PIPE INSPECTION SYSTEM WITH JETTER PUSH-CABLE; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. patent application Ser. No. 15/369,693, filed Dec. 5, 2016, entitled CABLE STORAGE DRUM WITH MOVEABLE CCU DOCKING APPARATUS; U.S. Pat. No. 9,521,303, issued Dec. 13, 2016, entitled CABLE STORAGE DRUM MOVABLE CCU DOCKING APPARATUS; U.S. patent application Ser. No. 15/425,785, filed Feb. 6, 2017, entitled METHOD AND APPARATUS FOR HIGH-SPEED DATA TRANSFER EMPLOYING SELF-SYNCHRONIZING QUADRATURE AMPLITUDE MODULATION; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION; U.S. patent application Ser. No. 15/483,924, filed Apr. 10, 2017, entitled SYSTEMS AND METHODS FOR DATA TRANSFER USING SELF-SYNCHRONIZING QUADRATURE AMPLITUDE MODULATION; U.S. Pat. No. 9,625,602, issued Apr. 18, 2017, entitled SMART PERSONAL COMMUNICATION DEVICES AS USER INTERFACES; U.S. Pat. No. 9,634,878, issued Apr. 25, 2017, entitled SYSTEMS AND METHODS FOR DATA TRANSFER USING SELF-SYNCHRONIZING QUADRATURE AMPLITUDE MODULATION; U.S. patent application Ser. No. 15/590,964, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. patent application Ser. No. 15/670,845, filed Aug. 7, 2017, entitled HIGH FREQUENCY AC-POWERED DRAIN CLEANING AND INSPECTION APPARATUS AND METHODS; U.S. patent application Ser. No. 15/701,247, filed Sep. 11, 2017, entitled PIPE INSPECTION SYSTEMS WITH SELF-GROUNDING PORTABLE CAMERA CONTROLLERS; U.S. Pat. No. 9,769,366, issued Sep. 19, 2017, entitled ELF-GROUNDING TRANSMITTING PORTABLE CAMERA CONTROLLER FOR USE WITH PIPE INSPECTION SYSTEMS; U.S. Pat. No. 9,791,382, issued Oct. 17, 2017, entitled PIPE INSPECTION SYSTEM WITH JETTER PUSH-CABLE; U.S. patent application Ser. No. 15/728,410, filed Oct. 9, 2017, entitled PIPE INSPECTION SYSTEM WITH JETTER PUSH-CABLE; U.S. patent application Ser. No. 15/805,007, filed Nov. 6, 2017, entitled PIPE INSPECTION SYSTEM CAMERA HEADS; U.S. patent application Ser. No. 15/806,219, filed Nov. 7, 2017, entitled MULTI-CAMERA PIPE INSPECTION APPARATUS, SYSTEMS AND METHODS; U.S. patent application Ser. No. 15/811,264, filed Nov. 13, 2017, entitled SPRING ASSEMBLIES WITH VARIABLE FLEXIBILITY FOR USE WITH PUSH-CABLES AND PIPE INSPECTION SYSTEMS; U.S. Pat. No. 9,824,433, issued Nov. 21, 2017, entitled PIPE INSPECTION SYSTEM CAMERA HEADS; U.S. Pat. No. 9,829,783, issued Nov. 28, 2017, entitled SPRING ASSEMBLIES WITH VARIABLE FLEXIBILITY FOR USE WITH PUSH-CABLES AND PIPE INSPECTION SYSTEMS; U.S. Pat. No. 9,835,564, issued Dec. 5, 2017, entitled MULTI-CAMERA PIPE INSPECTION APPARATUS, SYSTEMS, AND METHODS; U.S. patent application Ser. No. 15/919,077, filed Mar. 27, 2018, entitled PORTABLE PIPE INSPECTION SYSTEMS AND METHODS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/922,703, filed Mar. 15, 2018, entitled SELF-LEVELING INSPECTION SYSTEMS AND METHODS; U.S. Pat. No. 9,924,139, issued Mar. 20, 2018, entitled PORTABLE PIPE INSPECTION SYSTEMS AND APPARATUS; U.S. Pat. No. 9,927,368, issued Mar. 27, 2018, entitled SELF-LEVELING INSPECTION SYSTEMS AND METHODS; U.S. Provisional Patent Application 62/686,589, filed Jun. 18, 2018, entitled MULTI-DIELECTRIC COAXIAL PUSH-CABLES; U.S. Provisional Patent Application 62/726,500, filed Sep. 4, 2018, entitled VIDEO PIPE INSPECTION SYSTEMS, DEVICES, AND METHODS INTEGRATED WITH NON-VIDEO DATA RECORDING AND COMMUNICATION FUNCTIONALITY; U.S. Provisional Patent Application 62/756,538, filed Nov. 6, 2018, entitled ROBUST AND LOW COST IMPEDANCE CONTROLLED SLIP RINGS; U.S. Provisional Patent Application 62/768,760, filed Nov. 16, 2018, entitled PIPE INSPECTION AND/OR MAPPING CAMERA HEADS, SYSTEMS, AND METHODS; U.S. Provisional Patent Application 62/794,863, filed Jan. 21, 2019, entitled HEAT EXTRACTION ARCHITECTURE FOR COMPACT VIDEO HEADS; U.S. patent application Ser. No. 16/443,789, filed Jun. 17, 2019, entitled MULTI-DIELECTRIC COAXIAL PUSH-CABLES AND ASSOCIATED APPARATUS; U.S. Pat. No. 10,356,360, issued Jul. 16, 2019, entitled HIGH BANDWIDTH VIDEO PUSH-CABLE FOR PIPE INSPECTION SYSTEMS; U.S. Pat. No. 10,359,368, issued Jul. 23, 2019, entitled PIPE INSPECTION SYSTEM WITH JETTER PUSH-CABLE; U.S. Pat. No. 10,379,436, issued Aug. 13, 2019, entitled SPRING ASSEMBLIES WITH VARIABLE FLEXIBILITY FOR USE WITH PUSH-CABLES AND PIPE INSPECTION SYSTEMS; U.S. Pat. No. 10,440,332, issued Oct. 8, 2019, entitled INSPECTION CAMERA DEVICES AND METHODS WITH SELECTIVELY ILLUMINATED MULTISENSOR IMAGINING; U.S. Pat. No. 10,527,402, issued Jan. 7, 2020, entitled PIPE INSPECTION SYSTEM CABLE COUNTER AND OVERLAY MANAGEMENT SYSTEM; U.S. Pat. No. 10,585,012, issued Mar. 10, 2020, entitled PORTABLE CAMERA CONTROLLER FOR USE WITH PIPE INSPECTION SYSTEMS; U.S. Pat. No. 10,613,034, issued Apr. 7, 2020, entitled SELF-LEVELING INSPECTION SYSTEMS AND METHODS; U.S. Pat. No. 10,715,703, issued Jul. 14, 2020, entitled SELF-LEVELING CAMERA HEADS; U.S. Pat. No. 10,761,233, issued Sep. 1, 2020, entitled SONDES AND METHODS FOR USE WITH BURIED LINE LOCATOR SYSTEMS; U.S. Pat. No. 10,764,541, issued Sep. 1, 2020, entitled COAXIAL VIDEO PUSH-CABLES FOR USE IN INSPECTION SYSTEMS; U.S. patent application Ser. No. 17/087,554, filed Nov. 2, 2020, entitled PORTABLE PIPE INSPECTION SYSTEMS AND METHODS; U.S. Pat. No. 10,834,364, issued Nov. 10, 2020, entitled PORTABLE PIPE INSPECTION SYSTEMS AND METHODS; U.S. Pat. No. 10,841,144, issued Nov. 17, 2020, entitled SYSTEM AND METHODS FOR DATA TRANSFER USING SELF-SYNCHRONIZING QUADRATURE AMPLITUDE MODULATION (QAM); U.S. Pat. No. 10,855,950, issued Dec. 1, 2020, entitled HIGH BANDWIDTH VIDEO PUSH-CABLES FOR PIPE INSPECTION SYSTEMS; U.S. Pat. No. 10,863,064, issued Dec. 8, 2020, entitled CABLE STORAGE DRUM WITH MOVEABLE CCU DOCKING APPARATUS; U.S. Pat. No. 10,907,690, issued Feb. 2, 2021, entitled PIPE INSPECTION SYSTEMS WITH ASSYMETRIC DRAG FORCE BEARINGS; U.S. Pat. No. 10,921,263, issued Feb. 16, 2021, entitled PIPE INSPECTION SYSTEM WITH JETTER PUSH-CABLE; U.S. patent application Ser. No. 17/182,113, filed Feb. 22, 2021, entitled VIDEO PIPE INSPECTION SYSTEMS; U.S. patent application Ser. No. 17/202,128, filed Mar. 15, 2021, entitled BORING INSPECTION SYSTEMS AND METHODS; U.S. Pat. No. 10,955,583, issued Mar. 23, 2021, entitled BORING INSPECTION SYSTEMS AND METHODS; U.S. Pat. No. 10,976,462, issued Apr. 13, 2021, entitled VIDEO INSPECTION SYSTEMS WITH PERSONAL COMMUNICATION DEVICE USER INTERFACES; U.S. Pat. No. 10,992,849, issued Apr. 27, 2021, entitled PIPE INSPECTION SYSTEMS WITH SELF-GROUNDING PORTABLE CAMERA CONTROLLERS; U.S. Pat. No. 11,016,381, issued May 25, 2021, entitled SPRING ASSEMBLIES WITH VARIABLE FLEXIBLE FOR USE WITH PUSH-CABLES AND PIPE INSPECTION SYSTEMS; U.S. patent application Ser. No. 17/397,940, filed Aug. 9, 2021, entitled INSPECTION SYSTEM PUSH-CABLE GUIDE APPARATUS; U.S. Pat. No. 11,088,890, issued Aug. 10, 2021, entitled VIDEO INSPECTION SYSTEMS AND METHODS USING SELF-SYNCHRONIZING QAM; U.S. Pat. No. 11,132,781, issued Sep. 28, 2021, entitled PIPE INSPECTION SYSTEM CAMERA HEADS; U.S. patent application Ser. No. 17/528,155, filed Nov. 16, 2021, entitled PORTABLE CAMERA CONTROLLER PLATFORM FOR USE WITH PIPE INSPECTION SYSTEMS; U.S. Pat. No. 11,178,317, issued Nov. 16, 2021, entitled HEAT EXTRACTION APPARATUS; U.S. patent application Ser. No. 17/528,956, filed Nov. 17, 2021, entitled VIDEO INSPECTION SYSTEM APPARATUS AND METHODS WITH RELAY MODULES AND CONNECTION PORTS; U.S. patent application Ser. No. 17/531,533, filed Nov. 19, 2021, entitled INPUT MULTIPLEXED SIGNAL PROCESSING APPARATUS AND METHODS; U.S. patent application Ser. No. 17/532,938, filed Nov. 22, 2021, entitled PIPE INSPECTION AND/OR MAPPING CAMERA HEADS, SYSTEMS, AND METHODS; U.S. Pat. No. 11,187,822, issued Nov. 30, 2021, entitled SONDE DEVICES INCLUDING SECTIONAL FERRITE CORE STRUCTURE; U.S. Pat. No. 11,187,971, issued Nov. 30, 2021, entitled ROTATING CONTACT ASSEMBLIES FOR SELF-LEVELING CAMERA HEADS; U.S. Pat. No. 11,199,510, issued Dec. 14, 2021, entitled PIPE INSPECTION AND CLEANING APPARATUS AND SYSTEMS; U.S. Pat. No. 11,209,115, issued Dec. 28, 2021, entitled PIPE INSPECTION AND/OR MAPPING CAMERA HEADS, SYSTEMS, AND METHODS; U.S. Pat. No. 11,209,334, issued Dec. 28, 2021, entitled PORTABLE CAMERA CONTROLLER PLATFORM FOR USE WITH PIPE INSPECTION SYSTEMS; U.S. Pat. No. 11,300,700, issued Apr. 12, 2022, entitled SYSTEM AND METHODS OF USING A SONDE DEVICE WITH A SECTIONAL FERRITE CORE STRUCTURE; U.S. patent application Ser. No. 17/868,709, filed Jul. 19, 2022, entitled INSPECTION CAMERA DEVICES AND METHODS; U.S. patent application Ser. No. 17/815,387, filed Jul. 27, 2022, entitled INWARD SLOPED DRUM FACE FOR PIPE INSPECTION CAMERA SYSTEM; U.S. Pat. No. 11,402,337, issued Aug. 2, 2022, entitled VIDEO PIPE INSPECTION SYSTEMS WITH VIDEO INTEGRATED WITH ADDITIONAL SENSOR DATA; U.S. Pat. No. 11,418,761, issued Aug. 16, 2022, entitled INSPECTION CAMERA DEVICES AND METHODS WITH SELECTIVELY ILLUMINATED MULTISENSOR IMAGING; U.S. Pat. No. 11,448,600, issued Sep. 20, 2022, entitled MULTI-CAMERA PIPE INSPECTION APPARATUS, SYSTEMS, AND METHODS; U.S. patent application Ser. No. 17/993,784, filed Nov. 23, 2022, entitled VIDEO PIPE INSPECTION SYSTEMS; U.S. Pat. No. 11,528,401, issued Dec. 13, 2022, entitled PIPE INSPECTION SYSTEMS WITH SELF-GROUNDING PORTABLE CAMERA CONTROLLERS; U.S. patent application Ser. No. 18/091,079, filed Dec. 29, 2022, entitled VIDEO INSPECTION SYSTEMS WITH WIRELESS ENABLED DRUM; U.S. patent application Ser. No. 18/148,850, filed Dec. 30, 2022, entitled SPRING ASSEMBLIES WITH VARIABLE FLEXIBILITY FOR USE WITH PUSH-CABLES AND PIPE INSPECTION SYSTEMS; U.S. Pat. No. 11,550,214, issued Jan. 10, 2023, entitled SPRING ASSEMBLIES WITH VARIABLE FLEXIBLE FOR USE WITH PUSH-CABLES AND PIPE INSPECTION SYSTEMS; U.S. Pat. No. 11,558,537, issued Jan. 17, 2023, entitled VIDEO INSPECTION SYSTEM WITH WIRELESS ENABLED CABLE STORAGE DRUM; U.S. patent application Ser. No. 18/121,547, filed Mar. 14, 2023, entitled DOCKABLE CAMERA REEL AND CAMERA CONTROL UNIT (CCU) SYSTEM; U.S. patent application Ser. No. 18/121,562, filed Mar. 14, 2023, entitled PIPE INSPECTION AND CLEANING APPARATUS AND SYSTEMS; U.S. Provisional Patent Application 63/492,473, filed Mar. 27, 2023, entitled VIDEO INSPECTION AND CAMERA HEAD TRACKING SYSTEMS AND METHODS; U.S. Pat. No. 11,614,412, issued Mar. 28, 2023, entitled PIPE INSPECTION SYSTEMS WITH JETTER PUSH-CABLE; U.S. Pat. No. 11,614,613, issued Mar. 28, 2023, entitled DOCKABLE CAMERA REEL AND CCU SYSTEM; U.S. patent application Ser. No. 18/130,341, filed Apr. 3, 2023, entitled VIDEO PUSH-CABLES FOR PIPE INSPECTION SYSTEMS; U.S. Pat. No. 11,621,099, issued Apr. 4, 2023, entitled COAXIAL VIDEO PUSH-CABLES FOR USE IN INSPECTION SYSTEMS; U.S. patent application Ser. No. 18/135,661, filed Apr. 17, 2023, entitled VIDEO PIPE INSPECTION SYSTEMS AND METHODS WITH SENSOR DATA; U.S. patent application Ser. No. 18/140,488, filed Apr. 27, 2023, entitled INTEGRATED FLEX-SHAFT CAMERA SYSTEM; U.S. Pat. No. 11,639,990, issued May 2, 2023, entitled VIDEO PIPE INSPECTION SYSTEMS WITH VIDEO INTEGRATED WITH ADDITIONAL SENSOR DATA; U.S. Pat. No. 11,649,917, issued May 16, 2023, entitled INTEGRATED FLEX-SHAFT CAMERA SYSTEM WITH HAND CONTROL; U.S. patent application Ser. No. 18/203,029, filed May 29, 2023, entitled SELF-LEVELING INSPECTION SYSTEMS AND METHODS; U.S. Pat. No. 11,665,321, issued May 30, 2023, entitled PIPE INSPECTION SYSTEM WITH REPLACEABLE CABLE STORAGE DRUM; U.S. patent application Ser. No. 18/207,898, filed Jun. 9, 2023, entitled SONDE DEVICES WITH A SECTIONAL CORE; U.S. Pat. No. 11,674,906, issued Jun. 13, 2023, entitled SELF-LEVELING INSPECTION SYSTEMS AND METHODS; U.S. Provisional Patent Application 63/510,014, filed Jun. 23, 2023, entitled INNER DRUM MODULE WITH PUSH-CABLE INTERFACE FOR PIPE INSPECTION; U.S. Pat. No. 11,709,289, issued Jul. 25, 2023, entitled SONDE DEVICES WITH A SECTIONAL FERRITE CORE; U.S. patent application Ser. No. 18/365,225, filed Aug. 3, 2023, entitled SYSTEMS AND METHODS FOR INSPECTION ANIMATION; U.S. Pat. No. 11,719,376, issued Aug. 8, 2023, entitled DOCKABLE TRIPODAL CAMERA CONTROL UNIT; U.S. patent application Ser. No. 18/490,763, filed Oct. 20, 2023, entitled LINKED CABLE-HANDLING AND CABLE-STORAGE DRUM DEVICES AND SYSTEMS FOR THE COORDINATED MOVEMENT OF A PUSH-CABLE; U.S. Provisional Patent Application 63/599,890, filed Nov. 16, 2023, entitled VIDEO INSPECTION AND CAMERA HEAD TRACKING SYSTEMS AND METHODS; U.S. patent application Ser. No. 18/528,773, filed Dec. 4, 2023, entitled PIPE INSPECTION SYSTEM CAMERA HEAD; U.S. Pat. No. 11,842,474, issued Dec. 12, 2023, entitled PIPE INSPECTION SYSTEM CAMERA HEADS; U.S. patent application Ser. No. 18/539,265, filed Dec. 14, 2023, entitled INTEGRAL DUAL CLEANER DRUM SYSTEMS AND METHODS; U.S. patent application Ser. No. 18/539,268, filed Dec. 14, 2023, entitled HIGH FREQUENCY AC-POWERED DRAIN CLEANING AND INSPECTION APPARATUS AND METHODS; U.S. Pat. No. 11,846,095, issued Dec. 19, 2023, entitled HIGH FREQUENCY AC-POWERED DRAIN CLEANING AND INSPECTION APPARATUS & METHODS; U.S. Pat. No. 11,859,755, issued Jan. 2, 2024, entitled INTEGRAL DUAL CLEANER CAMERA DRUM SYSTEMS AND METHODS; U.S. patent application Ser. No. 18/412,452, filed Jan. 12, 2024, entitled MULTI-CAMERA APPARATUS FOR WIDE ANGLE PIPE INTERNAL INSPECTION; U.S. patent application Ser. No. 18/414,785, filed Jan. 17, 2024, entitled SONDE DEVICES; U.S. Pat. No. 11,879,852, issued Jan. 23, 2024, entitled MULTI-CAMERA APPARATUS FOR WIDE ANGLE PIPE INTERNAL INSPECTION; U.S. Pat. No. 11,880,005, issued Jan. 23, 2024, entitled SONDE DEVICES INCLUDING A SECTIONAL FERRITE CORE STRUCTURE; U.S. Provisional Patent Application 63/625,259, filed Jan. 25, 2024, entitled ACCESSIBLE DRUM-REEL FRAME FOR PIPE INSPECTION CAMERA SYSTEM; U.S. Pat. No. 11,894,707, issued Feb. 6, 2024, entitled RECHARGEABLE BATTERY PACK ONBOARD CHARGE STATE INDICATION METHODS AND APPARATUS; U.S. Pat. No. 11,909,104, issued Feb. 20, 2024, entitled ANTENNAS, MULTI-ANTENNA APPARATUS, AND ANTENNA HOUSINGS; U.S. Provisional Patent Application 63/558,098, filed Feb. 26, 2024, entitled SYSTEMS, DEVICES, AND METHODS FOR DOCUMENTING GROUND ASSETS AND ASSOCIATED UTILITY LINES; and U.S. Pat. No. 11,921,225, issued Mar. 5, 2024, entitled ANTENNA SYSTEMS FOR CIRCULARLY POLARIZED RADIO SIGNALS. The content of each of the above-described patents and applications is incorporated by reference herein in its entirety. The above applications may be collectively denoted herein as the "co-assigned applications" or "incorporated applications."

The following exemplary embodiments are provided for the purpose of illustrating examples of various aspects, details, and functions of apparatus and systems; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Terminology

As used herein, the term "position" may refer to a location or geolocation as well as a pose or orientation in three dimensions at that location. For instance, a geolocation determined by GNSS may further include a pose or orientation at the geolocation determined via one or more inertial sensors (e.g., accelerometers, gyroscopic sensors, magnetometers, and the like). Further, the INS may include one or more barometers. The positions determined herein may instead or additionally be determined through inertial navigation system sensors (e.g., compass sensors, magnetometers, accelerometers, gyroscopic sensors, and/or other sensors to determining movement, orientation, or position), via cable counting apparatus determining the amount of push-cable dispensed, through operating procedures (e.g., instructing the user to set up a cable storage drum at a specific position/orientation relative to the entry point of the pipe or other cavity), through photographs and/or maps of the locate environment, or the like.

The term "image data" may refer to both video and still images produced by the camera head.

The term "camera head position data" may refer to the data or data set describing the position of a camera head in the world frame. Such camera head position data may be three dimensional, for instance, having x, y, and z coordinates. In some embodiments, the camera head position data may be or include coordinates in the geographic coordinate system (e.g., latitude and longitude) that may further include an altitude or depth measurement buried in the depth. It should be noted not all embodiments rely upon positions or geolocations in a geographic coordinate system having latitude and longitude measurements and the camera head position data may be a distance and direction relative to the cable storage drum, entry point to the pipe or other cavity, or other reference point. In the embodiments of the present invention, the camera head position data may include "inertial navigation data" from inertial navigation sensors in the camera head (e.g., accelerometers, gyroscopic sensors, and magnetometers). Further, the INS may include one or more barometers. Furthermore, in some embodiments the camera head position data may be a distance and direction relative to the cable storage drum.

The term "camera head position tracking device" may refer to a variety of devices receiving the camera head position data for determining the position of a camera head in the world frame. In many embodiments, the camera head position tracking device may be or include a utility locator device having one or more antennas and associated receiver circuitry for sensing an electromagnetic signal broadcast by a pipe Sonde in the camera head or near the camera head in a known position relative to the camera head and determine the position of the camera head via the pipe Sonde signal. This data may be part of the camera head position data and may be referred to herein as "Sonde locating data." In other embodiments, a camera head position tracking device may be or include tablets, smartphones, laptop computers, or like portable computing devices that may receive inertial navigation data and/or other camera head position data other than the Sonde locating data and determine a position for the camera head in the world frame.

In some system and method embodiments, the camera head position data may be a set of position measurements from a plurality of different sensors, apparatus, or devices or "sources" referring to the various sensors and apparatus contributing the camera head position data. The camera head position data of such "multiple position input systems" may be or include, for example, "inertial navigation data" from inertial navigation sensors in the camera head, "push-cable pay out data" from cable counting devices, the "Sonde locating data" from utility locator devices locating a pipe Sonde, "visual motion data" from motion estimation algorithms (e.g., block-matching, optical flow, corner detection, or the like) of adjacent frames in the video generated via optical sensors at the camera head. Ultimately, the systems and methods of the present disclosure may use the camera head position data of such multiple position input systems may resolve the multiple points of position data to generate a "singular camera head position result." Mapping of camera head movements as it is moved through a pipe or other cavity may include a plurality of successive singular camera head position results.

In some multiple position input system and method embodiments, a "hierarchy" of different sources generating camera head position data may be determined wherein preferential sources may be at the top of the hierarchy and less preferential sources may be successively lower in the hierarchy. Such methods may select sources higher on the hierarchy where possible.

Example Embodiments

In FIG. 1, a prior art pipe inspection system 100 is illustrated which may be used in inspecting inside of pipes and other cavities while simultaneously tracking camera head positions at the ground surface. The pipe inspection system 100 may include a camera head 110 and a pipe Sonde 115 coupled at a distal end of a push-cable 120 that may be moved through a pipe 130 or another cavity. A cable storage drum 150, positioned at or near an entry point to the pipe 130 or other cavity, may couple with the proximal end of the push-cable 120. The cable storage drum 150 may store the push-cable 120 while not in use and further dispense the push-cable into the pipe 130 for deploying the camera head 110 for inspection. Image data including video and still frames from inside the pipe 130 or other cavity, may be generated by the camera head 110 and be communicated via the push-cable 120 to the cable storage drum 150 and further onto a camera control unit (CCU) 160. The CCU 160, coupled via a wired connection to the cable storage drum 150, may display the video and/or images generated by the camera head 110 as well as control aspects relating to the function of the camera head 110 (e.g., controlling lights, focus, or the like). A utility locator device 180, having one or more antennas and associated receiver circuitry (e.g., one or more buffers, amplifiers, signal conditioners, analog-to-digital (A/D) converters, multiplexers, and the like to provide filtering functionality, signal conditioning, or the like) may receive a signal 116 emitted by the pipe Sonde 115 and determine the emission location of the signal 116 at the ground surface. The pipe Sonde 115 may have a known location in or, as illustrated in FIG. 1, relative to the camera head 110. As such, the position of the camera head 110 may be determined through locating the pipe Sonde 115 having a known relative position.

As illustrated in the prior art pipe inspection system 100, a user 185 is illustrated holding the utility locator device 180 at a ground surface position at too great a distance from the signal 116 emitted by the pipe Sonde 115 to determine the location thereof or, by association, that of the camera head 110. Currently, in order for the user 185 to determine the location of the camera head 110, the user 185 may be forced to wander about the inspection area in the hopes of sensing the signal 116 via the utility locator device 180. Once the signal 116 is initially found, the user 185 may track the pipe Sonde 115, and the camera head 110 associated therewith, as further moved through the pipe 130. Unfortunately, initially locating the signal 116 via the utility locator device 180 may be an unnecessarily difficult, time consuming, and frustrating solution. For instance, had the pipe 130 included a turn in an unanticipated direction, the user 185 may struggle to figure out the correction direction towards the signal 116. Such problems may further be worsened where the signal 116 is, for instance, interrupted or interfered with by the environment or the like. For instance, where the signal 116 cannot be located at the ground surface due to a particularly deeply buried pipe or because of factors interfering with the signal 116, the user 185 may never sense the signal 116 or locate the camera head 110 position.

Figure 2A:
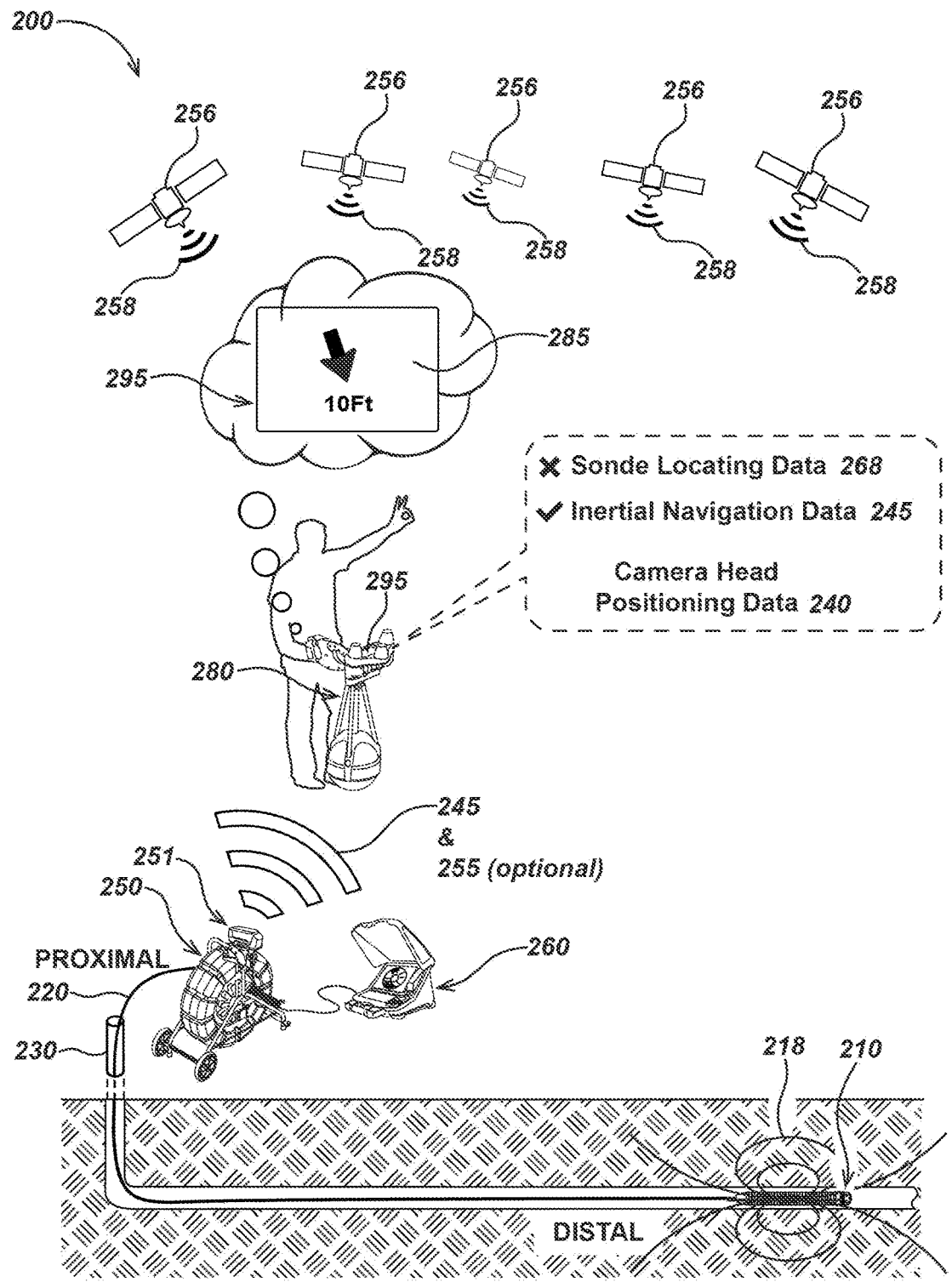
FIG. 2A is an illustration of the video inspection and camera head tracking system for use in pipes or other cavities.
Figure 2B:
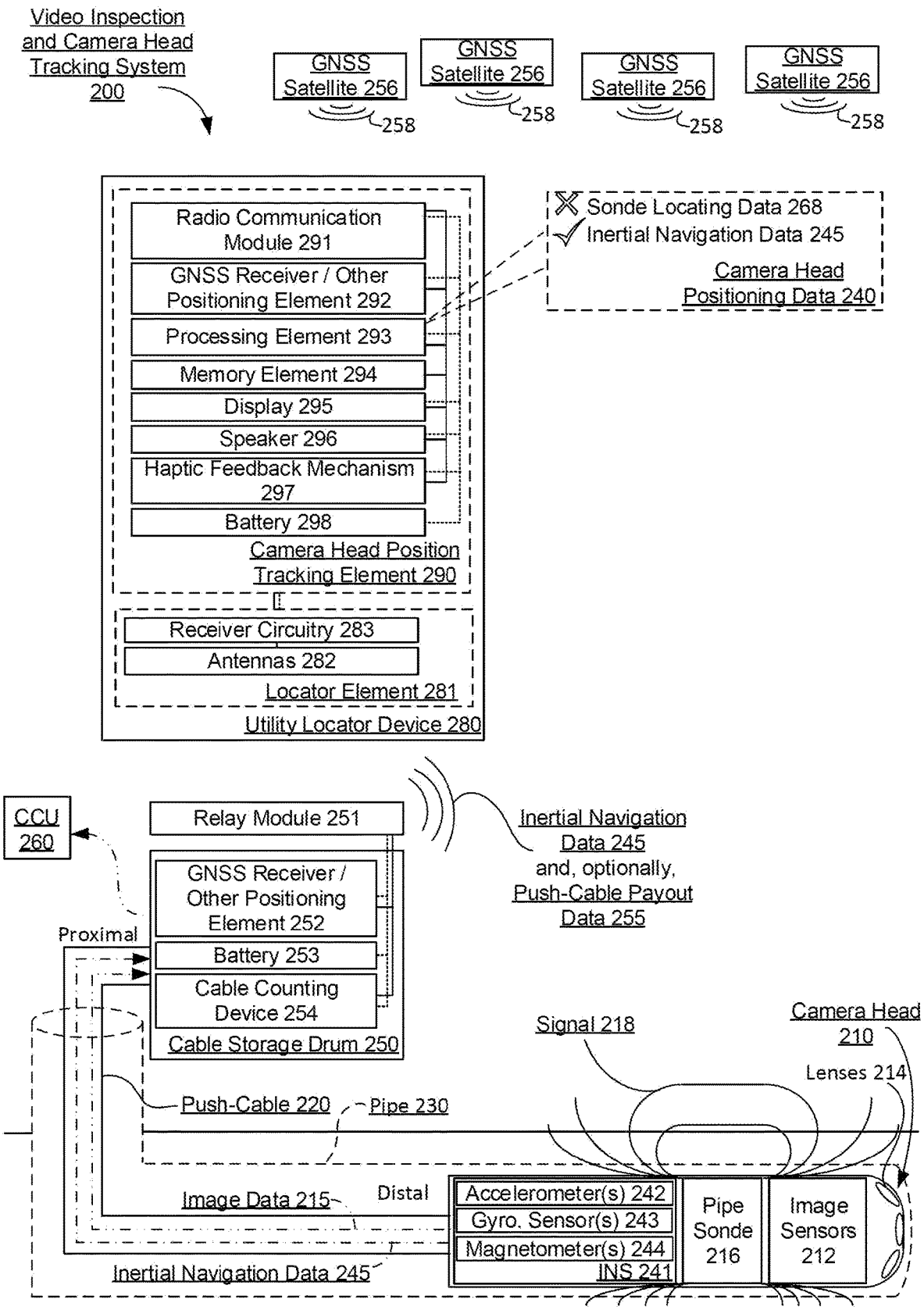
FIG. 2B is a diagram of the video inspection and camera head tracking system for use in pipes or other cavities from FIG. 2A.

As illustrated in FIGS. 2A and 2B, a video inspection and camera head tracking system 200 is illustrated which may be used for inspecting inside of pipes and other cavities while simultaneously tracking camera head positions. The video inspection and camera head tracking system 200 may include a camera head 210 coupled at a distal end of a push-cable 220 that may be moved through a pipe 230. The camera head 210 may be or share aspects with the cameras disclosed in U.S. Pat. No. 6,831,679, entitled VIDEO CAMERA HEAD WITH THERMAL FEEDBACK LIGHTING CONTROL issued Dec. 14, 2004; U.S. Pat. No. 8,587,648, entitled SELF-LEVELING CAMERA HEAD, issued Nov. 9, 2013; U.S. Pat. No. 9,066,446, entitled THERMAL EXTRACTION ARCHITECTURE FOR CAMERA HEAD, INSPECTION SYSTEMS, AND OTHER DEVICES AND SYSTEMS issued Jun. 23, 2015; U.S. Pat. No. 9,277,105, entitled SELF-LEVELING CAMERA HEADS, issued Mar. 1, 2016; U.S. Pat. No. 9,824,433 entitled PIPE INSPECTION SYSTEM CAMERA HEADS, issued on Nov. 21, 2017; U.S. Pat. No. 9,835,564, entitled MULTI-CAMERA PIPE INSPECTION APPARATUS, SYSTEM, AND METHODS, issued Dec. 5, 2017; U.S. Pat. No. 10,288,997, entitled ROTATING CONTACT ASSEMBLIES FOR SELF-LEVELING CAMERA HEADS, issued May 14, 2019; U.S. Pat. No. 10,715,703, entitled SELF-LEVELING CAMERA HEADS, issued Jul. 14, 2020; U.S. Pat. No. 10,848,655, entitled HEAT EXTRACTION ARCHITECTURE FOR COMPACT VIDEO CAMERA HEADS, issued Nov. 24, 2020; U.S. Pat. No. 11,209,115, entitled PIPE INSPECTION AND/OR MAPPING CAMERA HEADS, SYSTEMS, AND METHODS, issued Dec. 28, 2021; and/or other disclosed in the incorporated patents and applications. The content of each of these applications is incorporated by reference herein in its entirety.

The push-cable 220 may be or share aspects with those disclosed in U.S. Pat. No. 5,939,679, entitled VIDEO PUSH CABLE, issued Aug. 17, 1999; U.S. patent application Ser. No. 14/970,362, entitled COAXIAL VIDEO PUSH-CABLES FOR USE IN INSPECTION SYSTEMS, filed Dec. 15, 2015; U.S. Pat. No. 9,448,376, entitled HIGH BANDWIDTH PUSH-CABLES FOR VIDEO INSPECTION SYSTEMS, issued Sep. 20, 2016; U.S. Pat. No. 9,468,954, entitled PIPE INSPECTION SYSTEM INCLUDING JETTER PUSH-CABLE, issued Oct. 18, 2016; U.S. Pat. No. 10,764,541, entitled COAXIAL VIDEO PUSH-CABLES FOR USE IN INSPECTION SYSTEMS, issued Sep. 1, 2020; and/or other disclosed in the incorporated patents and applications. The content of each of these applications is incorporated by reference herein in its entirety.

Referring to FIG. 2B, the camera head 210 may include one or more image sensors 212 and lenses 214 to capture video and images from the interior of the pipe 230. The captured video and/or images from the interior of the pipe 230 may be referred to herein as "image data" and is notated as image data 215 in FIG. 2B. The image data 215 may be communicated, via the push-cable 220, to a cable storage drum 250 coupled at the proximal end of the push-cable 220 outside the entry point to the pipe 230 and then further onto a CCU 260 for displaying the video/images of the image data 215 as well as control aspects of the camera head 210. The CCU 260 may be or share aspects with those disclosed in U.S. Pat. No. 10,084,945, entitled CABLE STORAGE DRUM WITH MOVEABLE CCU DOCKING APPARATUS, issued Sep. 25, 2018; U.S. patent application Ser. No. 17/190,400, filed Mar. 3, 2021, entitled DOCKABLE CAMERA REEL AND CCU SYSTEM; and/or other disclosed in the incorporated patents and applications. The content of each of these applications is incorporated by reference herein in its entirety.

One or more inertial navigation sensors (INS) 241 may determine positions of the camera head 210 relative to the cable storage drum 250. The INS 241 may be or include, but should not be limited to, accelerometers 242, gyroscopic sensors 243, and magnetometers 244 that may measure in three dimensions for generating inertial navigation data 245. In some embodiments, the INS may include one or more barometers (not illustrated). Inertial navigation data, such as the inertial navigation data 245 of FIG. 2B, may, in various embodiments, be included in a data set with other data for determining the position of a camera head. This data set may be referred to herein as "camera head position data." For instance, as illustrated in FIG. 2B, the inertial navigation data 245 may be included in a camera head position data 240.

The cable storage drum 250 may further include a radio communication module (e.g., Bluetooth, Wi-Fi, ISM, or the like), such as a relay module 251, to wirelessly communicate the inertial navigation data 245, which may include movements in both degree and direction determined by the inertial navigation sensors 241 relative to the position of the cable storage drum 250, to one or more utility locator devices, such as a utility locator device 280, and/or other camera head tracking devices as disclosed subsequently herein. The relay module 241 may be or share aspects with those disclosed in U.S. patent application Ser. No. 17/528,956, filed Nov. 17, 2021, entitled VIDEO INSPECTION SYSTEM APPARATUS AND METHODS WITH RELAY MODULE AND CONNECTION PORTS and/or others disclosed in the incorporated patents and applications. The content of the application is incorporated by reference herein in its entirety. In other embodiments, such a radio communication module may instead or additionally be disposed in the cable storage drum or other connected ground surface device (e.g., such as the CCU 260).

Still referring to FIG. 2B, it should be noted that the position of the cable storage drum 250 in the world frame may be known. For instance, the cable storage drum 250 may include a GNSS receiver and/or other positioning element 252 for determining a position (e.g., geolocation/position plus orientation or pose at the geolocation/position). For instance, the GNSS receiver and/or other positioning element 252 may receive navigation signals 258 from a plurality of GNSS satellites 256 to generate a position via a geographic coordinate system. Likewise, the other positioning element of the GNSS receiver and/or other positioning element 252 may include one or more other positioning sensors or apparatus. In some embodiments, the GNSS receiver and/or other positioning element 252 may include one or more magnetometers and/or other inertial navigation sensors (not illustrated) for determining a heading at the geolocation/position determine via the GNSS receiver. In some embodiments, such geolocation/positions may instead or additionally include an input allowing a user to select the position of a cable storage drum (e.g., the cable storage drum position 1240 of FIG. 12). Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point. The cable storage drum 250 may further include a battery 253 or, in alternative embodiments, other power source for supplying electrical current. Optionally, the cable storage drum 250 may include a cable counting device 254 that may measure the length of push-cable 220 dispensed into the pipe 230 or another cavity. The measure of the length of push-cable 220 dispensed into the pipe 230 may be referred to here as push-cable payout data such as a push-cable payout data 255. The cable counting device 254 may be or share aspects with those disclosed in U.S. Pat. No. 8,970,211, issued Mar. 3, 2015, entitled PIPE INSPECTION CABLE COUNTER AND OVERLAY MANAGEMENT SYSTEM and/or others disclosed in the incorporated patents and applications. The content of each which is incorporated by reference herein in its entirety. In such embodiments, the push-cable payout data 255 from the cable counting device 254 may be used to verify the total length of movements by the inertial navigation data 245 and optionally adjust the inertial navigation data 245 proportionately along each dimension such that the total length of movements by the inertial navigation data 245 matches the push-cable payout data. In some embodiments, a camera head range containing the camera head may be defined by determining a circumference about the cable storage drum 250 where the radius is defined by the push-cable payout data 255 measurement. Such a camera head range may, for instance, be shown on a display (e.g., the camera head range 330 of the display 310 illustrated in FIG. 3).

Wirelessly communicated inertial navigation data 245 (and optionally push-cable payout data from the cable counting device 254) may be received by the utility locator device 280 which may include the geolocation/position of the cable storage drum 250. In some embodiments, the inertial navigation data 245 may include a calculated position of the camera head 210 based on movement in the inertial navigation data 245 relative to cable storage drum 250 geolocation/position. In some embodiments, the inertial navigation data 245 may be three dimensions. For instance, the include inertial navigation data 245 may include coordinates in a geographic coordinate system or other x/y plane positions as well as depth or other z axis measurements based on the known geolocation/position of the cable storage drum 250 and movements in degree and direction therefrom determined via the INS 241.

The utility locator device 280 may include a locator element 281 further having one or more antennas 282 and a receiver circuitry 283 which may, for example, include one or more buffers, amplifiers, signal conditioners, analog-to-digital (A/D) converters, multiplexers, and the like to provide filtering functionality, signal conditioning, or the like for outputs to the processing element 293 and determine the emission location of a signal 218 emitted by a pipe Sonde 216 in determining its position. Such data determined via a utility locator device and a pipe Sonde may be referred to herein as "Sonde locating data," such as a Sonde locating data 268.

Referring back to FIG. 2B, the utility locator device 280 may be or share aspects with those disclosed U.S. Pat. No. 7,332,901, issued Feb. 19, 2008, entitled LOCATOR WITH APPARENT DEPTH INDICATION; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,057,754, issued Jun. 16, 2015, entitled ECONOMICAL MAGNETIC LOCATOR APPARATUS AND METHOD; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 29/692,937, filed May 29, 2019, entitled BURIED OBJECT LOCATOR; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,690,795, issued Jun. 23, 2020, entitled LOCATING DEVICES, SYSTEMS, AND METHODS USING FREQUENCY SUITES FOR UTILITY DETECTION; and U.S. Pat. No. 10,809,408, issued Oct. 20, 2020, entitled DUAL SENSED LOCATING SYSTEMS AND METHODS; and/or others disclosed in the incorporated patents and applications. The content of each of these applications is incorporated by reference herein in its entirety.

The pipe Sonde 216 may be at a known position relative to the camera head 210 or, in other embodiments, inside a camera head. The pipe Sonde 216 may be or share aspects with those disclosed in U.S. Pat. No. 7,009,399, issued Mar. 7, 2006, entitled OMNIDIRECTIONAL SONDE AND LINE LOCATOR; U.S. Pat. No. 7,221,136, issued May 22, 2007, entitled SONDES FOR LOCATING UNDERGROUND PIPES AND CONDUITS; U.S. Pat. No. 7,298,126, issued Nov. 20, 2007, entitled SONDES FOR LOCATING UNDERGROUND PIPES AND CONDUITS; U.S. Pat. No. 7,336,078, issued Feb. 26, 2008, entitled MULTI-SENSOR MAPPING OMNIDIRECTIONAL SONDE AND LINE LOCATOR; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,864,980, issued Jan. 4, 2011, entitled SONDES FOR LOCATING UNDERGROUND PIPES AND CONDUITS; U.S. Pat. No. 8,035,390, issued Oct. 11, 2011, entitled OMNIDIRECTIONAL SONDE AND LINE LOCATOR; U.S. patent application Ser. No. 14/027,027, filed Sep. 13, 2013, entitled SONDE DEVICES INCLUDING A SECTIONAL FERRITE CORE STRUCTURE; U.S. Pat. No. 9,411,066, issued Aug. 9, 2016, entitled SONDES & METHODS FOR USE WITH BURIED LINE LOCATOR SYSTEMS; U.S. Pat. No. 9,798,033, issued Oct. 24, 2017, entitled SONDE DEVICES INCLUDING A SECTIONAL FERRITE CORE; U.S. patent application Ser. No. 16/792,047, filed Feb. 14, 2020, entitled SATELLITE AND MAGNETIC FIELD SONDE APPARATUS AND METHODS; U.S. Pat. No. 10,761,233, issued Sep. 1, 2020, entitled SONDES AND METHODS FOR USE WITH BURIED LINE LOCATOR SYSTEMS; and/or others disclosed in the incorporated patents and applications. The content of each of these applications is incorporated by reference herein in its entirety.

Referring to FIG. 2B, if the utility locator device 280 were to be moved in range of the signal 218 emitted via the pipe Sonde 216, the utility locator device 280 may be able to determine a position value for the Sonde locating data 268 which may further be included in the camera head position data 240. As illustrated in FIG. 2A, the utility locator device 280 may initially be at a distance too great to sense the signal 218 emitted via the pipe Sonde 216. As a result, the utility locator device 280 may not be able to determine a position value for the Sonde locating data 268 in order to locate the pipe Sonde 216 and, thereby, a position for the camera head 210 from the Sonde locating data 268 at the current location of the utility locator device 280.

Referring back to FIG. 2B, in order to initially locate the camera head 210, the camera head positioning data 240 may include camera head position data from a different source other than that of the Sonde locating data 268. As such, the utility locator device 280 may receive the inertial navigation data 245 via a camera head tracking element 290 having a radio communication module 291 (e.g., Bluetooth, Wi-Fi, ISM, or the like). A GNSS receiver and/or other positioning element 292 may be included for determining a geolocation/position for the utility locator device 280. The other positioning element of the GNSS receiver and/or other positioning element 292 may, for instance, be or include gyroscopic sensors, accelerometers, magnetometers, other inertial navigation sensors, or the like. For instance, a pose or orientation in three-dimensional space may be determined via inertial navigation sensors in the GNSS receiver and/or other positioning element 292 for the utility locator device 280. In some embodiments, the INS may include one or more barometers (not illustrated). In some embodiments, the other positioning element of the GNSS receiver and/or other positioning element 292 may be or include the apparatus, systems, and methods disclosed in U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,784,837, issued Oct. 10, 2017, entitled OPTICAL GROUND TRACKING APPARATUS, SYSTEMS & METHODS; U.S. patent application Ser. No. 15/811,361, filed Nov. 13, 2017, entitled OPTICAL GROUND-TRACKING APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/936,250, filed Mar. 26, 2018, entitled GROUND TRACKING APPARATUS, SYSTEMS, AND METHODS; U.S. Pat. No. 9,928,613, issued Mar. 27, 2018, entitled GROUND TRACKING APPARATUS, SYSTEMS, AND METHODS; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; and/or other disclosed in the incorporated patents and applications. The content of each of these applications is incorporated by reference herein in its entirety.

Still referring to FIG. 2B, a processing element 293, having one or more processors, may process the camera head position data 240 including the inertial navigation data 245 relative to the geolocation/position data of the utility locator device 280 (or other camera head position tracking devices in other embodiments) to locate and track the camera head 210. For instance, the position of the camera head 210 may be determined via the method 300 of FIG. 3.

It should be noted that in other embodiments, camera head position data may include other data for determining a position for a camera head (e.g., the push-cable payout data 255 describing a measurement of the amount of the push-cable 220 dispensed from the cable storage drum 255, visual motion data tracking movements of a camera head via block-matching, optical flow, corner detection, or the like algorithms comparing adjacent video frames in the video generated by image sensors, or the like).

Referring to FIG. 2B, the utility locator device 280 may further include a memory element 294 having one or more non-transitory memories that may store the camera head position data 240. As the utility locator device 280 may have a position known via the GNSS receiver and/or other positioning element 292. Likewise, the position of the camera head 210 may be known via the method 300 of FIG. 3. It should be noted that not all embodiments rely upon positions or geolocations in a geographic coordinate system having latitude and longitude measurements and the camera head position data may be a distance and direction relative to the cable storage drum, entry point to the pipe or other cavity, or other reference point. Based on these known positions, the utility locator device 280 may direct a user towards the position of the camera head 210. For instance, the utility locator device 280 may include a display 295 to visually indicate direction towards the camera head (e.g., as illustrated with the visual indicator 285 of FIG. 2A, the visual indicator 320 of FIG. 3, or via the visual indicator 687 FIGS. 6A and 6B), provide audio directions via a speaker 296, and/or haptic feedback via a haptic feedback mechanism 297. The utility locator device 280 may further include a battery 298 or, in alternative embodiments, other power source for supplying electrical current. Thus, in the video inspection and camera head tracking system 200 a user may avoid the difficult, time consuming, and often frustrating procedure of wandering about inspection area in hopes of sensing the signal 218 with the utility locator device 280.

Figure 3:
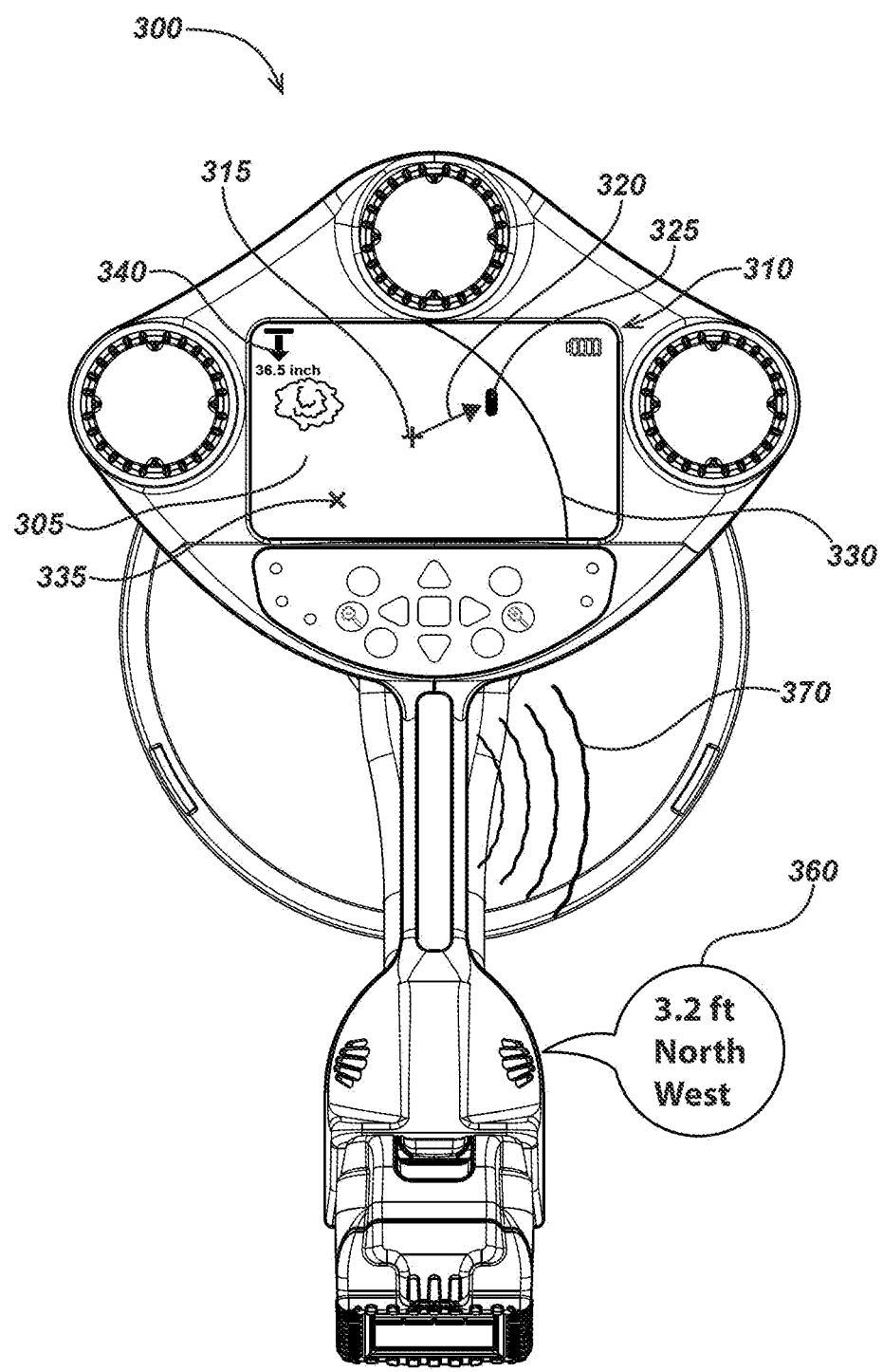
FIG. 3 is a utility locator device with an example display.

Turning to FIG. 3, a utility locator device 300 is illustrated which may be or share aspects with the utility locator device 280 of FIGS. 2A and 2B or other utility locator devices of the present disclosure. The utility locator device 300 is illustrated having a digital map 305 of the inspection area represented on a display 310 (e.g., graphical interface or the like). The display 310 may include a reticle 315 representative of the position of the utility locator device 300 and a visual indicator 320 directing towards a pipe Sonde position 325 in the inspection area. In some embodiments, a camera head range 330 describing the maximum range from the cable drum position 335 in which a camera head may be found. The camera head range 330 is illustrated containing the pipe Sonde position 325 may be represented based on a circumference about the cable storage drum position 335 where the radius is defined by push-cable payout data 255 of FIGS. 2A and 2B. The utility locator device 300 may further provide audio directions 360 and/or haptic feedback 370 for directing a user towards the camera head position. In some embodiments, the display of a utility locator device may include or instead be that disclosed in U.S. Pat. No. 7,332,901, issued Feb. 19, 2008, entitled LOCATOR WITH APPARENT DEPTH INDICATION; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,057,754, issued Jun. 16, 2015, entitled ECONOMICAL MAGNETIC LOCATOR APPARATUS AND METHOD; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 29/692,937, filed May 29, 2019, entitled BURIED OBJECT LOCATOR; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,690,795, issued Jun. 23, 2020, entitled LOCATING DEVICES, SYSTEMS, AND METHODS USING FREQUENCY SUITES FOR UTILITY DETECTION; and U.S. Pat. No. 10,809,408, issued Oct. 20, 2020, entitled DUAL SENSED LOCATING SYSTEMS AND METHODS; and/or other disclosed in the incorporated patents and applications. The content of each of these applications is incorporated by reference herein in its entirety.

Figure 4:
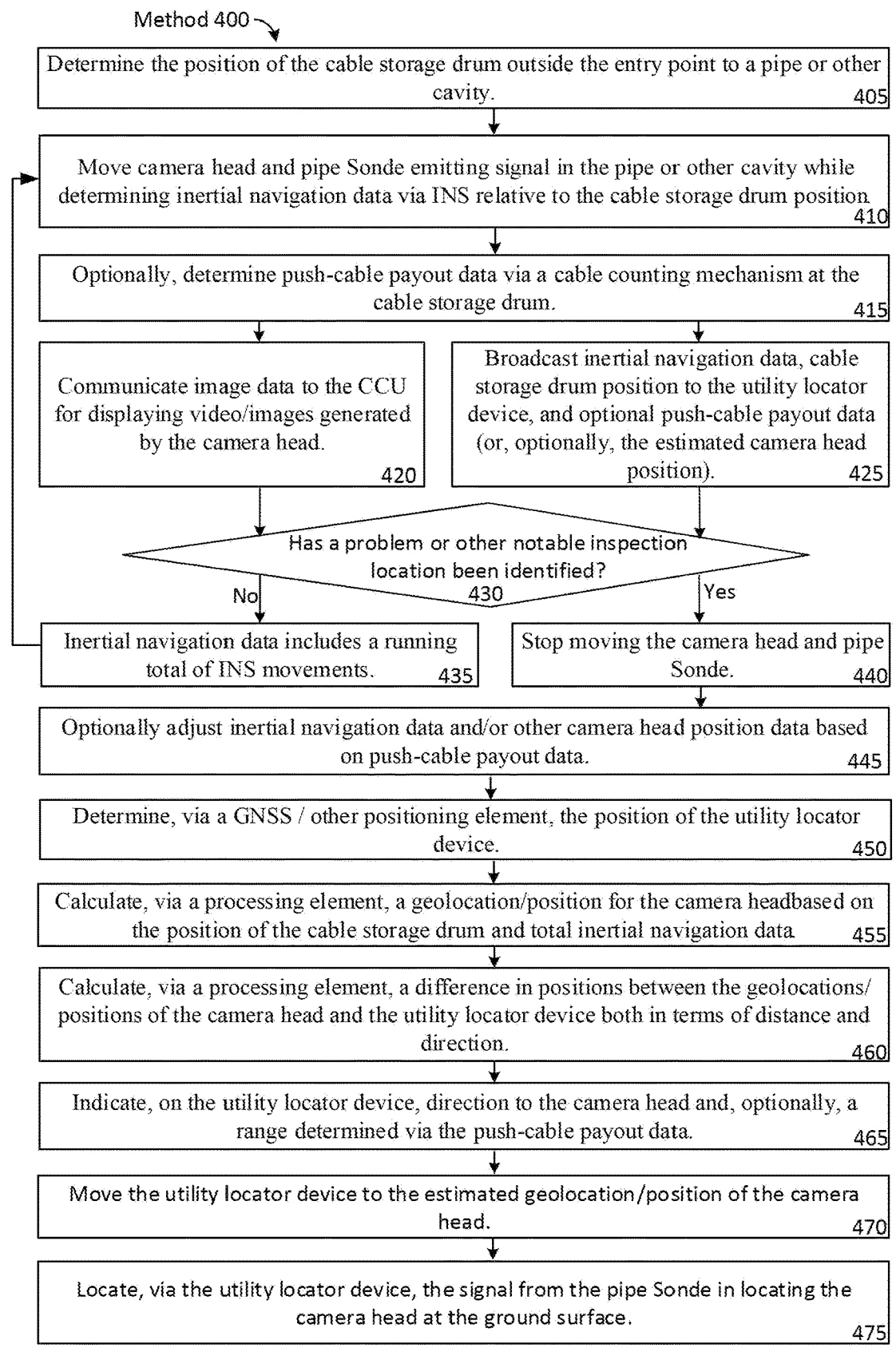
FIG. 4 is a method to guide a user to a pipe Sonde signal via the video inspection and camera head tracking system.

Turning to FIG. 4, a method 400 is disclosed to direct a user towards the position of a camera head via a video inspection and camera head tracking system. In a step 405, the method 400 may include determining the position of the cable storage drum outside the entry point to a pipe or other cavity. For instance, the cable storage drum may include a GNSS receiver and other positioning elements to determine a geolocation/position and a pose or heading at that geolocation/position (e.g., the GNSS receiver and/or other positioning element 252 of FIG. 2B). Further, in some embodiments, a user may select a geolocation from an electronic map (e.g., the cable storage drum position 1240 of FIG. 12). Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point. In a step 410, a camera head and pipe Sonde emitting signal may be moved in the pipe or other cavity while determining inertial navigation data via INS relative to the cable storage drum position. In an optional step 415, the method 400 may include determining push-cable payout data via a cable counting mechanism at the cable storage drum. In a step 420, image data may be communicated to the CCU for displaying video/images generated by the camera head. In a step 425 concurrent with the step 420, the method 400 may include broadcasting inertial navigation data, cable storage drum position, and optional push-cable payout data (or, optionally, the determined camera head position) to the utility locator device. For instance, in some embodiments, the inertial navigation data, cable storage drum position, and optional push-cable payout data may be broadcast and later processed to determine the position of the camera head. In some embodiments, the position of the camera head may be estimated via the inertial navigation data, cable storage drum position, and optional push-cable payout data at the cable storage drum or other connected device and an estimated camera head position may be broadcasted as further disclosed in the method 1900 of FIG. 19. In a decision step 430, it should be determined if a problem or other notable inspection location has been identified. If a problem or other notable inspection location has not been identified in the decision step 430, a block 435 may indicate that the inertial navigation data may include a running total of movements determined through the INS before repeating back at the step 410. If, in the decision step 430 a problem or other notable inspection location has been identified the method 400 may proceed to a step 440 where the movement of the camera head and pipe Sonde may stop. In an optional step 445, inertial navigation data and/or other camera head position data may be adjusted by push-cable payout data. For instance, adjust the inertial navigation data or other camera head position data proportionately along each dimension such that the total length of movements by the inertial navigation data matches the push-cable payout data. It should be notated, the "other camera head position data" may include estimated camera head positions as optionally determined via the step 425. In a step 450, the position of the utility locator device may be determined by a GNSS receiver and/or other positioning element. For instance, the utility locator device position may include a geolocation/position as well as orientation or pose at that geolocation/position. Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point. In a step 455, a geolocation/position for the camera head may be calculated based on the position of the cable storage drum and the total inertial navigation data. In a step 460, a difference in positions between the geolocations/positions of the camera head and the utility locator device may be calculated via a processing element both in terms of distance and direction. In a step 465, the direction to the camera head is indicated and, optionally, a range from the cable-storage drum to the camera head may be indicated. In a step 470, the utility locator device may be moved to the estimated geolocation/position of the camera head determined via the inertial navigation data. In a step 470, the method 400 may include locating the signal emitted by a pipe Sonde with the utility locator device. Once the pipe Sonde signal is found via the method 400 at the utility locator device, a user may continue locating via the pipe Sonde signal, via the inertial navigation data, or via both the pipe Sonde signal and the inertial navigation data.

Figure 5:
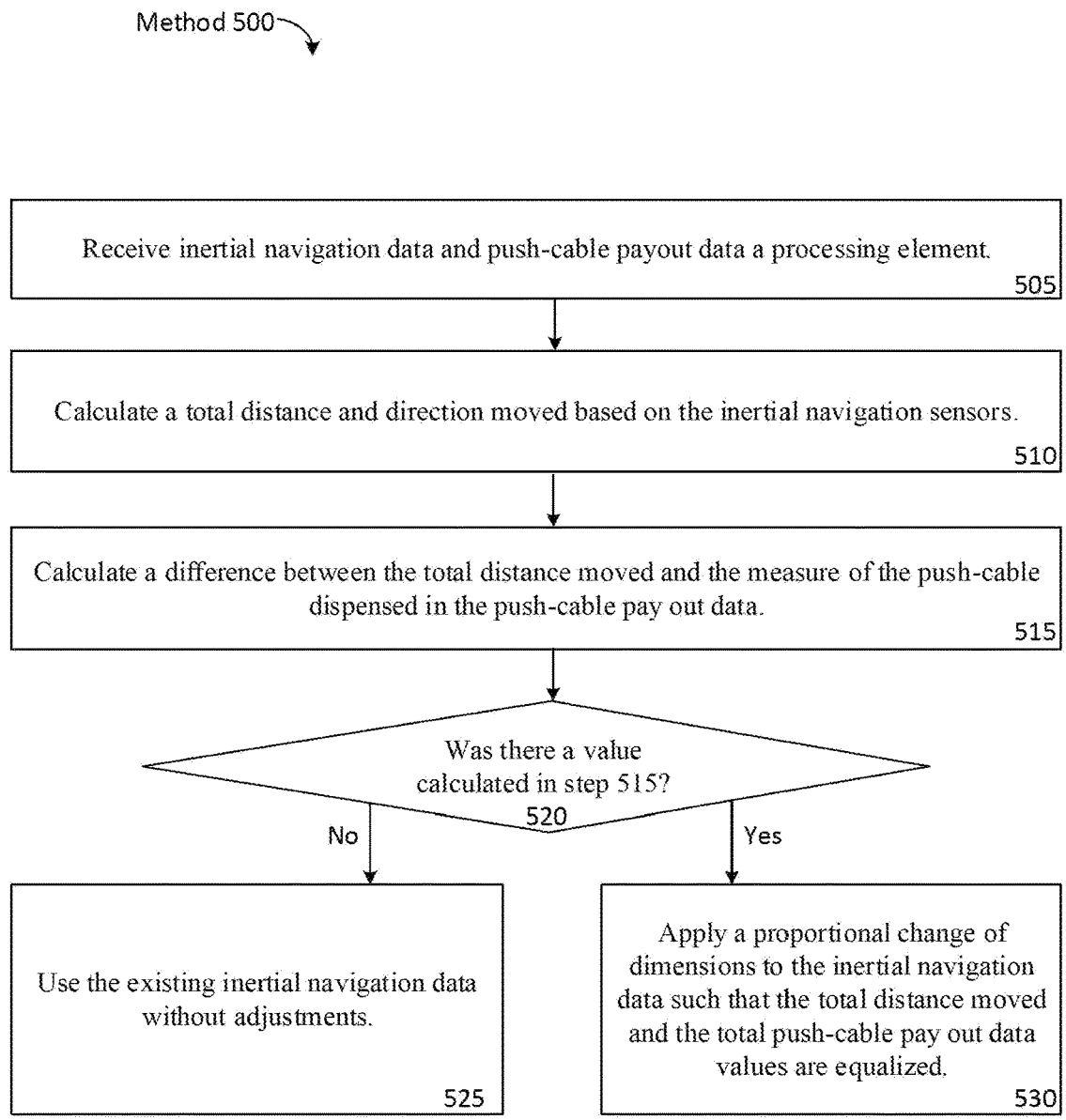
FIG. 5 is a method for adjusting inertial navigation data based on push-cable payout data.

Turning to FIG. 5, a method 500 is disclosed for correcting inertial navigation data based on push-cable payout data. In a step 505, inertial navigation data and push-cable payout data may be received at a processing element. For instance, the inertial navigation data may be inertial navigation data 245 of the INS 241 of FIG. 2B. The push-cable payout data may be the push-cable payout data 255 of FIG. 2B. The processing element may be the processing element 293 in the utility locator device 280 in FIG. 2B or, in other embodiments, a processor in a cloud server (e.g., the cloud server 799 of FIGS. 7A and 7B) or another computing device. In a step 510, a total distance and direction moved may be calculated based on the inertial navigation data of the camera head. For instance, continuing with the prior example, the absolute value of every movement measured via the INS 241 may be added together to result in the total distance moved. In a step 515, the method 500 may calculate a difference between the total distance moved and the measure of the push-cable dispensed in the push-cable pay out data. For instance, the total distance moved determined via inertial navigation data 245 may be subtracted from the measure of the push-cable 220 (FIG. 2B) dispensed in the push-cable pay out data 255 (FIG. 2B). In a decision step 520, a decision may occur whether there was a value calculated in step 515. In a step 525, if there is no difference determined in step 520, the method 500 may conclude in using the existing inertial navigation data without adjustments. If there is a difference determined in step 520, in a step 530 the method 500 may apply a proportional change of dimensions to the inertial navigation data such that the total distance moved, and the total push-cable pay out data values are equalized.

Figure 6B:
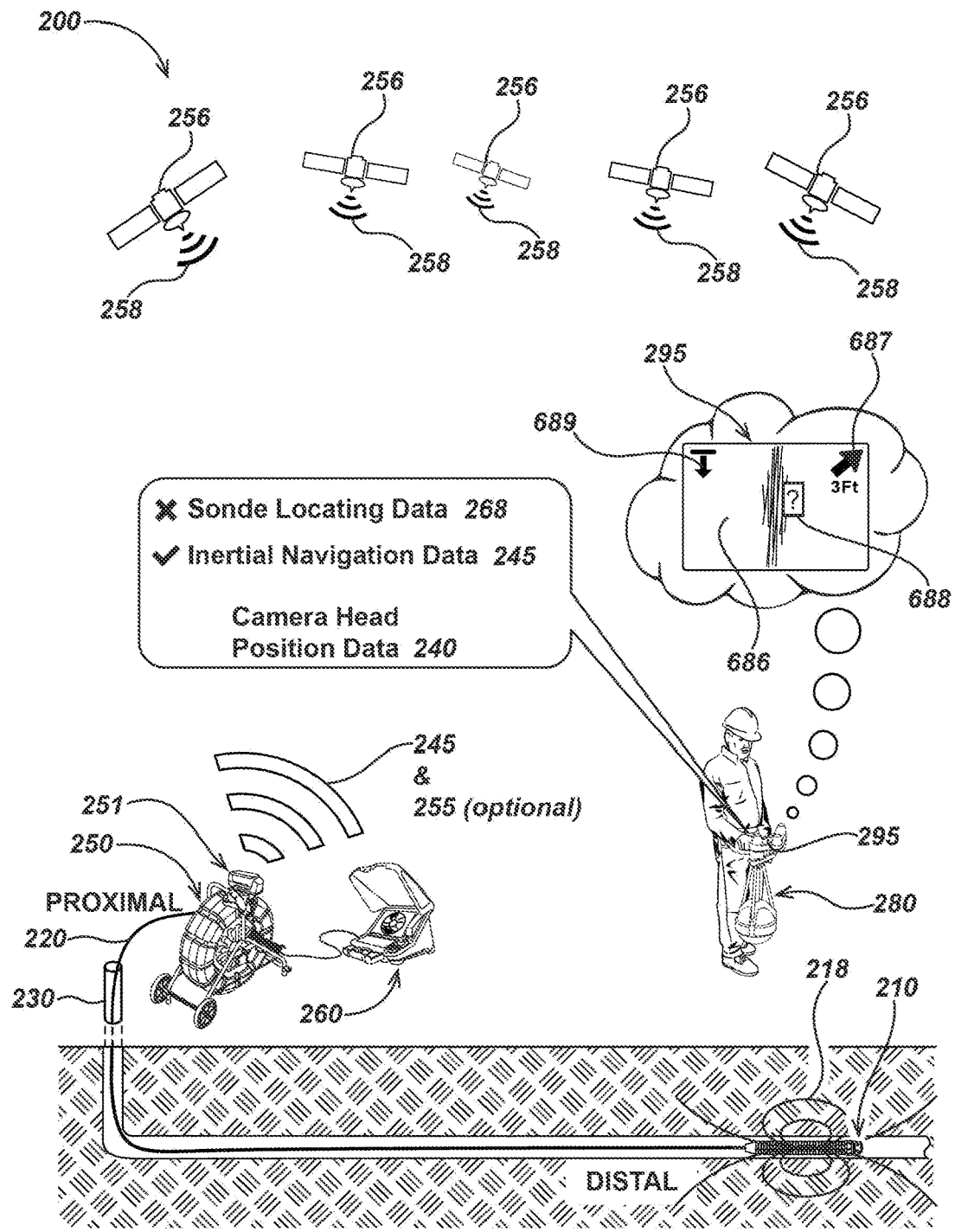
FIG. 6B is another illustration of the video inspection and camera head tracking system for use in pipe or other cavities from FIG. 2A during a line tracing procedure.

The video inspection and camera head tracking system 200 is further illustrated in FIGS. 6A and 6B. A video inspection and camera head tracking system of the present invention, such as the video inspection and camera head tracking system 200 illustrated in FIGS. 6A and 6B, may further be used during line tracing or in other pipe inspection operations in which tracking a camera head as the inspection continues into the pipe or other cavity may occur.

As illustrated in FIG. 6A, the camera head position data 240 may include both the inertial navigation data 245 and the Sonde locating data 268 for locating and tracking the camera head 210. The utility locator device 280 may, in some embodiments, utilize both the inertial navigation data 245 and the Sonde locating data 268, utilize just the Sonde locating data 268, or just the inertial navigation data 245 for locating and tracking the camera head 210. In some embodiments, the utility locator device (e.g., the utility locator device 280) may favor locating a camera head (e.g., the camera head 210) via Sonde locating data and may opt to utilize inertial navigation data only when the utility locator device may not be in range of a signal (e.g., the signal 218) from a pipe Sonde (e.g., the pipe Sonde of FIG. 2B). As further shown in FIG. 6A, the display 295 of the utility locator device 210 may include a digital map 686 further including a visual indicator 687 directing towards a Sonde position icon 688 representative of the camera head 210 position relative to the utility locator device 210. Further, the display 295 may include a depth indicator 689 to notate a depth of the camera head 210 in the ground.

Turning to FIG. 6B, as the inspection and line tracing procedure continues, the camera head 210 may be moved further through the pipe 230 and the signal 218 may, for various reasons (e.g., interference, environmental conditions, malfunction, or the like), fail to reach the utility locator device 210. In such an instance, the utility locator device 210 may utilize just the inertial navigation data 245 for locating and tracking the camera head 210. As further shown on the display 295 of the utility locator device 210, the Sonde position icon 688, which may be informed via the Sonde locating data 268, may be blurred or otherwise indicate as having some ambiguity in position. The visual indicator 687, being informed via the inertial navigation data 245, may still direct toward the position of the camera head 210 without Sonde locating data 210. It should be noted that, upon again receiving the signal 218 at the utility locator device 210, the utility locator device may continue utilizing the Sonde locating data 268 or a combination of the inertial navigation data 245 and the Sonde locating data 268 for locating and tracking the camera head 210.

Figure 7A:
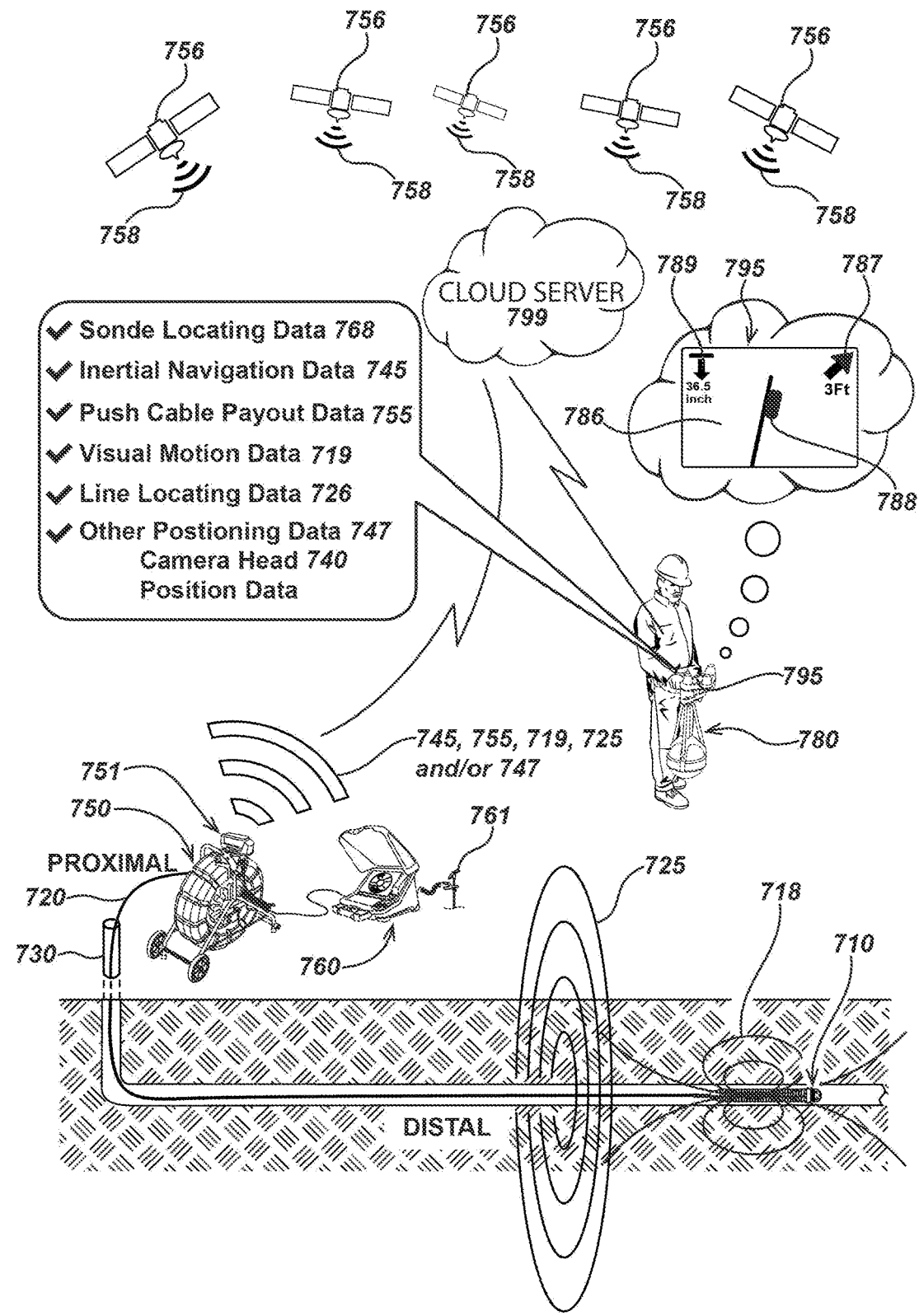
FIG. 7A is an illustration of the video inspection and camera head tracking system for use in pipes or other cavities.
Figure 7B:
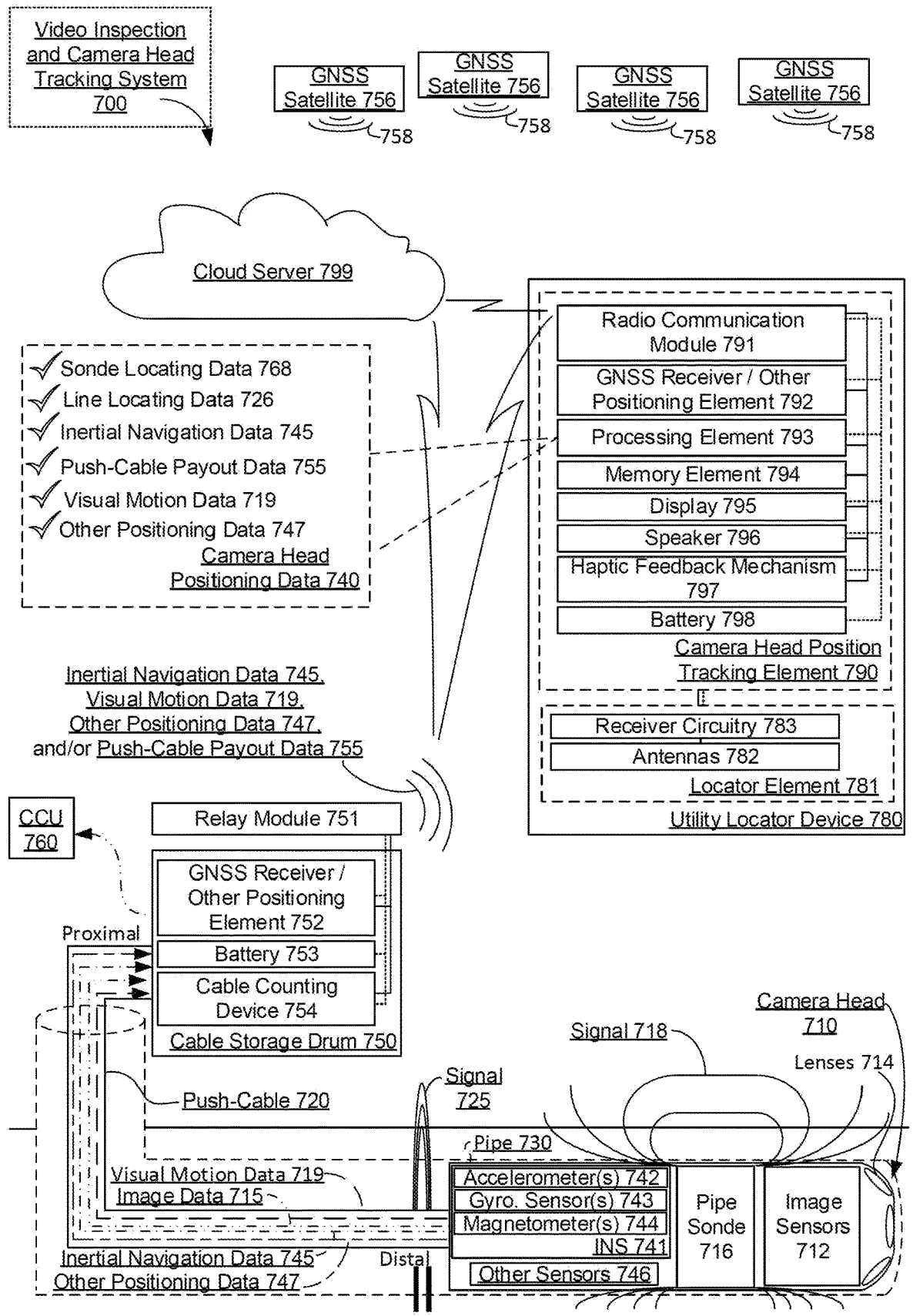
FIG. 7B is a diagram of the video inspection and camera head tracking system for use in pipe or other cavities from FIG. 7A.

In some system embodiments, camera head position data may additionally or instead be sourced from other sensors and apparatus beyond Sonde locating data and inertial navigation data. As illustrated in FIGS. 7A and 7B, a video inspection and camera head tracking system 700 is illustrated which may be used in inspecting inside of pipes and other cavities while simultaneously tracking camera head positions which may share aspects with the camera head tracking system 200 of FIGS. 2A and 2B. The video inspection and camera head tracking system 700 may include a camera head 710 coupled at a distal end of a push-cable 720 that may be moved through a pipe 730. The camera head 710 may be or share aspects with the cameras disclosed in U.S. Pat. No. 6,831,679, entitled VIDEO CAMERA HEAD WITH THERMAL FEEDBACK LIGHTING CONTROL issued Dec. 14, 2004; U.S. Pat. No. 8,587,648, entitled SELF-LEVELING CAMERA HEAD, issued Nov. 9, 2013; U.S. Pat. No. 9,066,446, entitled THERMAL EXTRACTION ARCHITECTURE FOR CAMERA HEAD, INSPECTION SYSTEMS, AND OTHER DEVICES AND SYSTEMS issued Jun. 23, 2015; U.S. Pat. No. 9,277,105, entitled SELF-LEVELING CAMERA HEADS, issued Mar. 1, 2016; U.S. Pat. No. 9,824,433 entitled PIPE INSPECTION SYSTEM CAMERA HEADS, issued on Nov. 21, 2017; U.S. Pat. No. 9,835,564, entitled MULTI-CAMERA PIPE INSPECTION APPARATUS, SYSTEM, AND METHODS, issued Dec. 5, 2017; U.S. Pat. No. 10,288,997, entitled ROTATING CONTACT ASSEMBLIES FOR SELF-LEVELING CAMERA HEADS, issued May 14, 2019; U.S. Pat. No. 10,715,703, entitled SELF-LEVELING CAMERA HEADS, issued Jul. 14, 2020; U.S. Pat. No. 10,848,655, entitled HEAT EXTRACTION ARCHITECTURE FOR COMPACT VIDEO CAMERA HEADS, issued Nov. 24, 2020; U.S. Pat. No. 11,209,115, entitled PIPE INSPECTION AND/OR MAPPING CAMERA HEADS, SYSTEMS, AND METHODS, issued Dec. 28, 2021; and/or other disclosed in the incorporated patents and applications. The content of each of these applications is incorporated by reference herein in its entirety.

The push-cable 720 may be or share aspects with those disclosed in U.S. Pat. No. 5,939,679, entitled VIDEO PUSH CABLE, issued Aug. 17, 1999; U.S. patent application Ser. No. 14/970,362, entitled COAXIAL VIDEO PUSH-CABLES FOR USE IN INSPECTION SYSTEMS, filed Dec. 15, 2015; U.S. Pat. No. 9,448,376, entitled HIGH BANDWIDTH PUSH-CABLES FOR VIDEO INSPECTION SYSTEMS, issued Sep. 20, 2016; U.S. Pat. No. 9,468,954, entitled PIPE INSPECTION SYSTEM INCLUDING JETTER PUSH-CABLE, issued Oct. 18, 2016; U.S. Pat. No. 10,764,541, entitled COAXIAL VIDEO PUSH-CABLES FOR USE IN INSPECTION SYSTEMS, issued Sep. 1, 2020; and/or other disclosed in the incorporated patents and applications. The content of each of these applications is incorporated by reference herein in its entirety.

Referring to FIG. 7B, the camera head 710 may include one or more image sensors 712 and lenses 714 to capture video and images from the interior of the pipe 730. The captured video and/or images from the interior of the pipe 730, an image data 715, may be communicated via the push-cable 720 to a cable storage drum 750 coupled at the proximal end of the push-cable 720 outside the entry point to the pipe 730 and then further onto a CCU 760 for displaying the video/images of the image data 715 as well as control aspects of the camera head 710. The CCU 760 may be or share aspects with those disclosed in U.S. Pat. No. 10,084,945, entitled CABLE STORAGE DRUM WITH MOVEABLE CCU DOCKING APPARATUS, issued Sep. 25, 2018; U.S. patent application Ser. No. 17/190,400, filed Mar. 3, 2021, entitled DOCKABLE CAMERA REEL AND CCU SYSTEM; and/or other disclosed in the incorporated patents and applications. The content of each of these applications is incorporated by reference herein in its entirety. The CCU 760 illustrated in FIG. 7B may include a transmitter element for coupling current with the push-cable 720 in generating a signal 725. Further, a ground stake 761 may be connected with the CCU 760 for accepting ground return current. In other embodiments, a separate transmitter device may be included in a system for coupling electrical current onto a push-cable, such as the push-cable, or a pipe, such as the pipe 730. The transmitter element in the CCU 760 or other transmitter device that may be used with a system of the present disclosure may be or share aspects with U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTILITY LOCATOR INCLUDING A CAMERA; U.S. patent Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; and/or other disclosed in the incorporated patents and applications. The content of each of these applications is incorporated by reference herein in its entirety.

One or more of an INS 741 may determine positions of the camera head 710 relative to the cable storage drum 750. The INS 741 may be or include, but should not be limited to, accelerometers 742, gyroscopic sensors 743, and magnetometers 744 that may measure in three dimensions for generating inertial navigation data 745. In some embodiments, the INS may include one or more barometers (not illustrated). Inertial navigation data, such as the inertial navigation data 745 of FIG. 7B, may, in various embodiments, be included in a camera head position data 740. The inertial navigation data 745 may be communicated, via the push-cable 720, to the cable storage drum 750 coupled at the proximal end of the push-cable 720 outside the entry point to the pipe 730.

The camera head 710, via processing of the image data 715, may further generate visual motion data 719 that may also be included in the camera head position data 740. For instance, adjacent video frames may be compared and, through motion estimation algorithms (e.g., block-matching, optical flow, corner detection, or the like), determine direction and distance for movements of the camera head 710. The visual motion data 719 may be communicated, via the push-cable 720, to the cable storage drum 750 coupled at the proximal end of the push-cable 720 outside the entry point to the pipe 730.

Further, the camera head 710 may include one or more other sensors 746 for generating other positioning data 747. For instance, the other sensors 747 may include, for instance LiDAR, acoustic motion sensors, or the like producing the other positioning data 747 for tracking movements of the camera head 710. The other positioning data 747 may be communicated, via the push-cable 720, to the cable storage drum 750 coupled at the proximal end of the push-cable 720 outside the entry point to the pipe 730.

The cable storage drum 750 may further include a radio communication module (e.g., Bluetooth, Wi-Fi, ISM, or the like), such as a relay module 751, to wirelessly communicate the inertial navigation data 745, visual motion data 719, other positioning data 747, and a push-cable payout data 755 relative to the position of the cable storage drum 750. The relay module 741 may be or share aspects with those disclosed in U.S. patent application Ser. No. 17/528,956, filed Nov. 17, 2021, entitled VIDEO INSPECTION SYSTEM APPARATUS AND METHODS WITH RELAY MODULE AND CONNECTION PORTS and/or others disclosed in the incorporated patents and applications. The content of the application is incorporated by reference herein in its entirety. In other embodiments, such a radio communication module may instead or additionally be disposed in the cable storage drum or other connected ground surface device (e.g., such as the CCU 760)

Still referring to FIG. 7B, it should be noted that the position of the cable storage drum 750 may be known. For instance, the cable storage drum 750 may include a GNSS receiver and/or other positioning element 752 for determining a position (e.g., geolocation/position plus orientation or pose at the geolocation/position). The GNSS receiver and/or other positioning element 752 may receive navigation signals 758 from a plurality of GNSS satellites 756 to generate a position via a geographic coordinate system. Likewise, the other positioning element of the GNSS receiver and/or other positioning element 752 may include one or more other positioning sensors or apparatus. In some embodiments, the GNSS receiver and/or other positioning element 752 may include one or more magnetometers and/or other inertial navigation sensors (not illustrated) for determining a heading at the geolocation/position determine via the GNSS receiver. In some embodiments, such geolocation/position positions may instead or additionally include an input allowing a user to select the position of a cable storage drum (e.g., the cable storage drum position 1240 of FIG. 12). Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point. The cable storage drum 750 may further include a battery 753 or, in alternative embodiments, other power source for supplying electrical current. Optionally, the cable storage drum 750 may include a cable counting device 754 for generating a push-cable payout data 755 that may be a measure the length of push-cable 720 dispensed into the pipe 730 or another cavity. The cable counting device 754 may be or share aspects with those disclosed in U.S. Pat. No. 8,970,211, issued Mar. 3, 2015, entitled PIPE INSPECTION CABLE COUNTER AND OVERLAY MANAGEMENT SYSTEM and/or others disclosed in the incorporated patents and applications. The content of each which is incorporated by reference herein in its entirety. In such embodiments, the push-cable payout data 755 from the cable counting device 754 may be used to verify the total length of movements by the inertial navigation data 745, as disclosed in the method 500 of FIG. 5, and optionally generate a camera head range describing the maximum range from the cable storage drum 750 in which the camera head 710 may be found. The camera head range optionally may be communicated to a user via a display (e.g., the camera head range 330 of the display 310 illustrated in FIG. 3).

The utility locator device 780 may include a locator element 781 further having one or more antennas 782 and a receiver circuitry 783 which may, for example, include one or more buffers, amplifiers, signal conditioners, analog-to-digital (A/D) converters, multiplexers, and the like to provide filtering functionality, signal conditioning, or the like for outputs to the processing element 793 and determine the emission location of a signal 718 emitted by a pipe Sonde 716 for determining a Sonde locating data 768. Likewise, the utility locator device 790 may determine the emission location of a signal 725 emitted by the push-cable 720 and/or the pipe 720 wherein current is coupled thereto. This data may be referred to herein as "line locating data" such as a line locating data 726 illustrated in FIG. 7B. For instance, the signal 725 is emitted by the push-cable 720 wherein the CCU 760 includes signal transmitter functionality for coupling current with the push-cable 720 sensed by the utility locator device 790 in generating the line locating data 726. In other embodiments, other transmitter devices (e.g., those transmitters of the incorporated patents and applications) may couple a signal onto a pipe or push-cable in generating such line locating data.

Referring back to FIG. 7B, the utility locator device 790 may be or share aspects with those disclosed U.S. Pat. No. 7,332,901, issued Feb. 19, 2008, entitled LOCATOR WITH APPARENT DEPTH INDICATION; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,057,754, issued Jun. 16, 2015, entitled ECONOMICAL MAGNETIC LOCATOR APPARATUS AND METHOD; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 29/692,937, filed May 29, 2019, entitled BURIED OBJECT LOCATOR; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,690,795, issued Jun. 23, 2020, entitled LOCATING DEVICES, SYSTEMS, AND METHODS USING FREQUENCY SUITES FOR UTILITY DETECTION; and U.S. Pat. No. 10,809,408, issued Oct. 20, 2020, entitled DUAL SENSED LOCATING SYSTEMS AND METHODS; and/or others disclosed in the incorporated patents and applications. The content of each of these applications is incorporated by reference herein in its entirety.

The pipe Sonde 716 may be at a known position inside the camera head 710 or, in some embodiments, at a known position outside the camera head on the push-cable. The pipe Sonde 716 may be or share aspects with those disclosed in U.S. Pat. No. 7,009,399, issued Mar. 7, 2006, entitled OMNIDIRECTIONAL SONDE AND LINE LOCATOR; U.S. Pat. No. 7,221,136, issued May 22, 2007, entitled SONDES FOR LOCATING UNDERGROUND PIPES AND CONDUITS; U.S. Pat. No. 7,298,126, issued Nov. 20, 2007, entitled SONDES FOR LOCATING UNDERGROUND PIPES AND CONDUITS; U.S. Pat. No. 7,336,078, issued Feb. 26, 2008, entitled MULTI-SENSOR MAPPING OMNIDIRECTIONAL SONDE AND LINE LOCATOR; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,864,980, issued Jan. 4, 2011, entitled SONDES FOR LOCATING UNDERGROUND PIPES AND CONDUITS; U.S. Pat. No. 8,035,390, issued Oct. 11, 2011, entitled OMNIDIRECTIONAL SONDE AND LINE LOCATOR; U.S. patent application Ser. No. 14/027,027, filed Sep. 13, 2013, entitled SONDE DEVICES INCLUDING A SECTIONAL FERRITE CORE STRUCTURE; U.S. Pat. No. 9,411,066, issued Aug. 9, 2016, entitled SONDES & METHODS FOR USE WITH BURIED LINE LOCATOR SYSTEMS; U.S. Pat. No. 9,798,033, issued Oct. 24, 2017, entitled SONDE DEVICES INCLUDING A SECTIONAL FERRITE CORE; U.S. patent application Ser. No. 16/792,047, filed Feb. 14, 2020, entitled SATELLITE AND MAGNETIC FIELD SONDE APPARATUS AND METHODS; U.S. Pat. No. 10,761,233, issued Sep. 1, 2020, entitled SONDES AND METHODS FOR USE WITH BURIED LINE LOCATOR SYSTEMS; and/or others disclosed in the incorporated patents and applications. The content of each of these applications is incorporated by reference herein in its entirety.

In order to locate the camera head 710, the utility locator device 780 may receive the inertial navigation data 745 as well as various other camera head position data (e.g., the visual motion data 719, the push-cable payout data 755, and/or other positioning data 747) via a camera head tracking element 790 having a radio communication module 791 (e.g., Bluetooth, Wi-Fi, ISM, or the like). A GNSS receiver and/or other positioning element 792 may be included for determining a geolocation/position for the utility locator device 780. The other positioning element of the GNSS receiver and/or other positioning element 792 may, for instance, be or include gyroscopic sensors, accelerometers, magnetometers, other inertial navigation sensors, or the like. For instance, a pose or orientation in three-dimensional space may be determined via inertial navigation sensors in the GNSS receiver and/or other positioning element 792 for the utility locator device 780. Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point. In some embodiments, the INS may include one or more barometers (not illustrated). In some embodiments, the other positioning element of the GNSS receiver and/or other positioning element 792 may be or include the apparatus, systems, and methods disclosed in U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,784,837, issued Oct. 10, 2017, entitled OPTICAL GROUND TRACKING APPARATUS, SYSTEMS & METHODS; U.S. patent application Ser. No. 15/811,361, filed Nov. 13, 2017, entitled OPTICAL GROUND-TRACKING APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/936,250, filed Mar. 26, 2018, entitled GROUND TRACKING APPARATUS, SYSTEMS, AND METHODS; U.S. Pat. No. 9,928,613, issued Mar. 27, 2018, entitled GROUND TRACKING APPARATUS, SYSTEMS, AND METHODS; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; and/or other disclosed in the incorporated patents and applications. The content of each of these applications is incorporated by reference herein in its entirety.

Still referring to FIG. 7B, a processing element 793, having one or more processors, may process the camera head position data 740 including the Sonde locating data 768, the inertial navigation data, the visual motion data 719, the other positioning data 747, and the push-cable payout data 755 relative to the geolocation/position data of the utility locator device 780 to locate and track the camera head 710. As the video inspection and camera head tracking system 700 includes a multitude of source inputs for the camera head position data 740, a method may account for differences in results between the camera head position data 740 including the Sonde locating data 768, the inertial navigation data, the visual motion data 719, the other positioning data 747, and the push-cable payout data 755 for determining a position for the camera head 710. For instance, the position of the camera head 710 may be determined via the method 800 of FIG. 8.

Referring to FIG. 7B, the utility locator device 780 may further include a memory element 794 having one or more non-transitory memories that may store the camera head position data 740. As the utility locator device 780 may have a position known via the GNSS receiver and/or other positioning element 792 and the position of the camera head 710 may be known via the method 800 of FIG. 8, the utility locator device 780 may direct a user towards the position of the camera head 710. For instance, the utility locator device 780 may include a display 795 to visually indicate direction towards the camera head. Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point. As illustrated in FIG. 7B, the display 795 of the utility locator device 710 may include a digital map 786 further including a visual indicator 787 directing towards a Sonde position icon 788 representative of the camera head 710 position relative to the utility locator device 710. Further, the display 795 may include a depth indicator 789 to notate a depth of the camera head 210 in the ground. The utility locator device 710 may further provide audio directions via a speaker 796, and/or haptic feedback via a haptic feedback mechanism 797. The utility locator device 780 may further include a battery 798 or, in alternative embodiments, other power source in supplying electrical current.

Further illustrated, the utility locator device 780 and/or the relay module 751 coupled with the cable storage drum 750 may further be wireless connected with each other as well as a remote server such as a cloud server 799. The cloud server 799 may optionally store camera head position data as well as related mapping data for further communication with inspection systems that may be present in the same area in the future as well as other smartphones, tablet computer, laptops, and other devices.

Figure 8:
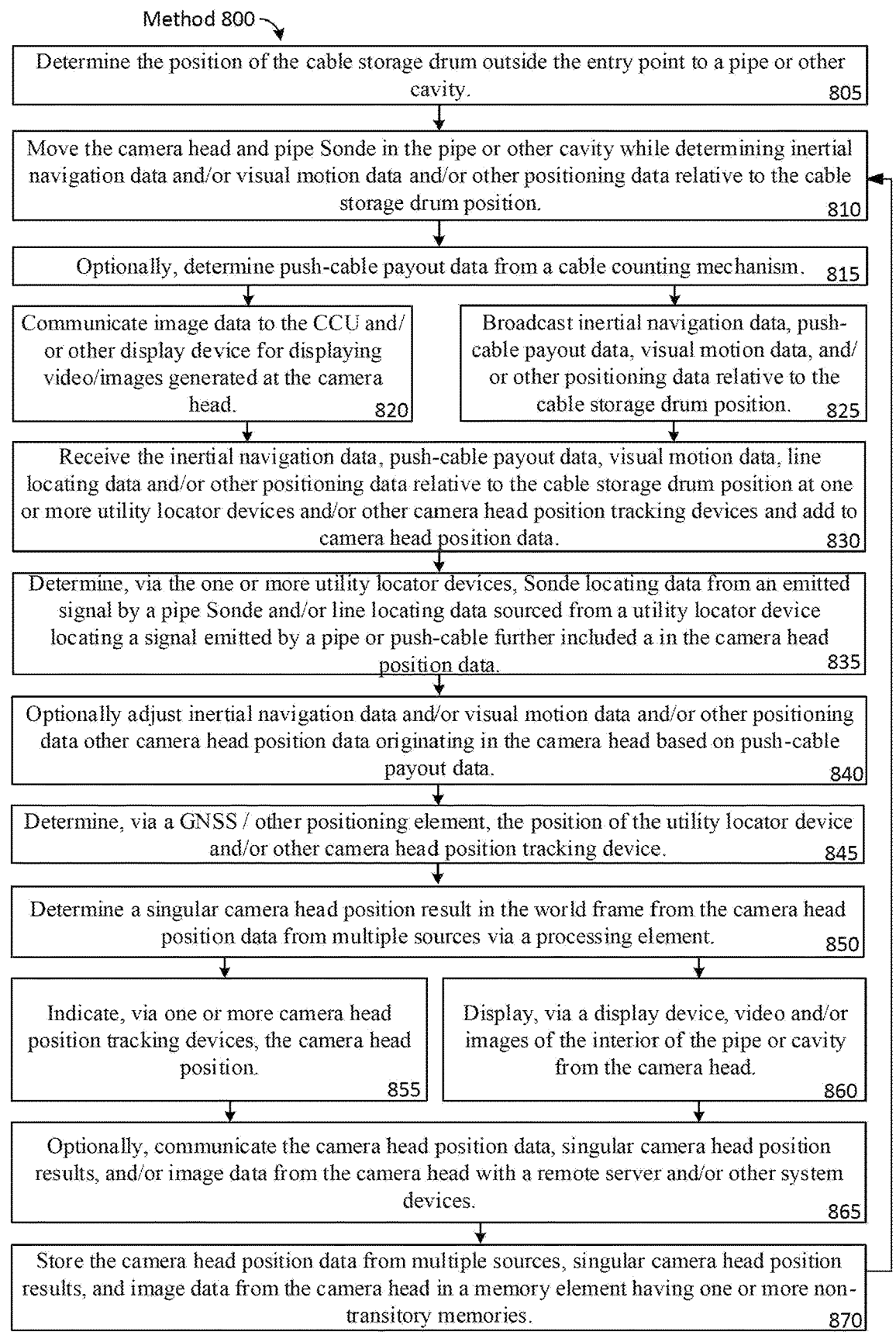
FIG. 8 is a method for determining the camera head position via the video inspection and camera head tracking system.

Turning to FIG. 8, a method 800 is disclosed for determining a singular camera head position result from a video inspection and camera head tracking system of the present invention which may have a multitude of camera head position data sources. In a step 805, the method 800 may include determining the position of the cable storage drum outside the entry point to a pipe or other cavity. For instance, the step 805 may include the use of a GNSS receiver and/or other positioning element (e.g., the GNSS receiver and/or other positioning element 252 of FIG. 2B or the GNSS receiver and/or other positioning element 752 of FIG. 7B) for determining the geolocation/position of the broadcast element. In some embodiments, a user may instead indicate the position of the broadcast element on an electronic map such as that illustrated with the cable storage drum position 1240 of FIG. 12. It should be noted not all embodiments herein rely upon positions or geolocations in a geographic coordinate system having latitude and longitude measurements and the camera head position data may be a distance and direction relative to the cable storage drum, entry point to the pipe or other cavity, or other reference point.

In a step 810, the camera head and pipe Sonde may be moved in the pipe or other cavity while determining inertial navigation data and/or visual motion data and/or other positioning data relative to the cable storage drum position. In an optional step 815, push-cable payout data may be determined from a cable counting mechanism. In a step 820, the image data generated at the camera head may be communicated to a CCU and/or other display device. In some embodiments, the step 820 may include communicating the image data to a CCU (e.g., the CCU 260 of FIGS. 2A and 2B or the CCU 760 of FIGS. 7A and 7B) to display video and images generated at the camera head. In some embodiments, the step 820 may include wirelessly communicating image data (e.g., via Bluetooth, Wi-Fi, ISM, of a radio communication module or relay module) to one or more remotely connected display devices (e.g., a tablet, smartphone, laptop, utility locator device, remote or cloud server, or the like having a display for displaying video and images from inside the pipe or cavity). In a step 825 concurrent with the step 820, the inertial navigation data, push-cable payout data, visual motion data, and/or other positioning data relative to the cable storage drum position may be received by one or more utility locator device and/or other camera head tracking devices. In a step 830, the method 800 may include receiving the inertial navigation data, push-cable payout data, visual motion data, and/or other positioning data relative to the cable storage drum position at one or more utility locator devices and/or other camera head position tracking devices and add to camera head position data. For instance, the step 830 may include receiving wirelessly broadcasted inertial navigation data, push-cable payout data, visual motion data, and/or other positioning data relative to the cable storage drum position via a radio communication module (e.g., via Bluetooth, Wi-Fi, ISM, or the like) in the utility locator device and/or other camera head tracking devices.

In a step 835, the method 800 may include determining, via one or more utility locator devices, Sonde locating data from an emitted signal by a pipe Sonde and further include the Sonde locating data and/or line locating data from a signal emitted by a push-cable or pipe in the camera head position data. In an optional step 840, the method 800 may include adjusting inertial navigation data and/or visual motion data and/or other positioning data other camera head position data originating in the camera head based on push-cable payout data. The step 840 may, for instance, be or include the use of the method 500 of FIG. 5 which may further be extended to adjusting the visual motion data and/or other positioning data other camera head position data originating in the camera head.

In a step 845, the method 800 may include determining, via a GNSS/other positioning element, the position of the utility locator device and/or other camera head position tracking device. For instance, the step 800 may include the use of a GNSS receiver and/or other positioning element (e.g., the GNSS receiver and/or other positioning element 292 of FIG. 2B or the GNSS receiver and/or other positioning element 792 of FIG. 7B) for determining the geolocation/position. It should be noted not all embodiments rely upon positions or geolocations in a geographic coordinate system having latitude and longitude measurements and the camera head position data may be a distance and direction relative to the cable storage drum, entry point to the pipe or other cavity, or other reference point.

In a step 850, a singular camera head position result may be determined from the camera head position data from multiple sources via a processing element. For instance, the step 850 may include one or more additional steps or methods (e.g., the method 900 of FIG. 9, the method 920 of FIG. 9B, and/or the method 940 of FIG. 9C) for sorting the multiple camera head position data inputs from multiple sources and resolve the multiple inputs into a singular camera head position result representative of the position of the camera head in three dimensions.

In a step 855, the method 800 may include indicating the camera head position via one or more camera head position tracking devices. The step 855 may include communicating the camera head position in various ways. For instance, the step 855 may include displaying the camera head position or otherwise direct towards a camera head position on a graphical display (e.g., the display 295 of FIG. 2B or the display 795 of FIG. 7B), provide audio directions via a speaker (e.g., the speaker 296 of FIG. 2B or the speaker 796 of FIG. 7B), and/or haptic feedback via a haptic feedback mechanism (e.g., the haptic feedback mechanism 297 of FIG. 2B or the haptic feedback mechanism 797 of FIG. 7B).

In a step 860 concurrent with the step 855, the method 800 may include displaying, via a display device, video and/or images of the interior of the pipe or cavity from the camera head. The step 860 may include displaying on a CCU connected to the cable storage drum via a wired connection to display the video and images from inside the pipe or other cavity (e.g., CCU 260 of FIGS. 2A and 2B or the CCU 760 of FIGS. 7A and 7B). Further, the display device(s) may include one or more wirelessly connected devices (e.g., the tablet 1300 of FIG. 13, the tablet 1570 of FIGS. 15A and 15B, the utility locator device 1580 of FIGS. 15A and 15B and/or other smartphone, laptop, or portable computing devices).

In an optional step 865, the method 800 may include communicating the camera head position data, singular camera head position results, and/or image data from the camera head with a remote server and/or other system devices. For instance, the Sonde locating data determined via a utility locator device may be shared with a smartphone, tablet, or the like other device. Likewise, the camera head position data, singular camera head position results, and/or image data from the camera head communicated with a remote server (e.g., the cloud server 799 of FIGS. 7A and 7B or the cloud server 1599 of FIGS. 15A and 15B).

In a step 870, the method the camera head position data from multiple sources, determined singular camera head position results, and maps that include camera head position data may be stored in a memory element having one or more non-transitory memories. For instance, the memory element may be or include the memory element 294 of FIG. 2B, the memory element 794 of FIG. 7B, and/or other memory element (e.g., a memory element in the cloud server 599 and/or other memory element in other system device that may not be illustrated).

Turning to FIG. 9A, a method 900 is disclosed for determining a singular camera head position result from the camera head position data from multiple sources via error metrics is disclosed. The method 900 may optionally be used as or be included in the step 850 of FIG. 8. In a step 902, the method 900 may include receiving, at a processing element, camera head position data from a multitude of sources such as inertial navigation data from the INS in the camera head, Sonde locating data sourced from a utility locator device locating a signal emitted by a pipe Sonde, line locating data sourced from a utility locator device locating a signal emitted by a pipe or push-cable, push-cable payout data sourced via the cable counting device of the cable storage drum, visual motion data generated via image data from the camera head, and other position data that may be sourced from other sensors sourced at the camera head.

In a step 904, error metrics may be determined for the camera head position data from each of the sources. For instance, the error metrics for camera head position data determined at the camera head (e.g., the inertial navigation data, the visual motion data and/or other positioning data and/or other camera head position data originating in the camera head) may be calculated through comparison with the push-cable payout data. Such an error metric may be determined via calculating a total distance moved based on the inertial navigation data and/or visual motion data and/or other position data sourced from the camera head. Further, a difference between the total distance moved calculated from each source and the measure of the push-cable dispensed in the push-cable pay out data may be calculated. An error metric may be determined for the inertial navigation data, the visual motion data and/or other positioning data and/or other camera head position data originating in the camera head from the difference in between the total distance moved calculated from each source and the measure of the push-cable dispensed in the push-cable pay out data may be calculated.

Likewise, an error metric for camera head position data of a utility locator device locating a pipe Sonde (e.g., the utility locator device 280 and pipe Sonde 264 of FIG. 2B or the utility locator device 780 and pipe Sonde 764 of FIG. 7B) where a predicted signal source orientation and power (e.g., that of the signal 218 of FIG. 2B or the signal 718 of FIG. 7B) may be determined based on approximate origin location and b-field values may further be determined from signals at one or more antenna arrays (e.g., the antennas 282 of the locator element 281 in the utility locator device 280 and pipe Sonde 216 of FIG. 2B or the antennas 782 of the locator element 781 in the utility locator device 780 and pipe Sonde 716 of FIG. 7B). For instance, b-field values may be b-field measurements from a tri-axial antenna array or b-field estimates from a dodecahedral antenna array given an origin location. Additional details and examples of antenna configurations are disclosed in the aforementioned patents and applications including but not limited to those disclosed in U.S. Pat. No. 7,009,399, issued Mar. 7, 2006, entitled OMNIDIRECTIONAL SONDE AND LINE LOCATOR; U.S. Pat. No. 9,488,747, issued Nov. 8, 2016, entitled GRADIENT ANTENNA COILS AND ARRAYS FOR USE IN LOCATING SYSTEM; U.S. Pat. No. 7,336,078, issued Feb. 26, 2008, entitled MULTI-SENSOR MAPPING OMNIDIRECTIONAL SONDE AND LINE LOCATOR; U.S. Pat. No. 7,498,816, issued Mar. 3, 2009, entitled OMNIDIRECTIONAL SONDE AND LINE LOCATOR; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 8,035,390, issued Oct. 11, 2011, entitled OMNIDIRECTIONAL SONDE AND LINE LOCATOR; U.S. Pat. No. 10,031,253, issued Jul. 24, 2018, entitled GRADIENT ANTENNA COILS AND ARRAYS FOR USE IN LOCATING SYSTEMS; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 11,092,712, issued Aug. 17, 2021, entitled UTILITY LOCATING SYSTEMS, DEVICES, AND METHODS USING RADIO BROADCAST SIGNALS; and/or other disclosed in the incorporated patents and applications. The content of each of these applications is incorporated by reference herein in its entirety. A set of expected field measurements may be determined from the magnetic field model of a dipole signal at the approximate signal source location having a predicted orientation and power given a known antenna array configuration, such as a dodecahedral antenna array. An error metric may be calculated where the error metric is equal to the absolute value of the measured signal values minus the expected signal values at the utility locator device. The approximate signal origin estimate may be iteratively varied, providing a corresponding update to the signal source position, until a minimum error is achieved. The set resulting in the minimized the error value may be determined, representative of the signal model for the received signal having a position (a location in space and orientation) and power wherein the minimized error is the error metric for the Sonde locating data. The calculation of error metrics for a signal source via a utility locator device may further be or share aspects with the step 904 of the method 900 of FIG. 9A may be disclosed in U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. Pat. No. 10,670,766, issued Jun. 2, 2020, entitled UTILITY LOCATING SYSTEMS, DEVICES, AND METHODS USING RADIO BROADCAST SIGNALS; U.S. patent application Ser. No. 17/845,290, filed Jun. 21, 2022, entitled DAYLIGHT VISIBLE AND MULTI-SPECTRAL LASER RANGEFINDER AND ASSOCIATED METHODS AND UTILITY LOCATOR DEVICES; and/or other disclosed in the incorporated patents and applications.

In a step 906, the method 900 may include sorting the camera head position data from the various sources based on error metrics such that the least error is first and that having the most error last in the sorted list. In a step 908, the camera head position data having the least error is selected for generating a singular camera head position result.

Turning to FIG. 9B, a method 920 is disclosed for determining a singular camera head position result from the camera head position data from multiple sources via an average or weighted average is disclosed. The method 920 may optionally be used as or be included in the step 850 of FIG. 8. In a step 922, the method 920 may include receiving, at a processing element, camera head position data from a multitude of sources such as inertial navigation data from the INS in the camera head, Sonde locating data sourced from a utility locator device locating a signal emitted by a pipe Sonde, line locating data sourced from a utility locator device locating a signal emitted by a pipe or push-cable, push-cable payout data sourced via the cable counting device of the cable storage drum, visual motion data generated via image data from the camera head, and other position data that may be sourced from other sensors sourced at the camera head. In an optional step 924, the camera head position data from each source may be weighted based on preference for the data source, error metrics, or the like. Such weighting of data may be predetermined or may be user selected. In a step 926, the method 920 may include averaging or, optionally, perform a weighted average of camera head position data from the various sources for generating a singular camera head position result.

Turning to FIG. 9C, a method 940 is disclosed for determining a singular camera head position result from the camera head position data from multiple sources via a hierarchy of preferred data sources is disclosed. The method 940 may optionally be included in the step 850 of FIG. 8. In a step 942, the method 940 may include receiving, at a processing element, camera head position data from a multitude of sources such as inertial navigation data from the INS in the camera head, Sonde locating data source from a utility locator device locating a signal emitted by a pipe Sonde, line locating data sourced from a utility locator device locating a signal emitted by a pipe or push-cable, push-cable payout data sourced via the cable counting device of the cable storage drum, visual motion data generated via image data from the camera head, and other position data that may be sourced from other sensors sourced at the camera head. In a step 944, the method 940 may include sorting the camera head position data from the various sources based on a hierarchy having the most desirable camera head data source at the top and least desirable data sources at the bottom. Such a hierarchy may be predetermined or may be user selected. In a step 946, the method 940 may include selecting the camera head position data from the top of the hierarchy for generating a singular camera head position result.

Some embodiments in keeping with the present disclosure may include other camera head position tracking devices to locate and track a camera head besides a utility locator device. In such embodiments, the camera head position may be determined without the use of a pipe Sonde and the associated Sonde locating data determined via a utility locator device. For instance, a tablet, smartphone, laptop, or other such portable computing device may be a camera head position tracking device for locating and tracking a camera head.

Figure 10B:
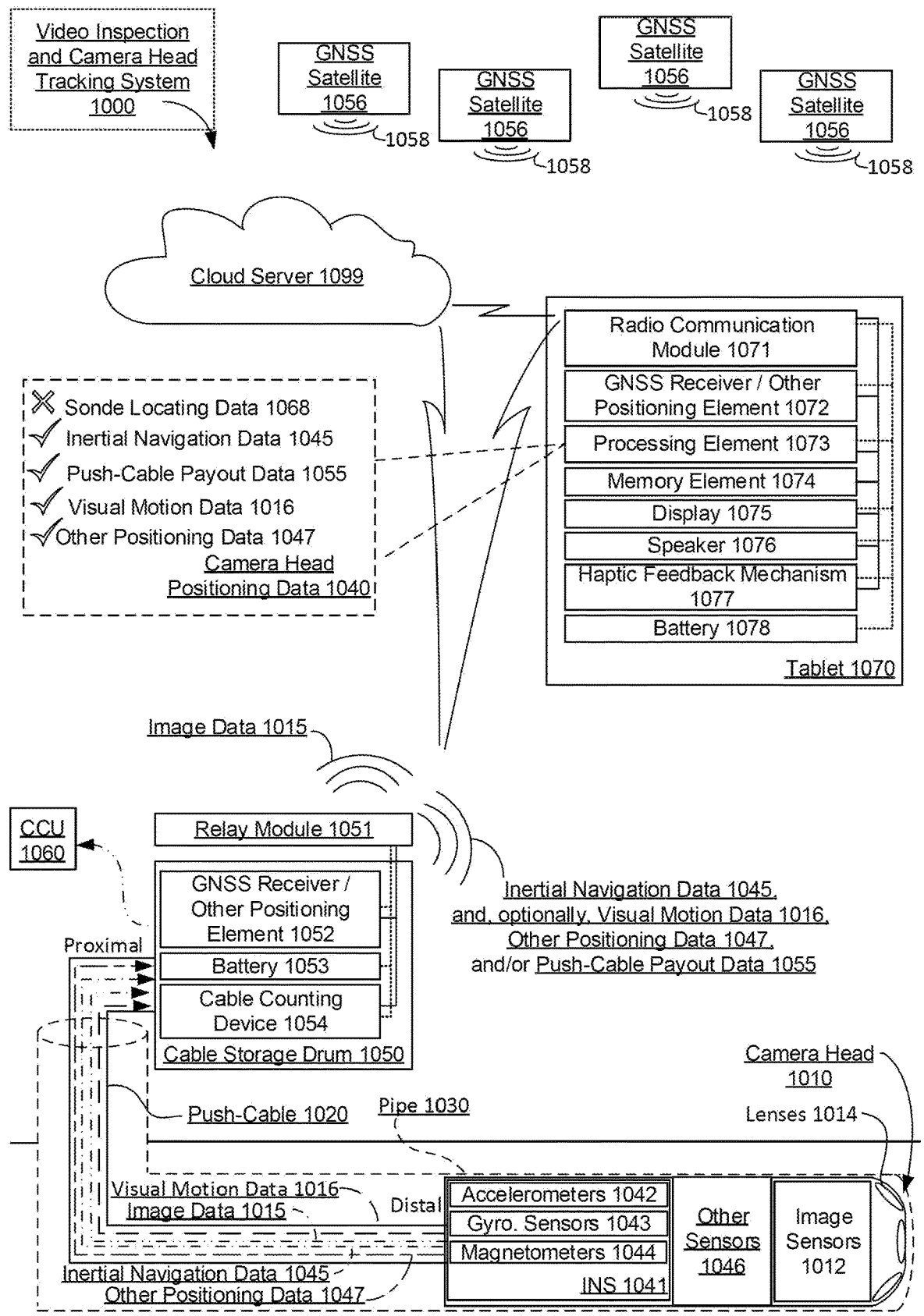
FIG. 10B is a diagram of the video inspection and camera head tracking system for use in pipe or other cavities from FIG. 10A.

Turning to FIGS. 10A and 10B, a video inspection and camera head tracking system 1000 is illustrated which may be used in inspecting inside of pipes and other cavities while simultaneously tracking camera head positions which may share aspects with the camera head tracking system 200 of FIGS. 2A and 2B or the camera head tracking system 700 of FIGS. 7A and 7B. The video inspection and camera head tracking system 1000 may include a camera head 1010 coupled at a distal end of a push-cable 1020 that may be moved through a pipe 1030. The camera head 1010 may be or share aspects with the cameras disclosed in U.S. Pat. No. 6,831,679, entitled VIDEO CAMERA HEAD WITH THERMAL FEEDBACK LIGHTING CONTROL issued Dec. 14, 2004; U.S. Pat. No. 8,587,648, entitled SELF-LEVELING CAMERA HEAD, issued Nov. 9, 2013; U.S. Pat. No. 9,066,446, entitled THERMAL EXTRACTION ARCHITECTURE FOR CAMERA HEAD, INSPECTION SYSTEMS, AND OTHER DEVICES AND SYSTEMS issued Jun. 23, 2015; U.S. Pat. No. 9,277,105, entitled SELF-LEVELING CAMERA HEADS, issued Mar. 1, 2016; U.S. Pat. No. 9,824,433 entitled PIPE INSPECTION SYSTEM CAMERA HEADS, issued on Nov. 21, 2017; U.S. Pat. No. 9,835,564, entitled MULTI-CAMERA PIPE INSPECTION APPARATUS, SYSTEM, AND METHODS, issued Dec. 5, 2017; U.S. Pat. No. 10,288,997, entitled ROTATING CONTACT ASSEMBLIES FOR SELF-LEVELING CAMERA HEADS, issued May 14, 2019; U.S. Pat. No. 10,715,703, entitled SELF-LEVELING CAMERA HEADS, issued Jul. 14, 2020; U.S. Pat. No. 10,848,655, entitled HEAT EXTRACTION ARCHITECTURE FOR COMPACT VIDEO CAMERA HEADS, issued Nov. 24, 2020; U.S. Pat. No. 11,209,115, entitled PIPE INSPECTION AND/OR MAPPING CAMERA HEADS, SYSTEMS, AND METHODS, issued Dec. 28, 2021; and/or other disclosed in the incorporated patents and applications. The content of each of these applications is incorporated by reference herein in its entirety.

The push-cable 1020 may be or share aspects with those disclosed in U.S. Pat. No. 5,939,679, entitled VIDEO PUSH CABLE, issued Aug. 17, 1999; U.S. patent application Ser. No. 14/970,362, entitled COAXIAL VIDEO PUSH-CABLES FOR USE IN INSPECTION SYSTEMS, filed Dec. 15, 2015; U.S. Pat. No. 9,448,376, entitled HIGH BANDWIDTH PUSH-CABLES FOR VIDEO INSPECTION SYSTEMS, issued Sep. 20, 2016; U.S. Pat. No. 9,468,954, entitled PIPE INSPECTION SYSTEM INCLUDING JETTER PUSH-CABLE, issued Oct. 18, 2016; U.S. Pat. No. 10,764,541, entitled COAXIAL VIDEO PUSH-CABLES FOR USE IN INSPECTION SYSTEMS, issued Sep. 1, 2020; and/or other disclosed in the incorporated patents and applications. The content of each of these applications is incorporated by reference herein in its entirety.

Referring to FIG. 10B, the camera head 1010 may include one or more image sensors 1012 and lenses 1014 to capture video and images from the interior of the pipe 1030. The captured video and/or images from the interior of the pipe 1030, an image data 1015, may be communicated via the push-cable 1020 to a cable storage drum 1050 coupled at the proximal end of the push-cable 1020 outside the entry point to the pipe 1030 and then further onto a CCU 1060 for displaying the video/images of the image data 1015 as well as control aspects of the camera head 1010. The CCU 1060 may be or share aspects with those disclosed in U.S. Pat. No. 10,084,945, entitled CABLE STORAGE DRUM WITH MOVEABLE CCU DOCKING APPARATUS, issued Sep. 25, 2018; U.S. patent application Ser. No. 17/190,400, filed Mar. 3, 2021, entitled DOCKABLE CAMERA REEL AND CCU SYSTEM; and/or other disclosed in the incorporated patents and applications. The content of each of these applications is incorporated by reference herein in its entirety.

One or more of an INS 1041 may determine positions of the camera head 1010 relative to the cable storage drum 1050. The INS 1041 may be or include, but should not be limited to, accelerometers 1042, gyroscopic sensors 1043, and magnetometers 1044 that may measure in three dimensions for generating inertial navigation data 1045. In some embodiments, the INS may include one or more barometers (not illustrated). Inertial navigation data, such as the inertial navigation data 1045 of FIG. 10B, may, in various embodiments, be included in a camera head position data 1040 set. The inertial navigation data 1045 may be communicated, via the push-cable 1020, to the cable storage drum 1050 coupled at the proximal end of the push-cable 1020 outside the entry point to the pipe 1030.

The camera head 1010, via processing of the image data 1015 may further generate visual motion data 1019 that may also be included the camera head position data 1040. For instance, adjacent video frames may be compared and, through various tracking and motion estimation algorithms, determine direction and distance for movements of the camera head 1010. The visual motion data 1019 may be communicated, via the push-cable 1020, to the cable storage drum 1050 coupled at the proximal end of the push-cable 1020 outside the entry point to the pipe 1030.

Further, the camera head 1010 may include one or more other sensors 1046 for generating other positioning data 1047. For instance, the other sensors 1047 may include, for instance LiDAR, acoustic motion sensors, or the like producing the other positioning data 1047 for tracking movements of the camera head 1010. The other positioning data 1047 may be communicated, via the push-cable 1020, to the cable storage drum 1050 coupled at the proximal end of the push-cable 1020 outside the entry point to the pipe 1030.

The cable storage drum 1050 may further include a radio communication module (e.g., Bluetooth, Wi-Fi, ISM, or the like), such as a relay module 1051, to wirelessly communicate the inertial navigation data 1045, visual motion data 1019, other positioning data 1047, and a push-cable payout data 1055 relative to the position of the cable storage drum 1050 The relay module 1041 may be or share aspects with those disclosed in U.S. patent application Ser. No. 17/528,956, filed Nov. 17, 2021, entitled VIDEO INSPECTION SYSTEM APPARATUS AND METHODS WITH RELAY MODULE AND CONNECTION PORTS and/or others disclosed in the incorporated patents and applications. The content of the application is incorporated by reference herein in its entirety. In other embodiments, such a radio communication module may instead or additionally be disposed in the cable storage drum or other connected ground surface device (e.g., such as the CCU 1060). The relay module 1051 may further broadcast image data 1015 to one or more wirelessly connected display devices.

Still referring to FIG. 10B, it should be noted that the position of the cable storage drum 1050 may be known. For instance, the cable storage drum 1050 may include a GNSS receiver and/or other positioning element 1052 for determining a position (e.g., geolocation/position plus orientation or pose at the geolocation/position). The GNSS receiver and/or other positioning element 1052 may receive navigation signals 1058 from a plurality of GNSS satellites 1056 to generate a position via a geographic coordinate system. Likewise, the other positioning element of the GNSS receiver and/or other positioning element 1052 may include one or more other positioning sensors or apparatus. In some embodiments, the GNSS receiver and/or other positioning element 1052 may include one or more magnetometers and/or other inertial navigation sensors (not illustrated) for determining a heading at the geolocation/position determine via the GNSS receiver. In some embodiments, such geolocation/positions may instead or additionally include an input allowing a user to select the position of a cable storage drum (e.g., the cable storage drum position 1240 of FIG. 12). Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point.

Figure 12:
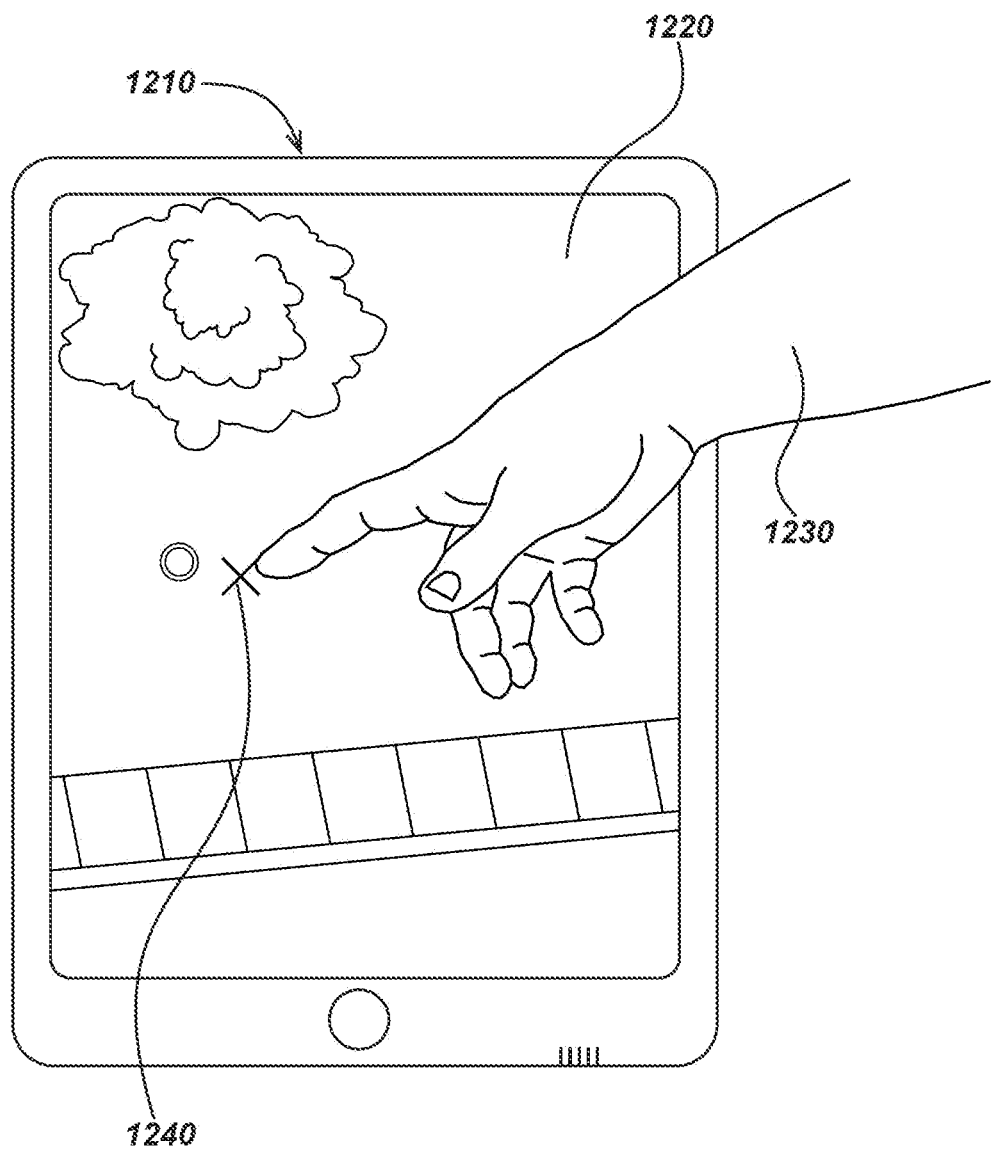
FIG. 12 is an illustration showing a user selecting geolocation/position of the broadcasting element.

In some system embodiments, the geolocation/position of a cable storage drum may instead be determined by user input. As illustrated in FIG. 12, a tablet 1210 or like computing device may display a map 1220 onto which a user 1230 may input a cable storage drum position 1240. For instance, the user 1230 may touch a touchscreen at the appropriate location or utilize other user input device to input or select the geolocation/position. Likewise, in further embodiments, a photograph of the cable storage drum in situ may be used to match with location with a preexisting map to estimate geolocation/position.

Turning back to FIG. 10B, the cable storage drum 1050 may further include a battery 1053 or, in alternative embodiments, other power source for supplying electrical current. Optionally, the cable storage drum 1050 may include a cable counting device 1054 for generating a push-cable payout data 1055 that may be a measure the length of push-cable 1020 dispensed into the pipe 1030 or another cavity. The cable counting device 1054 may be or share aspects with those disclosed in U.S. Pat. No. 8,970,211, issued Mar. 3, 2015, entitled PIPE INSPECTION CABLE COUNTER AND OVERLAY MANAGEMENT SYSTEM and/or others disclosed in the incorporated patents and applications. The content of each which is incorporated by reference herein in its entirety. In such embodiments, the push-cable payout data 1055 from the cable counting device 1054 may be used to verify the total length of movements by the inertial navigation data 1045, as disclosed in the method 500 of FIG. 5, and optionally generate a camera head range that may be communicated to a user via a display (e.g., the camera head range 330 of the display 310 illustrated in FIG. 3).

The tablet 1070 may include a radio communication module 1071 (e.g., via Bluetooth, Wi-Fi, ISM, or the like) for receiving the broadcasted inertial navigation data 1045, visual motion data 1019, other positioning data 1047, and a push-cable payout data 1055 relative to the position of the cable storage drum 1050. A GNSS receiver and/or other positioning element 1072 may be included for determining a geolocation/position for the tablet 1070 and/or other camera head position tracking device in other embodiments (e.g., smartphones, laptops, other portable computing devices, and/or the like). The other positioning element of the GNSS receiver and/or other positioning element 1072 may, for instance, be or include gyroscopic sensors, accelerometers, magnetometers, other inertial navigation sensors, or the like. In some embodiments, the INS may include one or more barometers (not illustrated). For instance, a pose or orientation in three-dimensional space may be determined via inertial navigation sensors in the GNSS receiver and/or other positioning element 1072 for the tablet 1070. Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point.

Still referring to FIG. 10B, a processing element 1073, having one or more processors, may process the camera head position data 1040 including the inertial navigation data, and, optionally, the visual motion data 1019 and/or the other positioning data 1047, as well as the push-cable payout data 1055 relative to the geolocation/position data of the tablet 1070 to locate and track the camera head 1010. As the video inspection and camera head tracking system 1000 excludes a pipe Sonde and/or utility locator device, Sonde locating data may not be determined or used in determining a position for the camera head 1010. For instance, the position of the camera head 1010 may be determined via the method 1100 of FIG. 11.

Referring to FIG. 10B, the tablet 1070 may further include a memory element 1074 having one or more non-transitory memories that may store the camera head position data 1040. As the tablet 1070 may have a position known via the GNSS receiver and/or other positioning element 1072 and the position of the camera head 1010 may be known via the method 1100 of FIG. 11, the tablet 1070 may direct a user towards the position of the camera head 1010 from the inertial navigation data 1045 and, optionally, visual motion data 1019, push-cable payout data 1055, and/or other positioning data 1047. For instance, the tablet 1070 may include a display 1075 to visually indicate direction towards the camera head 1010 (e.g., such as the display 1310 of FIG. 13 or the display 1410 of FIG. 14), provide audio directions via a speaker 1076, and/or haptic feedback via a haptic feedback mechanism 1077. The tablet 1070 may further include a battery 1078 or, in alternative embodiments, other power source for supplying electrical current.

Further illustrated, the tablet 1070 and/or the relay module 1051 coupled with the cable storage drum 1050 may further be wireless connected with each other as well as a remote server such as a cloud server 1099. The cloud server 1099 may optionally store camera head position data as well as related mapping data for further communication with inspection systems that may be present in the same area in the future as well as other smartphones, tablet computer, laptops, and other devices.

Figure 11:
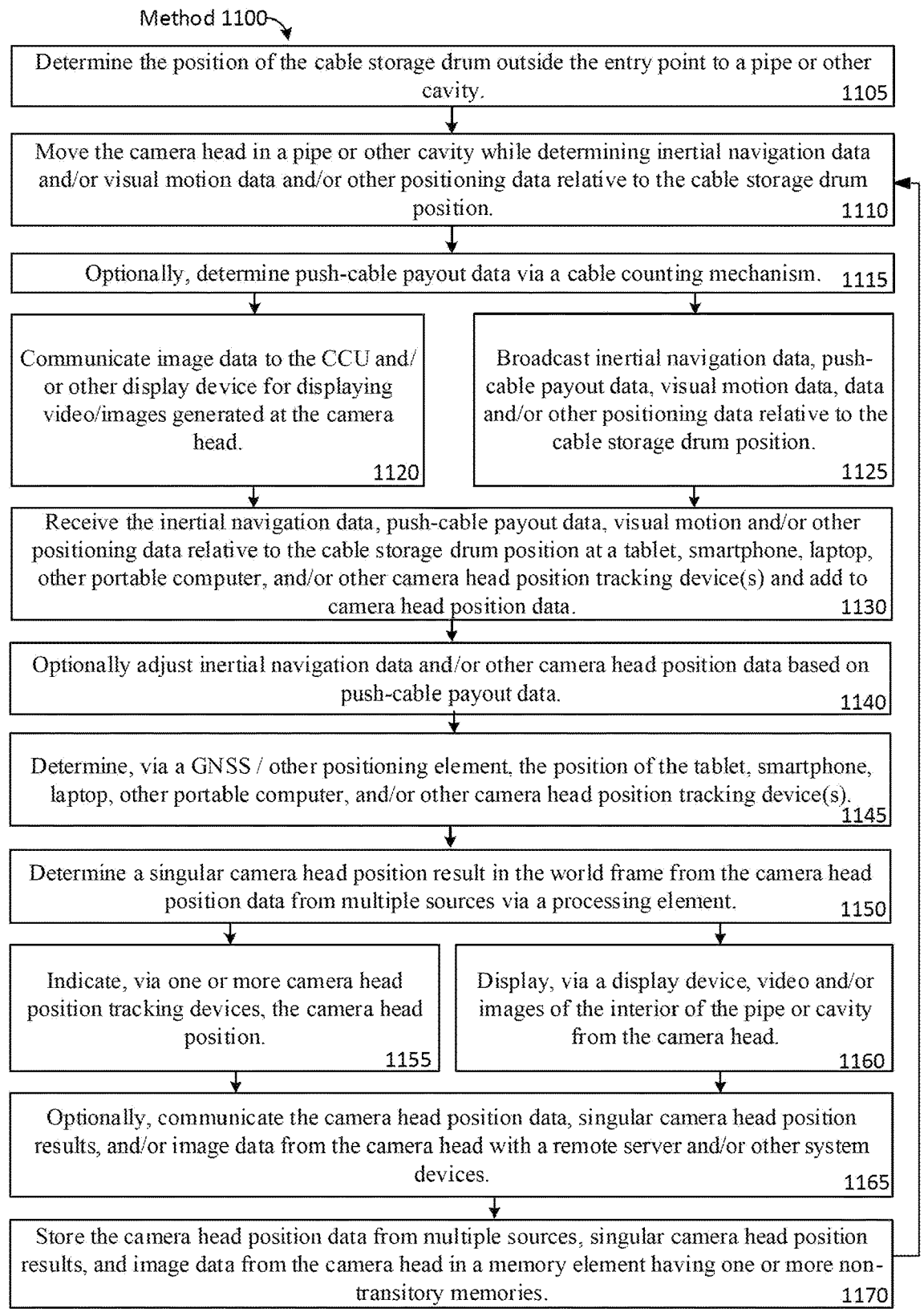
FIG. 11 is a method for determining the camera head position via the video inspection and camera head tracking system.

Turning to FIG. 11, a method 1100 is disclosed for determining a singular camera head position result from a video inspection and camera head tracking system of the present invention having a camera head position tracking device other than a utility locator device. For instance, the method 1100 may be or share aspects with the method 800 of FIG. 8 modified to exclude Sonde locating data.

In a step 1105, the method 1100 may include determining the position of the cable storage drum outside the entry point to a pipe or other cavity. For instance, the step 1105 may include the use of a GNSS receiver and/or other positioning element (e.g., the GNSS receiver and/or other positioning element 252 of FIG. 2B or the GNSS receiver and/or other positioning element 752 of FIG. 7B) for determining the geolocation/position of the cable storage drum. In some embodiments, a user may instead indicate the position of the cable storage drum on an electronic map such as that illustrated with the cable storage drum position 1240 of FIG. 12. Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point.

In a step 1110, the camera head may be moved in the pipe or other cavity while determining inertial navigation data and, optionally, visual motion data and/or other positioning data relative to the cable storage drum position. In an optional step 1115, push-cable payout data may be determined from a cable counting mechanism. In a step 820, the image data generated at the camera head may be communicated to a CCU and/or other display device. In some embodiments, the step 820 may include communicating the image data to a CCU (e.g., the CCU 260 of FIGS. 2A and 2B or the CCU 760 of FIGS. 7A and 7B) to display video and images generated at the camera head. In some embodiments, the step 1120 may include wirelessly communicating image data (e.g., via Bluetooth, Wi-Fi, ISM, of a radio communication module or relay module) to one or more remotely connected display devices (e.g., a tablet, smartphone, laptop, utility locator device, remote or cloud server, or the like having a display for displaying video and images from inside the pipe or cavity). In a step 1125 concurrent with the step 120, the inertial navigation data, push-cable payout data, visual motion data, and/or other positioning data relative to the cable storage drum position may be received by one or more camera head tracking devices (e.g., the tablet 1070 of FIGS. 10A and 10B). In a step 1130, the method 1100 may include receiving the inertial navigation data, push-cable payout data, visual motion data, and/or other positioning data relative to the cable storage drum position at one or more camera head position tracking devices which may further be added to the camera head position data. For instance, the step 1130 may include receiving wirelessly broadcasted inertial navigation data, push-cable payout data, visual motion data, and/or other positioning data relative to the cable storage drum position via a radio communication module (e.g., via Bluetooth, Wi-Fi, ISM, or the like) in the camera head tracking devices (e.g., the radio communication module 1071 of the tablet 1070 in FIG. 10B).

In an optional step 1140, the method 1100 may include adjusting inertial navigation data and/or visual motion data and/or other positioning data other camera head position data originating in the camera head based on push-cable payout data. The step 1140 may, for instance, be or include the use of the method 500 of FIG. 5 which may further be extended to adjusting the visual motion data and/or other positioning data other camera head position data originating in the camera head.

In a step 1145, the method 1100 may include determining, via a GNSS/other positioning element, tablet, smartphone, laptop, other portable computer, and/or other camera head position tracking device(s). For instance, the step 800 may include the use of a GNSS receiver and/or other positioning element (e.g., the GNSS receiver and/or other positioning element 292 of FIG. 2B or the GNSS receiver and/or other positioning element 792 of FIG. 7B) for determining the geolocation/position. It should be noted not all embodiments rely upon positions or geolocations in a geographic coordinate system having latitude and longitude measurements and the camera head position data may be a distance and direction relative to the cable storage drum, entry point to the pipe or other cavity, or other reference point.

In a step 1150, a singular camera head position result may be determined from the camera head position data from multiple sources via a processing element. For instance, the step 1150 may include one or more additional steps or methods (e.g., the method 900 of FIG. 9, the method 920 of FIG. 9B, and/or the method 940 of FIG. 9C) for sorting the multiple camera head position data inputs from multiple sources and resolve the multiple inputs into a singular camera head position result representative of the position of the camera head in three dimensions.

In a step 1155, the method 1100 may include indicating the camera head position via one or more camera head position tracking devices. The step 855 may include, for example, displaying the camera head position or otherwise direct towards a camera head position on a graphical display (e.g., the display 1175 of FIG. 11B), provide audio directions via a speaker (e.g., the speaker 1176 of FIG. 11B), and/or haptic feedback via a haptic feedback mechanism (e.g., the haptic feedback mechanism 1177 of FIG. 11B).

In a step 1160 concurrent with the step 1155, the method 1100 may include displaying, via a display device, video and/or images of the interior of the pipe or cavity from the camera head. The step 1160 may include displaying on a CCU connected to the cable storage drum via a wired connection to display the video and images from inside the pipe or other cavity (e.g., CCU 1060 of FIGS. 10A and 10B). Further, the display device(s) may include one or more wirelessly connected devices (e.g., the tablet 1300 of FIG. 13, the tablet 1570 of FIGS. 15A and 15B, the utility locator device 1580 of FIGS. 15A and 15B and/or other smartphone, laptop, or portable computing devices).

In an optional step 1165, the method 1100 may include communicating the camera head position data, singular camera head position results, and/or image data from the camera head with a remote server and/or other system devices. For instance, the push-cable payout data, visual motion data, and/or other positioning data relative to the cable storage drum position may be shared between smartphones, tablets, and other devices. Likewise, the camera head position data, singular camera head position results and, optionally, image data from the camera head communicated with a remote server (e.g., the cloud server 1099 of FIGS. 10A and 10B).

In a step 1170, the camera head position data from multiple sources, determined singular camera head position results, and maps that include camera head position data may be stored in a memory element having one or more non-transitory memories. For instance, the memory element may be or include the memory element 1074 of FIG. 10B and/or other memory element (e.g., a memory element in the cloud server 1099 of FIGS. 10A and 10B and/or other memory element in other system devices that may not be illustrated).

Figure 13:
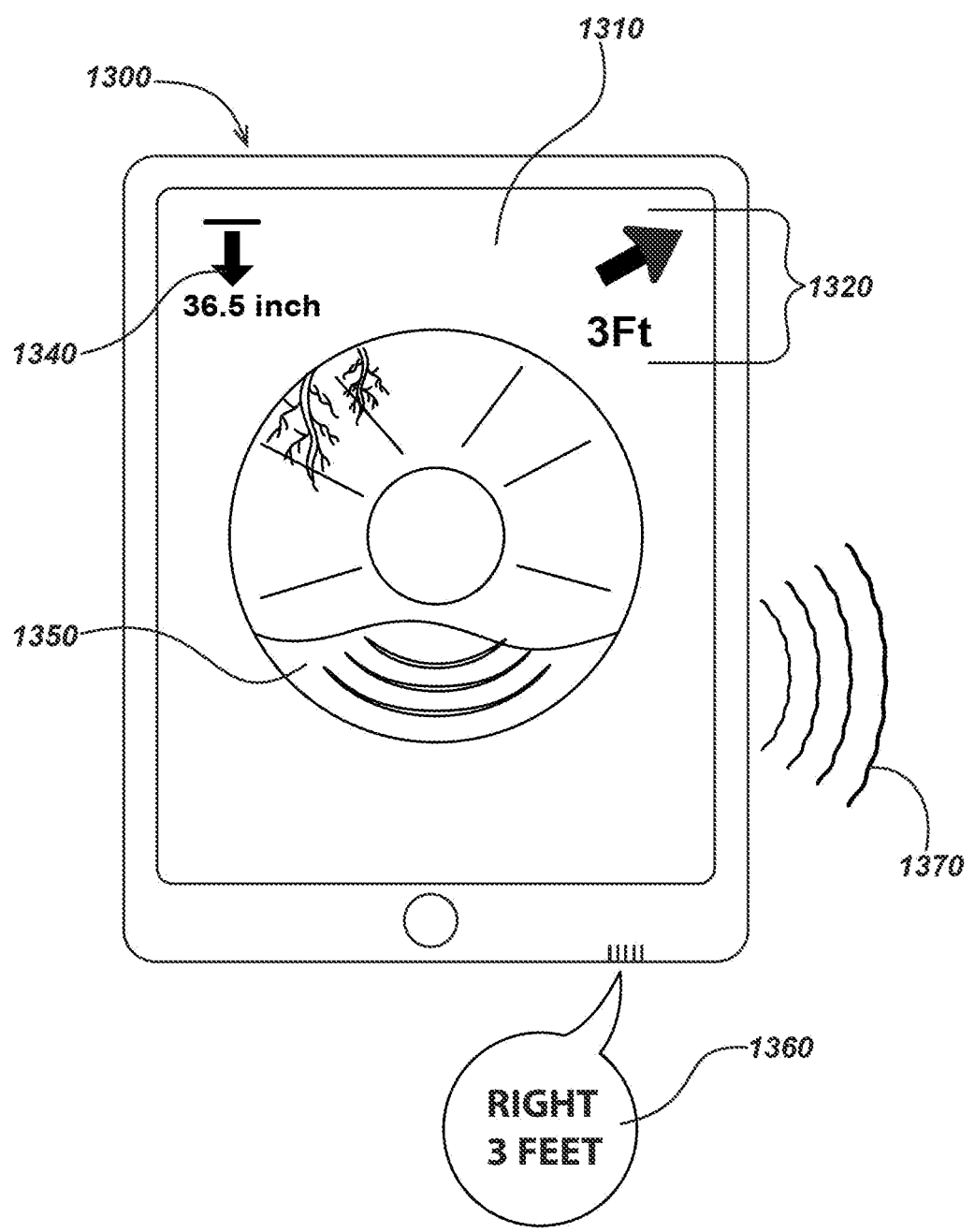
FIG. 13 is an illustration of a tablet that displays inspection images and video from the camera head and indicates towards a camera head position relative to the tablet.

Turning to FIG. 13, a tablet 1300 is illustrated having a display 1310 which may be or share aspects with the tablet 1070 and display 1075 of FIG. 10B or the display of other camera head position tracking device of the present disclosure. The display 1310 may include a visual indicator 1320 directing towards the position of a tracked camera head at the ground surface relative to the position of the tablet 1300. Likewise, a depth indicator 1340 may be included to visually indicate the depth of the camera head in the ground. An inspection video/image 1350 from images or video from the camera head disposed in the pipe or cavity is graphically represented on the display 1310. The tablet 1300 may further provide audio directions 1360 and/or haptic feedback 1370 for directing a user towards the camera head position. It should be noted, a display device and a camera head position tracking device of the present invention may be one in the same device such that the combined display and camera head position tracking device may display video and images as well as direct a user to the position of the camera head. For instance, the pipe inspection video/image 1350 may be displayed upon the display 1310 of tablet 1300 while simultaneously directing a user toward the camera head position via the visual indicator 1320, the audio directions 1360, and the haptic feedback 1370.

Figure 14:
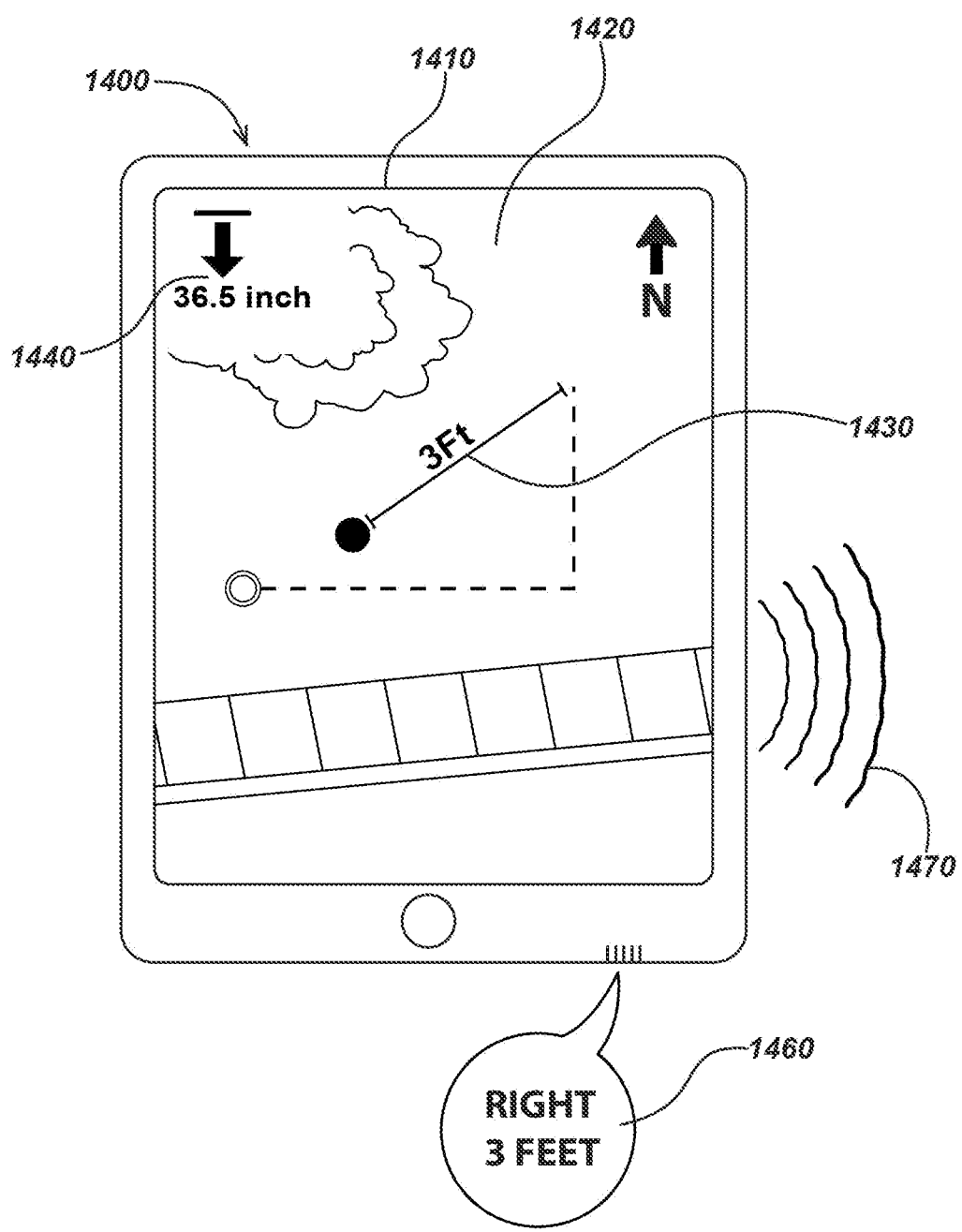
FIG. 14 is an illustration of a tablet mapping a direction towards the camera head position in the world frame.

Turning to FIG. 14, another tablet 1400 is illustrated having a display 1410 which may be or share aspects with the tablet 1070 and display 1075 of FIG. 10B or the display of other camera head position tracking device of the present disclosure. The display 1410 may include a map 1420 further including a direction indicator 1430 directing towards the position of a tracked camera head at the ground surface relative to the position of the tablet 1400. Likewise, a depth indicator 1440 may be included to visually indicate the depth of the camera head in the ground. The tablet 1400 may further provide audio directions 1460 and/or haptic feedback 1470 for directing a user towards the camera head position.

Figure 15A:
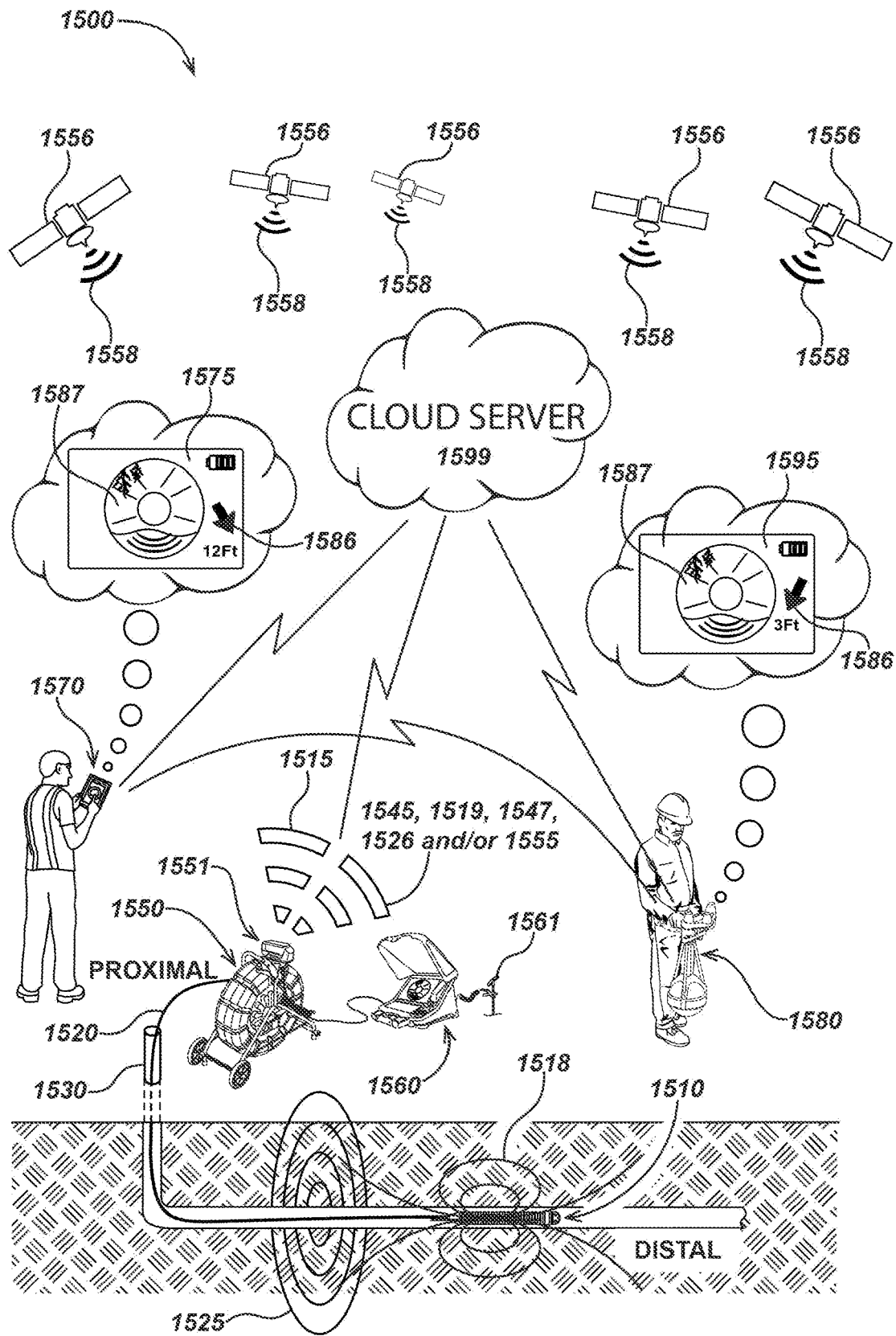
FIG. 15A is an illustration of another video inspection and camera head tracking system for use in pipes or other cavities.
Figure 15B:
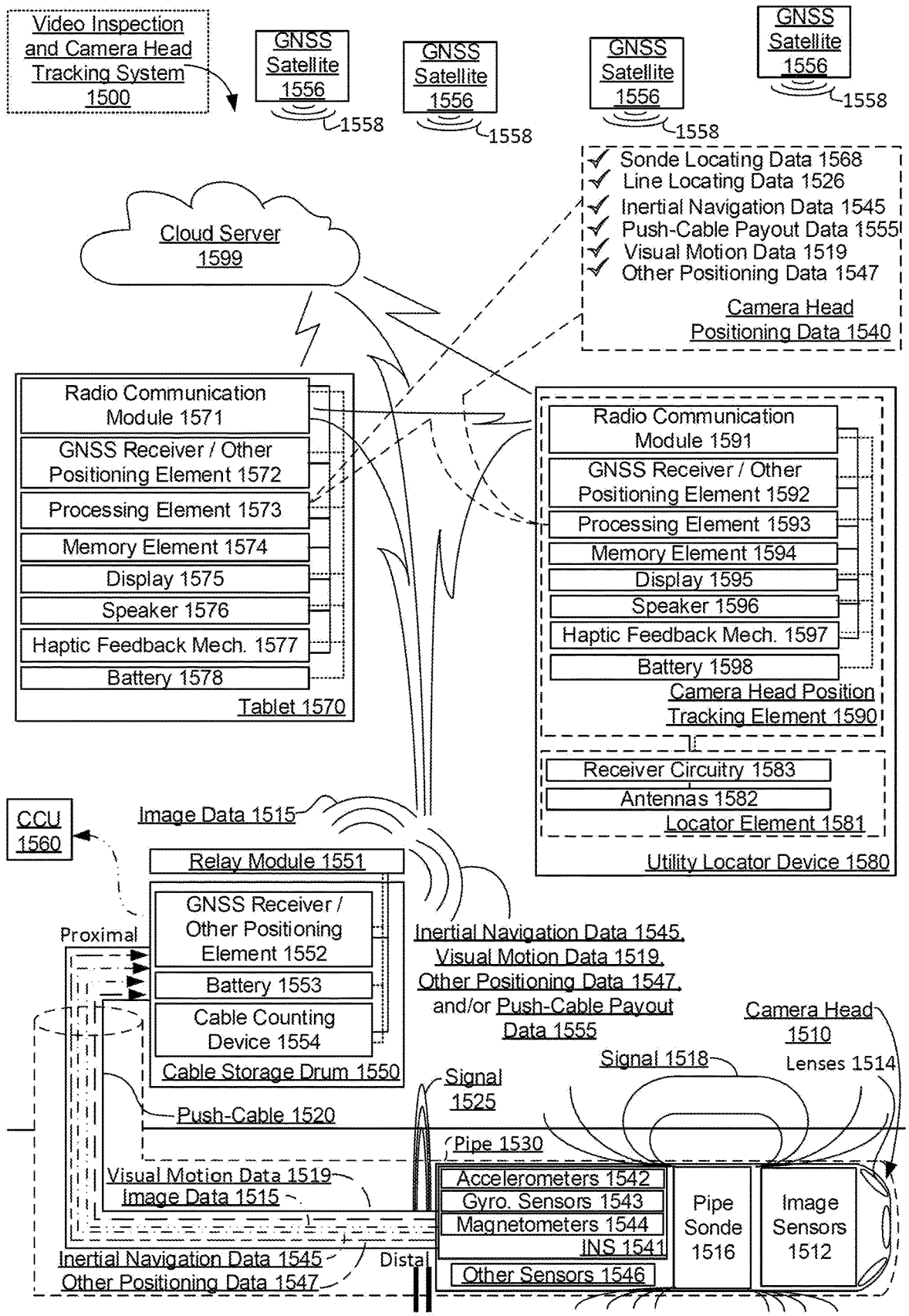
FIG. 15B is a diagram of the video inspection and camera head tracking system for use in pipe or other cavities from FIG. 15A.

In some system embodiments, a video inspection and camera head tracking system in keeping with the present disclosure may include a plurality of different camera head position tracking devices (e.g., smartphones, tablet computer, laptops, utility locator device, and other portable computing devices). As illustrated in FIGS. 15A and 15B, a video inspection and camera head tracking system 1500 is illustrated which may be used in inspecting inside of pipes and other cavities while simultaneously tracking camera head positions which may share aspects with the video inspection and camera head tracking system 200 of FIGS. 2A and 2B, the video inspection and camera head tracking system 700 of FIGS. 7A and 7B, and the video inspection and camera head tracking system 1000 of FIGS. 10A and 10B. The video inspection and camera head tracking system 1500 may include a camera head 1510 coupled at a distal end of a push-cable 1520 that may be moved through a pipe 1530. The camera head 1510 may be or share aspects with the cameras disclosed in U.S. Pat. No. 6,831,679, entitled VIDEO CAMERA HEAD WITH THERMAL FEEDBACK LIGHTING CONTROL issued Dec. 14, 2004; U.S. Pat. No. 8,587,648, entitled SELF-LEVELING CAMERA HEAD, issued Nov. 9, 2013; U.S. Pat. No. 9,066,446, entitled THERMAL EXTRACTION ARCHITECTURE FOR CAMERA HEAD, INSPECTION SYSTEMS, AND OTHER DEVICES AND SYSTEMS issued Jun. 23, 2015; U.S. Pat. No. 9,277,105, entitled SELF-LEVELING CAMERA HEADS, issued Mar. 1, 2016; U.S. Pat. No. 9,824,433 entitled PIPE INSPECTION SYSTEM CAMERA HEADS, issued on Nov. 21, 2017; U.S. Pat. No. 9,835,564, entitled MULTI-CAMERA PIPE INSPECTION APPARATUS, SYSTEM, AND METHODS, issued Dec. 5, 2017; U.S. Pat. No. 10,288,997, entitled ROTATING CONTACT ASSEMBLIES FOR SELF-LEVELING CAMERA HEADS, issued May 14, 2019; U.S. Pat. No. 10,715,703, entitled SELF-LEVELING CAMERA HEADS, issued Jul. 14, 2020; U.S. Pat. No. 10,848,655, entitled HEAT EXTRACTION ARCHITECTURE FOR COMPACT VIDEO CAMERA HEADS, issued Nov. 24, 2020; U.S. Pat. No. 11,209,115, entitled PIPE INSPECTION AND/OR MAPPING CAMERA HEADS, SYSTEMS, AND METHODS, issued Dec. 28, 2021; and/or other disclosed in the incorporated patents and applications. The content of each of these applications is incorporated by reference herein in its entirety.

The push-cable 1520 may be or share aspects with those disclosed in U.S. Pat. No. 5,939,679, entitled VIDEO PUSH CABLE, issued Aug. 17, 1999; U.S. patent application Ser. No. 14/970,362, entitled COAXIAL VIDEO PUSH-CABLES FOR USE IN INSPECTION SYSTEMS, filed Dec. 15, 2015; U.S. Pat. No. 9,448,376, entitled HIGH BANDWIDTH PUSH-CABLES FOR VIDEO INSPECTION SYSTEMS, issued Sep. 20, 2016; U.S. Pat. No. 9,468,954, entitled PIPE INSPECTION SYSTEM INCLUDING JETTER PUSH-CABLE, issued Oct. 18, 2016; U.S. Pat. No. 10,764,541, entitled COAXIAL VIDEO PUSH-CABLES FOR USE IN INSPECTION SYSTEMS, issued Sep. 1, 2020; and/or other disclosed in the incorporated patents and applications. The content of each of these applications is incorporated by reference herein in its entirety.

Referring to FIG. 15B, the camera head 1510 may include one or more image sensors 1512 and lenses 1514 to capture video and images from the interior of the pipe 1530. The captured video and/or images from the interior of the pipe 1530, an image data 1515, may be communicated via the push-cable 1520 to a cable storage drum 1550 coupled at the proximal end of the push-cable 1520 outside the entry point to the pipe 1530 and then further onto a CCU 1560 for displaying the video/images of the image data 1515 as well as control aspects of the camera head 1510. The CCU 1560 may be or share aspects with those disclosed in U.S. Pat. No. 10,084,945, entitled CABLE STORAGE DRUM WITH MOVEABLE CCU DOCKING APPARATUS, issued Sep. 25, 2018; U.S. patent application Ser. No. 17/190,400, filed Mar. 3, 2021, entitled DOCKABLE CAMERA REEL AND CCU SYSTEM; and/or other disclosed in the incorporated patents and applications. The content of each of these applications is incorporated by reference herein in its entirety. The CCU 1560 illustrated in FIG. 15B may include a transmitter element for coupling current with the push-cable 1520 in generating a signal 1525. Further, a ground stake 1561 may be connected with the CCU 1560 for accepting ground return current. In other embodiments, a separate transmitter device may be included in a system for coupling electrical current onto a push-cable, such as the push-cable, or a pipe, such as the pipe 1530. The transmitter element in the CCU 1560 or other transmitter device that may be used with a system of the present disclosure may be or share aspects with U.S. Pat. No. 7,619,516, issued Nov. 17, 2009, entitled SINGLE AND MULTI-TRACE OMNI-DIRECTIONAL SONDE AND LINE LOCATORS AND TRANSMITTER USED THEREWITH; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTILITY LOCATOR INCLUDING A CAMERA; U.S. patent Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; and/or other disclosed in the incorporated patents and applications. The content of each of these applications is incorporated by reference herein in its entirety.

One or more of an INS 1541 may determine positions of the camera head 1510 relative to the cable storage drum 1550. The INS 1541 may be or include, but should not be limited to, accelerometers 1542, gyroscopic sensors 1543, and magnetometers 1544 that may measure in three dimensions for generating inertial navigation data 1545. In some embodiments, the INS may include one or more barometers (not illustrated). Inertial navigation data, such as the inertial navigation data 1545 of FIG. 15B, may, in various embodiments, be included in a camera head position data 1540. The inertial navigation data 1545 may be communicated, via the push-cable 1520, to the cable storage drum 1550 coupled at the proximal end of the push-cable 1520 outside the entry point to the pipe 1530.

The camera head 1510, via processing of the image data 1515, may further generate visual motion data 1519 that may also be included in the camera head position data 1540. For instance, adjacent video frames may be compared and, through various tracking and motion estimation algorithms, determine direction and distance for movements of the camera head 1510. The visual motion data 1519 may be communicated, via the push-cable 1520, to the cable storage drum 1550 coupled at the proximal end of the push-cable 1520 outside the entry point to the pipe 1530.

Further, the camera head 1510 may include one or more other sensors 1546 for generating other positioning data 1547. For instance, the other sensors 1547 may include, for instance LiDAR, acoustic motion sensors, or the like producing the other positioning data 1547 for tracking movements of the camera head 1510. The other positioning data 1547 may be communicated, via the push-cable 1520, to the cable storage drum 1550 coupled at the proximal end of the push-cable 1520 outside the entry point to the pipe 1530.

The cable storage drum 1550 may further include a radio communication module (e.g., Bluetooth, Wi-Fi, ISM, or the like), such as a relay module 1551, to wirelessly communicate the inertial navigation data 1545, visual motion data 1519, other positioning data 1547, and a push-cable payout data 1555 relative to the position of the cable storage drum 1550 to a plurality of camera head position tracking device such as a tablet 1570 and a utility locator device 1580 and, optionally, other smartphones and laptops or the like. The relay module 1541 may be or share aspects with those disclosed in U.S. patent application Ser. No. 17/528,956, filed Nov. 17, 2021, entitled VIDEO INSPECTION SYSTEM APPARATUS AND METHODS WITH RELAY MODULE AND CONNECTION PORTS and/or others disclosed in the incorporated patents and applications. The content of the application is incorporated by reference herein in its entirety. In other embodiments, such a radio communication module may instead or additionally be disposed in the cable storage drum or other connected ground surface device (e.g., such as the CCU 1560).

Still referring to FIG. 15B, it should be noted that the position of the cable storage drum 1550 may be known. For instance, the cable storage drum 1550 may include a GNSS receiver and/or other positioning element 1552 for determining a position (e.g., geolocation/position plus orientation or pose at the geolocation/position). The GNSS receiver and/or other positioning element 1552 may receive navigation signals 1558 from a plurality of GNSS satellites 1556 to generate a position via a geographic coordinate system. Likewise, the other positioning element of the GNSS receiver and/or other positioning element 1552 may include one or more other positioning sensors or apparatus. In some embodiments, the GNSS receiver and/or other positioning element 1552 may include one or more magnetometers and/or other inertial navigation sensors (not illustrated) for determining a heading at the geolocation/position determine via the GNSS receiver. In some embodiments, such geolocation/positions may instead or additionally include an input allowing a user to select the position of a cable storage drum (e.g., the cable storage drum position 1240 of FIG. 12). Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point. The cable storage drum 1550 may further include a battery 1553 or, in alternative embodiments, other power source for supplying electrical current. Optionally, the cable storage drum 1550 may include a cable counting device 1554 for generating a push-cable payout data 1555 that may be a measure the length of push-cable 1520 dispensed into the pipe 1530 or another cavity. The cable counting device 1554 may be or share aspects with those disclosed in U.S. Pat. No. 8,970,211, issued Mar. 3, 2015, entitled PIPE INSPECTION CABLE COUNTER AND OVERLAY MANAGEMENT SYSTEM and/or others disclosed in the incorporated patents and applications. The content of each which is incorporated by reference herein in its entirety. In such embodiments, the push-cable payout data 1555 from the cable counting device 1554 may be used to verify the total length of movements by the inertial navigation data 1545, as disclosed in the method 500 of FIG. 5, and optionally generate a camera head range that may be communicated to a user via a display (e.g., the camera head range 330 of the display 310 illustrated in FIG. 3).

The tablet 1570 may include a radio communication module 1571 (e.g., via Bluetooth, Wi-Fi, ISM, or the like) for receiving the broadcasted inertial navigation data 1545, visual motion data 1519, other positioning data 1547, and a push-cable payout data 1555 relative to the position of the cable storage drum 1550. A GNSS receiver and/or other positioning element 1572 may be included for determining a geolocation/position for the tablet 1570 and/or other camera head position tracking device in other embodiments (e.g., smartphones, laptops, other portable computing devices, and/or the like). The other positioning element of the GNSS receiver and/or other positioning element 1572 may, for instance, be or include gyroscopic sensors, accelerometers, magnetometers, other inertial navigation sensors, or the like. In some embodiments, the INS may include one or more barometers (not illustrated). For instance, a pose or orientation in three-dimensional space may be determined via inertial navigation sensors in the GNSS receiver and/or other positioning element 1572 for the tablet 1570. Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point.

Still referring to FIG. 15B, a processing element 1573, having one or more processors, may process the camera head position data 1540 to locate and track the camera head 1510. The camera head position data 1540 may include including the inertial navigation data, and, optionally, the visual motion data 1519 and/or the other positioning data 1547, as well as the push-cable payout data 1555 relative to the geolocation/position data of the tablet 1570 and, as later disclosed herein, a Sonde locating data, determined by the utility locator device 1580 from the signal 1518 emitted by the pipe Sonde 1516, and a line locating data 1526, determined by the utility locator device 1580 from the signal 1525 emitted by the push-cable 1520. The locating and tracking of the camera head 1510 may, for instance, use the method 1100 of FIG. 11.

Referring to FIG. 15B, the tablet 1570 may further include a memory element 1574 having one or more non-transitory memories that may store the camera head position data 1540. As the tablet 1570 may have a position known via the GNSS receiver and/or other positioning element 1572 and the position of the camera head 1510 may be known in the may via the method 1100 of FIG. 11, the tablet 1570 may direct a user towards the position of the camera head 1510 from the inertial navigation data 1545 and, optionally, visual motion data 1519, push-cable payout data 1555, and/or other positioning data 1547. For instance, as illustrated in FIG. 15A, the tablet 1570 may include a display 1575 to visually indicate direction, such as with the visual indicator 1586, towards the camera head 1510, provide audio directions via a speaker 1576, and/or haptic feedback via a haptic feedback mechanism 1577. The display 1595 of the tablet 1570 may further include video or images from inside the pipe 1530 such as an inspection video 1587. Turning back to FIG. 15B, the tablet 1570 may further include a battery 1578 or, in alternative embodiments, other power source for supplying electrical current.

Further illustrated, the tablet 1570 and/or the relay module 1551 coupled with the cable storage drum 1550 may further be wireless connected with each other as well as a remote server such as a cloud server 1599. The cloud server 1599 may optionally store camera head position data as well as related mapping data for further communication with inspection systems that may be present in the same area in the future as well as other smartphones, tablet computer, laptops, and other devices.

Further, the system 1500 may include additional camera head position tracking devices such as the utility locator device 1580. The utility locator device 1580 may include a locator element 1581 further having one or more antennas 1582 and a receiver circuitry 1583 which may, for example, include one or more buffers, amplifiers, signal conditioners, analog-to-digital (A/D) converters, multiplexers, and the like to provide filtering functionality, signal conditioning, or the like for outputs to the processing element 1593 and determine the emission location of a signal 1518 emitted by a pipe Sonde 1516 for determining a Sonde locating data 1568. Likewise, the utility locator device 1590 may determine the emission location of a signal 1525 emitted by the push-cable 1520 and/or the pipe 1520 wherein current is coupled thereto. This data may be referred to herein as "line locating data" such as a line locating data 1526 illustrated in FIG. 15B. For instance, the signal 1525 is emitted by the push-cable 1520 wherein the CCU 1560 includes signal transmitter functionality for coupling current with the push-cable 1520 sensed by the utility locator device 1590 in generating the line locating data 1526. In other embodiments, other transmitter devices (e.g., those transmitters of the incorporated patents and applications) may couple a signal onto a pipe or push-cable in generating such line locating data.

Referring back to FIG. 15B, the utility locator device 1590 may be or share aspects with those disclosed U.S. Pat. No. 7,332,901, issued Feb. 19, 2008, entitled LOCATOR WITH APPARENT DEPTH INDICATION; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,057,754, issued Jun. 16, 2015, entitled ECONOMICAL MAGNETIC LOCATOR APPARATUS AND METHOD; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 29/692,937, filed May 29, 2019, entitled BURIED OBJECT LOCATOR; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,690,795, issued Jun. 23, 2020, entitled LOCATING DEVICES, SYSTEMS, AND METHODS USING FREQUENCY SUITES FOR UTILITY DETECTION; and U.S. Pat. No. 10,809,408, issued Oct. 20, 2020, entitled DUAL SENSED LOCATING SYSTEMS AND METHODS; and/or others disclosed in the incorporated patents and applications. The content of each of these applications is incorporated by reference herein in its entirety.

The pipe Sonde 1516 may be at a known position inside the camera head 1510. The pipe Sonde 1516 may be or share aspects with those disclosed in U.S. Pat. No. 7,009,399, issued Mar. 7, 2006, entitled OMNIDIRECTIONAL SONDE AND LINE LOCATOR; U.S. Pat. No. 7,221,136, issued May 22, 2007, entitled SONDES FOR LOCATING UNDERGROUND PIPES AND CONDUITS; U.S. Pat. No. 7,298,126, issued Nov. 20, 2007, entitled SONDES FOR LOCATING UNDERGROUND PIPES AND CONDUITS; U.S. Pat. No. 7,336,078, issued Feb. 26, 2008, entitled MULTI-SENSOR MAPPING OMNIDIRECTIONAL SONDE AND LINE LOCATOR; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,864,980, issued Jan. 4, 2011, entitled SONDES FOR LOCATING UNDERGROUND PIPES AND CONDUITS; U.S. Pat. No. 8,035,390, issued Oct. 11, 2011, entitled OMNIDIRECTIONAL SONDE AND LINE LOCATOR; U.S. patent application Ser. No. 14/027,027, filed Sep. 13, 2013, entitled SONDE DEVICES INCLUDING A SECTIONAL FERRITE CORE STRUCTURE; U.S. Pat. No. 9,411,066, issued Aug. 9, 2016, entitled SONDES & METHODS FOR USE WITH BURIED LINE LOCATOR SYSTEMS; U.S. Pat. No. 9,798,033, issued Oct. 24, 2017, entitled SONDE DEVICES INCLUDING A SECTIONAL FERRITE CORE; U.S. patent application Ser. No. 16/792,047, filed Feb. 14, 2020, entitled SATELLITE AND MAGNETIC FIELD SONDE APPARATUS AND METHODS; U.S. Pat. No. 10,761,233, issued Sep. 1, 2020, entitled SONDES AND METHODS FOR USE WITH BURIED LINE LOCATOR SYSTEMS; and/or others disclosed in the incorporated patents and applications. The content of each of these applications is incorporated by reference herein in its entirety.

In order to locate the camera head 1510, the utility locator device 1580 may receive the inertial navigation data 1545 as well as various other camera head position data (e.g., the visual motion data 1519, the push-cable payout data 1555, and/or other positioning data 1547) via a camera head tracking element 1590 having a radio communication module 1591 (e.g., Bluetooth, Wi-Fi, ISM, or the like). A GNSS receiver and/or other positioning element 1592 may be included in determining a geolocation/position for the utility locator device 1580. The other positioning element of the GNSS receiver and/or other positioning element 1592 may, for instance, be or include gyroscopic sensors, accelerometers, magnetometers, other inertial navigation sensors, or the like. For instance, a pose or orientation in three-dimensional space may be determined via inertial navigation sensors in the GNSS receiver and/or other positioning element 1592 for the utility locator device 1580. In some embodiments, the INS may include one or more barometers (not illustrated). Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point. In some embodiments, the other positioning element of the GNSS receiver and/or other positioning element 1592 may be or include the apparatus, systems, and methods disclosed in U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,784,837, issued Oct. 10, 2017, entitled OPTICAL GROUND TRACKING APPARATUS, SYSTEMS & METHODS; U.S. patent application Ser. No. 15/811,361, filed Nov. 13, 2017, entitled OPTICAL GROUND-TRACKING APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/936,250, filed Mar. 26, 2018, entitled GROUND TRACKING APPARATUS, SYSTEMS, AND METHODS; U.S. Pat. No. 9,928,613, issued Mar. 27, 2018, entitled GROUND TRACKING APPARATUS, SYSTEMS, AND METHODS; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; and/or other disclosed in the incorporated patents and applications. The content of each of these applications is incorporated by reference herein in its entirety.

Still referring to FIG. 15B, a processing element 1593, having one or more processors, may process the camera head position data 1540 including the Sonde locating data 1568, the inertial navigation data, the visual motion data 1519, the other positioning data 1547, and the push-cable payout data 1555 relative to the geolocation/position data of the utility locator device 1580 to locate and track the camera head 1510. As the video inspection and camera head tracking system 1500 includes a multitude of source inputs for the camera head position data 1540, a method may account for differences in results between the camera head position data 1540 including the Sonde locating data 1568, the inertial navigation data, the visual motion data 1519, the other positioning data 1547, and the push-cable payout data 1555 for determining a position for the camera head 1510. For instance, the position of the camera head 1510 may be determined via the method 400 of FIG. 4 or the method 800 of FIG. 8.

Referring to FIG. 15B, the utility locator device 1580 may further include a memory element 1594 having one or more non-transitory memories that may store the camera head position data 1540. As the utility locator device 1580 may have a position known via the GNSS receiver and/or other positioning element 1592 and the position of the camera head 1510 may be known via the method 400 of FIG. 4 or the method 800 of FIG. 8, the utility locator device 1580 may direct a user towards the position of the camera head 1510. For instance, the utility locator device 1580 may include a display 1595 to visually indicate direction towards the camera head. The utility locator device 1580 may direct a user towards the position of the camera head 1510 from the inertial navigation data 1545 and, optionally, visual motion data 1519, push-cable payout data 1555, and/or other positioning data 1547. For instance, as illustrated in FIG. 15A, the utility locator device 1580 may include a display 1595 to visually indicate direction, such as with the visual indicator 1586, towards the camera head 1510 (e.g., such as the display 1310 of FIG. 13 or the display 1410 of FIG. 14), provide audio directions via a speaker 1596, and/or haptic feedback via a haptic feedback mechanism 1597. The display 1595 of the utility locator device 1580 may further include video or images from inside the pipe 1530 such as an inspection video 1587. Back to FIG. 15B, the utility locator device 1580 may further include a battery 1598 or, in alternative embodiments, other power source for supplying electrical current.

Further illustrated, the utility locator device 1580 and/or the relay module 1551 coupled with the cable storage drum 1550 may further be wirelessly connected with each other as well as a remote server such as a cloud server 1599. For instance, the utility locator device 1510 may communicate Sonde locating data 1568 as well as the line locating data 1526 with the tablet 1570 and other camera head position tracking devices lacking the capacity to sense the pipe Sonde 1516 signal 1518 or the signal 1525 emitted by the push-cable 1520. The cloud server 1599 may optionally store camera head position data as well as related mapping data for further communication with inspection systems that may be present in the same area in the future as well as other smartphones, tablet computer, laptops, and other devices.

Turning to FIG. 16, a method 1600 is disclosed for generating a map including camera head movements using a video inspection and camera head tracking system of the present invention. In a step 1605, the method 1600 may include determining and storing a camera head moving through a pipe or other cavity. For instance, the step 1605 may include the use of the various other methods disclosed herein (e.g., the method 400 of FIG. 4, the method 500 of FIG. 5, the method 800 of FIG. 8, the method 900 of FIG. 9A, the method 920 of FIG. 9B, the method of FIG. 9C, and the method 1100 of FIG. 11). In a step 1610, the method 1600 may include generating a camera head position map from the determined movements of the camera head. For instance, the movements determined via an INS or other positioning system (e.g., the camera head position data of the present disclosure) may successfully add together anchored to the known position of a cable storage drum. In a step 1615, the camera head position map may be merged with a map of the ground surface. For instance, the camera head position map, having a known geolocation/position that may further include a heading, may be merged with a surface level map at the same geolocation/position and oriented via the heading of the camera head position map. In a step 1620, the resulting combined map may be stored in one or more non-transitory memories.

Figure 17:
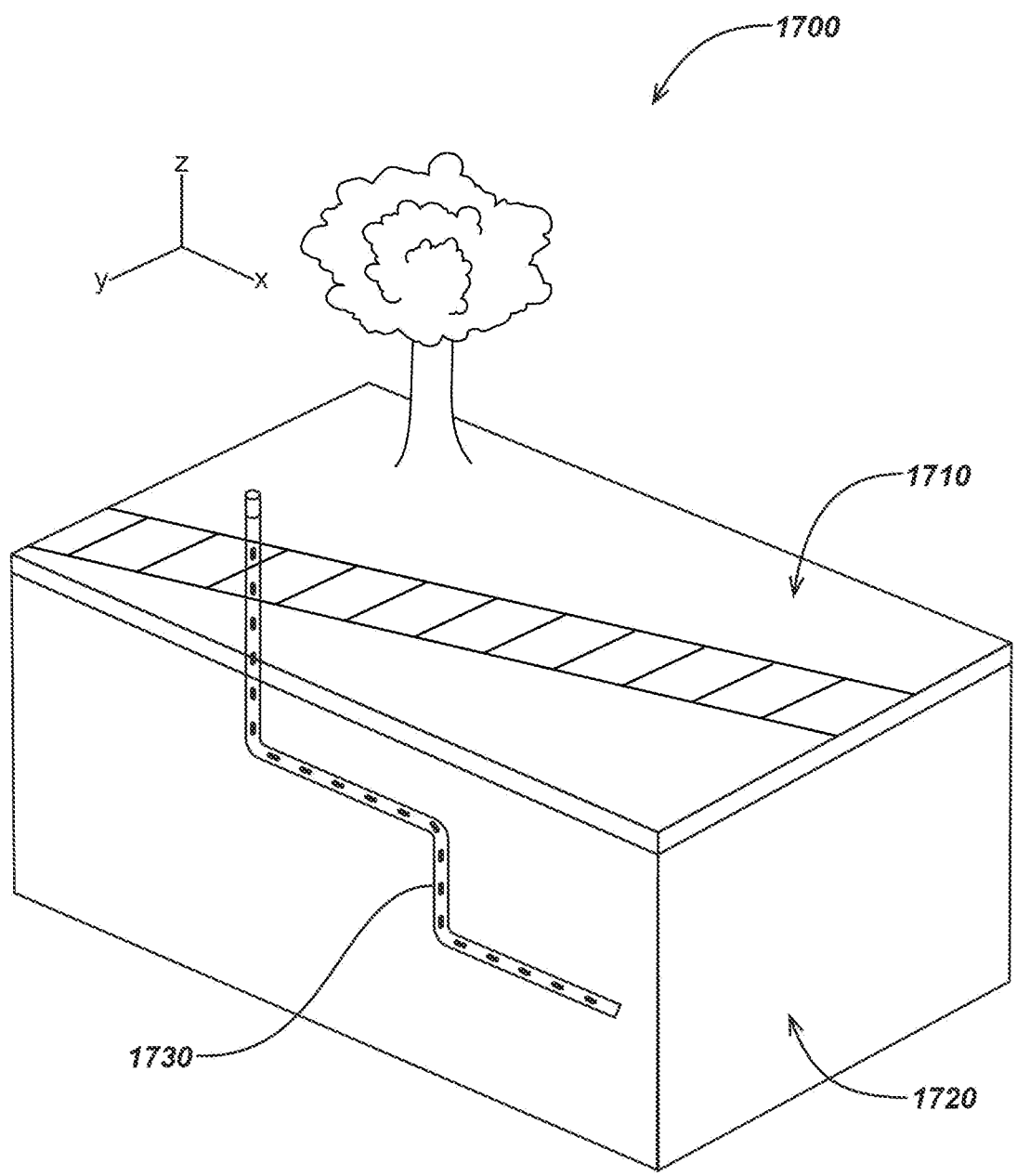
FIG. 17 is an illustration of a map containing mapped camera head positions merged with a map of the world surface.

An example of a combined map 1700 is illustrated in FIG. 17 which may have been generated via the method 1600 of FIG. 16. The combined map 1700 may include a surface map 1710 of the world surface merged with a camera head position map 1720 that may include a series of camera head movements 1730. It should be noted, that as illustrated, the camera head position map 1720 may be three dimensional (e.g., having an x, y, and z or latitude, longitude, and depth dimensions) and may be merged with the surface map 1710 of the world surface that may be either two dimensional (e.g., having an x and y or a latitude and longitudinal horizontal dimensions) or may be three dimensional (e.g., having an x, y, and z or latitude, longitude, and depth dimensions).

Figure 18A:
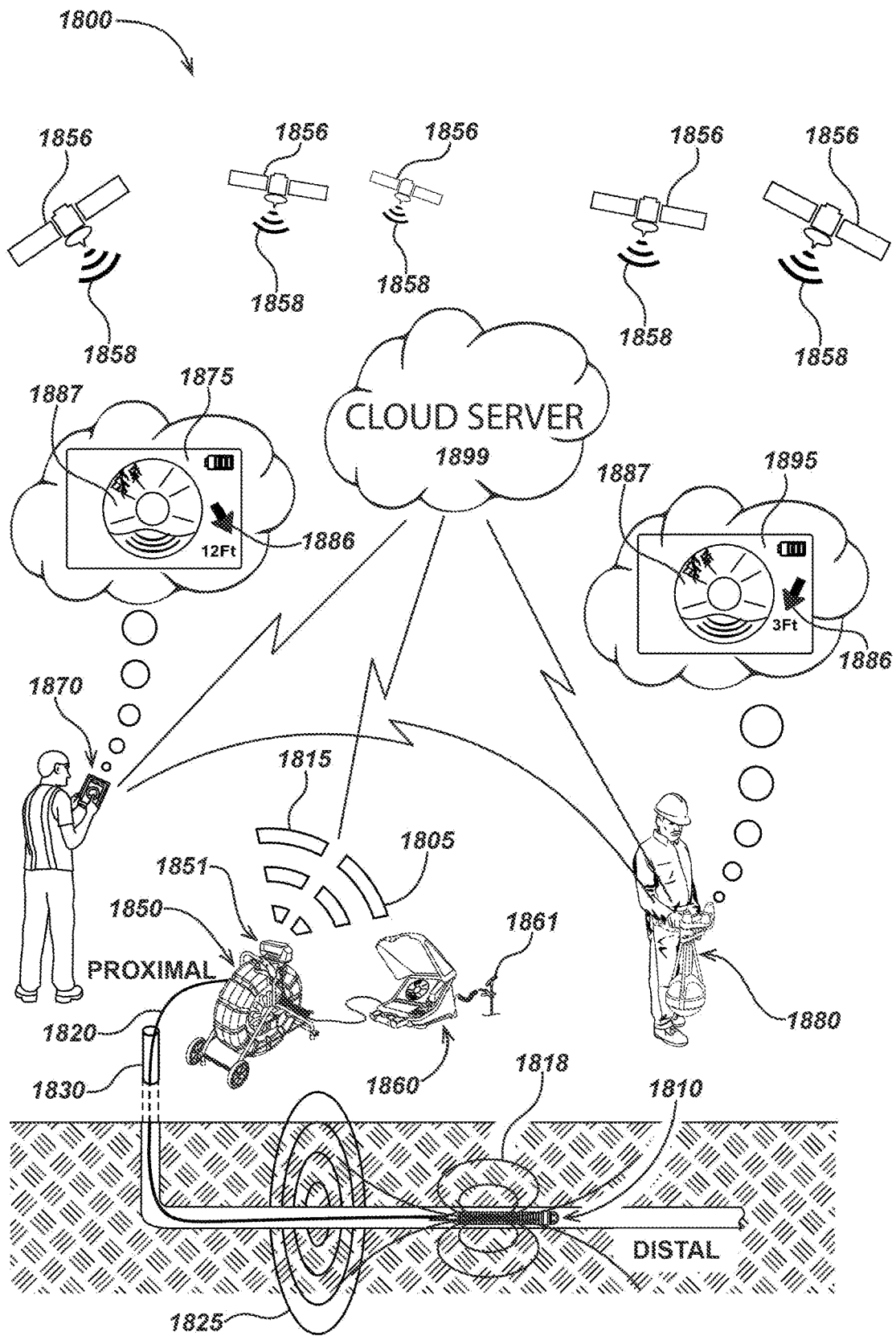
FIG. 18A is an illustration of another video inspection and camera head tracking system for use in pipes or other cavities.
Figure 18B:
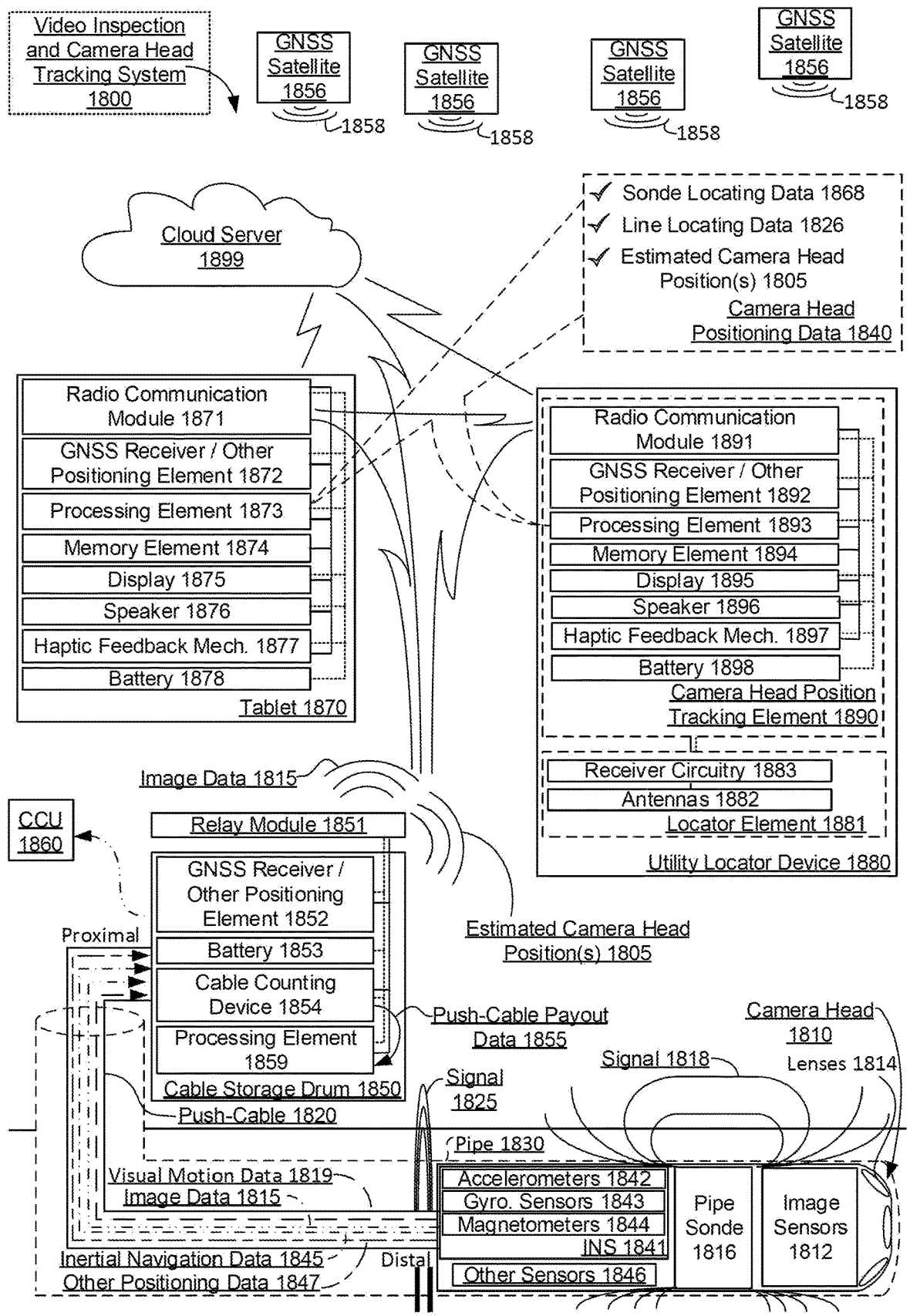
FIG. 18B is a diagram of the video inspection and camera head tracking system for use in pipe or other cavities from FIG. 18A.

In some system embodiments, a video inspection and camera head tracking system in keeping with the present disclosure may process various camera head position data in generating one or more estimated camera head position(s) at the cable storage drum or other device and broadcasting estimated camera head positions to the one or more camera head tracking devices. As illustrated in FIGS. 18A and 18B, a video inspection and camera head tracking system 1800 is illustrated which may be used in inspecting inside of pipes and other cavities while simultaneously tracking camera head positions which may share aspects with the video inspection and camera head tracking system 200 of FIGS. 2A and 2B, the video inspection and camera head tracking system 700 of FIGS. 7A and 7B, the video inspection and camera head tracking system 1000 of FIGS. 10A and 10B, the video inspection and camera head tracking system 1500 of FIGS. 15A and 15B. The video inspection and camera head tracking system 1800 may include a camera head 1810 coupled at a distal end of a push-cable 1820 that may be moved through a pipe 1830. The camera head 1810 may be or share aspects with the cameras disclosed in U.S. Pat. No. 6,831,679, entitled VIDEO CAMERA HEAD WITH THERMAL FEEDBACK LIGHTING CONTROL issued Dec. 14, 2004; U.S. Pat. No. 8,587,648, entitled SELF-LEVELING CAMERA HEAD, issued Nov. 9, 2013; U.S. Pat. No. 9,066,446, entitled THERMAL EXTRACTION ARCHITECTURE FOR CAMERA HEAD, INSPECTION SYSTEMS, AND OTHER DEVICES AND SYSTEMS issued Jun. 23, 2015; U.S. Pat. No. 9,277,105, entitled SELF-LEVELING CAMERA HEADS, issued Mar. 1, 2016; U.S. Pat. No. 9,824,433 entitled PIPE INSPECTION SYSTEM CAMERA HEADS, issued on Nov. 21, 2017; U.S. Pat. No. 9,835,564, entitled MULTI-CAMERA PIPE INSPECTION APPARATUS, SYSTEM, AND METHODS, issued Dec. 5, 2017; U.S. Pat. No. 10,288,997, entitled ROTATING CONTACT ASSEMBLIES FOR SELF-LEVELING CAMERA HEADS, issued May 14, 2019; U.S. Pat. No. 10,715,703, entitled SELF-LEVELING CAMERA HEADS, issued Jul. 14, 2020; U.S. Pat. No. 10,848,655, entitled HEAT EXTRACTION ARCHITECTURE FOR COMPACT VIDEO CAMERA HEADS, issued Nov. 24, 2020; U.S. Pat. No. 11,209,115, entitled PIPE INSPECTION AND/OR MAPPING CAMERA HEADS, SYSTEMS, AND METHODS, issued Dec. 28, 2021; and/or other disclosed in the incorporated patents and applications. The content of each of these applications is incorporated by reference herein in its entirety.

The push-cable 1820 may be or share aspects with those disclosed in U.S. Pat. No. 5,939,679, entitled VIDEO PUSH CABLE, issued Aug. 17, 1999; U.S. patent application Ser. No. 14/970,362, entitled COAXIAL VIDEO PUSH-CABLES FOR USE IN INSPECTION SYSTEMS, filed Dec. 15, 2015; U.S. Pat. No. 9,448,376, entitled HIGH BANDWIDTH PUSH-CABLES FOR VIDEO INSPECTION SYSTEMS, issued Sep. 20, 2016; U.S. Pat. No. 9,468,954, entitled PIPE INSPECTION SYSTEM INCLUDING JETTER PUSH-CABLE, issued Oct. 18, 2016; U.S. Pat. No. 10,764,541, entitled COAXIAL VIDEO PUSH-CABLES FOR USE IN INSPECTION SYSTEMS, issued Sep. 1, 2020; and/or other disclosed in the incorporated patents and applications. The content of each of these applications is incorporated by reference herein in its entirety.

Referring to FIG. 18B, the camera head 1810 may include one or more image sensors 1812 and lenses 1814 to capture video and images from the interior of the pipe 1830. The captured video and/or images from the interior of the pipe 1830, an image data 1815, may be communicated via the push-cable 1820 to a cable storage drum 1850 coupled at the proximal end of the push-cable 1820 outside the entry point to the pipe 1830 and then further onto a CCU 1860 for displaying the video/images of the image data 1815 as well as control aspects of the camera head 1810. The CCU 1860 may be or share aspects with those disclosed in U.S. Pat. No. 10,084,945, entitled CABLE STORAGE DRUM WITH MOVEABLE CCU DOCKING APPARATUS, issued Sep. 25, 2018; U.S. patent application Ser. No. 17/190,400, filed Mar. 3, 2021, entitled DOCKABLE CAMERA REEL AND CCU SYSTEM; and/or other disclosed in the incorporated patents and applications. The content of each of these applications is incorporated by reference herein in its entirety. The CCU 1860 illustrated in FIG. 18B may include a transmitter element for coupling current with the push-cable 1820 in generating a signal 1825. Further, a ground stake 1861 may be connected with the CCU 1860 for accepting ground return current. In other embodiments, a separate transmitter device may be included in a system for coupling electrical current onto a push-cable, such as the push-cable, or a pipe, such as the pipe 1830. The transmitter element in the CCU 1860 or other transmitter device that may be used with a system of the present disclosure may be or share aspects with U.S. Pat. No. 7,619,516, issued Nov. 17, 2009, entitled SINGLE AND MULTI-TRACE OMNI-DIRECTIONAL SONDE AND LINE LOCATORS AND TRANSMITTER USED THEREWITH; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTILITY LOCATOR INCLUDING A CAMERA; U.S. patent Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; and/or other disclosed in the incorporated patents and applications. The content of each of these applications is incorporated by reference herein in its entirety.

One or more of an INS 1841 may determine positions of the camera head 1810 relative to the cable storage drum 1850. The INS 1841 may be or include, but should not be limited to, accelerometers 1842, gyroscopic sensors 1843, and magnetometers 1844 that may measure in three dimensions for generating inertial navigation data 1845. Inertial navigation data, such as the inertial navigation data 1845 of FIG. 18B, may, in various embodiments, be included in a camera head position data 1840. In some embodiments, the INS may include one or more barometers (not illustrated). The inertial navigation data 1845 may be communicated, via the push-cable 1820, to the cable storage drum 1850 coupled at the proximal end of the push-cable 1820 outside the entry point to the pipe 1830.

The camera head 1810, via processing of the image data 1815, may further generate visual motion data 1819 that may also be included the camera head position data 1840. For instance, adjacent video frames may be compared and, through various tracking and motion estimation algorithms, determine direction and distance for movements of the camera head 1810. The visual motion data 1819 may be communicated, via the push-cable 1820, to the cable storage drum 1850 coupled at the proximal end of the push-cable 1820 outside the entry point to the pipe 1830.

Further, the camera head 1810 may include one or more other sensors 1846 for generating other positioning data 1847. For instance, the other sensors 1847 may include, for instance LiDAR, acoustic motion sensors, or the like producing the other positioning data 1847 for tracking movements of the camera head 1810. The other positioning data 1847 may be communicated, via the push-cable 1820, to the cable storage drum 1850 coupled at the proximal end of the push-cable 1820 outside the entry point to the pipe 1830.

Referring to FIG. 18B, the cable storage drum 1850 may include a processing element 1859 having one or more processors for processing the inertial navigation data 1845, visual motion data 1819, other positioning data 1847, and push-cable payout data 1855 relative to the position of the cable storage drum 1850 and generating one or more estimated camera head positions 1805. The one or more estimated camera head positions 1805 or, optionally, a singular estimated camera head position result may be generated via the method 1900 of FIG. 19. The estimated camera head positions 1805 or, optionally, a singular estimated camera head position result may further be broadcasted via a relay module or other radio communication module (e.g., Bluetooth, Wi-Fi, ISM, or the like), such as the relay module 1851. In other embodiments, the CCU 1860, the relay module 1851, and/or other connected device may process the inertial navigation data, visual motion data, other positioning data, and push-cable payout data relative to the position of the cable storage drum via the method 1900 of FIG. 19 prior to broadcasting estimated camera head position(s). The relay module 1841 may be or share aspects with those disclosed in U.S. patent application Ser. No. 17/528,956, filed Nov. 17, 2021, entitled VIDEO INSPECTION SYSTEM APPARATUS AND METHODS WITH RELAY MODULE AND CONNECTION PORTS and/or others disclosed in the incorporated patents and applications. The content of the application is incorporated by reference herein in its entirety. In other embodiments, such a radio communication module may instead or additionally be disposed in the cable storage drum or other connected ground surface device (e.g., such as the CCU 1860).

Still referring to FIG. 18B, it should be noted that the position of the cable storage drum 1850 may be known. For instance, the cable storage drum 1850 may include a GNSS receiver and/or other positioning element 1852 for determining a position (e.g., geolocation/position plus orientation or pose at the geolocation/position). The GNSS receiver and/or other positioning element 1852 may receive navigation signals 1858 from a plurality of GNSS satellites 1856 to generate a position via a geographic coordinate system. Likewise, the other positioning element of the GNSS receiver and/or other positioning element 1852 may include one or more other positioning sensors or apparatus. In some embodiments, the GNSS receiver and/or other positioning element 1852 may include one or more magnetometers and/or other inertial navigation sensors (not illustrated) for determining a heading at the geolocation/position determine via the GNSS receiver. In some embodiments, such geolocation/positions may instead or additionally include an input allowing a user to select the position of a cable storage drum (e.g., the cable storage drum position 1240 of FIG. 12). Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point. The cable storage drum 1850 may further include a battery 1853 or, in alternative embodiments, other power source for supplying electrical current. Optionally, the cable storage drum 1850 may include a cable counting device 1854 for generating a push-cable payout data 1855 that may be a measure the length of push-cable 1820 dispensed into the pipe 1830 or another cavity. The cable counting device 1854 may be or share aspects with those disclosed in U.S. Pat. No. 8,970,211, issued Mar. 3, 2015, entitled PIPE INSPECTION CABLE COUNTER AND OVERLAY MANAGEMENT SYSTEM and/or others disclosed in the incorporated patents and applications. The content of each which is incorporated by reference herein in its entirety. In such embodiments, the push-cable payout data 1855 from the cable counting device 1854 may be used to verify the total length of movements by the inertial navigation data 1845, as disclosed in the method 500 of FIG. 5, and optionally generate a camera head range that may be communicated to a user via a display (e.g., the camera head range 330 of the display 310 illustrated in FIG. 3).

The tablet 1870 may include a radio communication module 1871 (e.g., via Bluetooth, Wi-Fi, ISM, or the like) for receiving the estimated camera head position(s) 1805 that may be included in the camera head position data 1840. A GNSS receiver and/or other positioning element 1872 may be included for determining a geolocation/position for the tablet 1870 and/or other camera head position tracking device in other embodiments (e.g., smartphones, laptops, other portable computing devices, and/or the like). The other positioning element of the GNSS receiver and/or other positioning element 1872 may, for instance, be or include gyroscopic sensors, accelerometers, magnetometers, other inertial navigation sensors, or the like. For instance, a pose or orientation in three-dimensional space may be determined via inertial navigation sensors in the GNSS receiver and/or other positioning element 1872 for the tablet 1870. In some embodiments, the INS may include one or more barometers (not illustrated).

Still referring to FIG. 18B, a processing element 1873, having one or more processors, may process the camera head position data 1840 to locate and track the camera head 1810. The camera head position data 1840 may include estimated camera head position(s) 1805 and, as later disclosed herein, a Sonde locating data, determined by the utility locator device 1880 from the signal 1818 emitted by the pipe Sonde 1816, and a line locating data 1826, determined by the utility locator device 1880 from the signal 1825 emitted by the push-cable 1820. The locating and tracking of the camera head 1810 may, for instance, use the method 1900 of FIG. 19.

Figure 19:
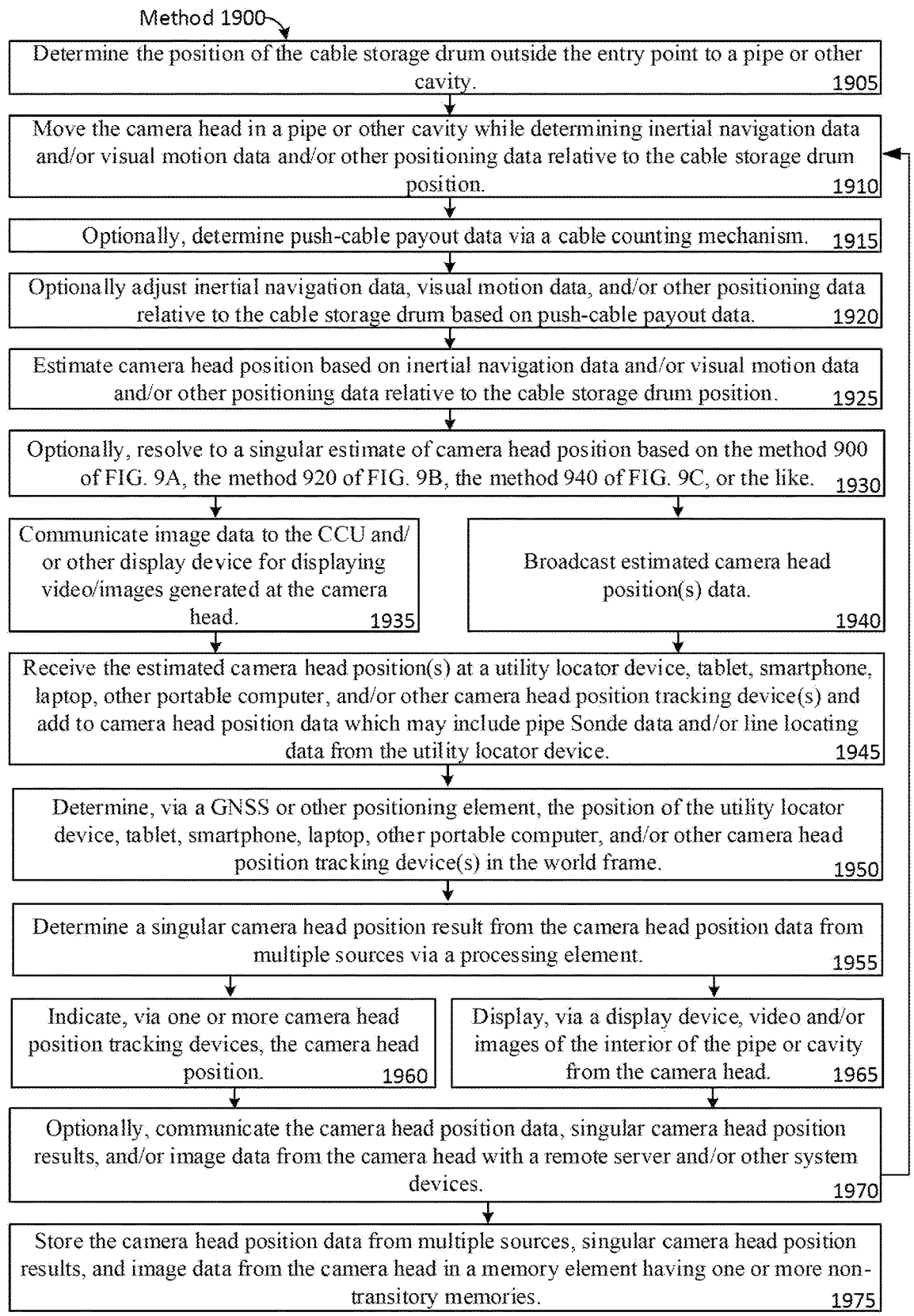
FIG. 19 is a method for determining the camera head position via the video inspection and camera head tracking system.

Referring to FIG. 18B, the tablet 1870 may further include a memory element 1874 having one or more non-transitory memories that may store the camera head position data 1840. As the tablet 1870 may have a position known via the GNSS receiver and/or other positioning element 1872 and the position of the camera head 1810 may be known may via the method 1100 of FIG. 11 or the method 1900 of FIG. 19, the tablet 1970 may direct a user towards the position of the camera head 1810 from the camera head position data 1840. For instance, as illustrated in FIG. 19A, the tablet 1870 may include a display 1875 to visually indicate direction, such as with the visual indicator 1886, towards the camera head 1810, provide audio directions via a speaker 1876, and/or haptic feedback via a haptic feedback mechanism 1877. The display 1895 of the tablet 1870 may further include video or images from inside the pipe 1830 such as an inspection video 1887. Turning back to FIG. 18B, the tablet 1870 may further include a battery 1878 or, in alternative embodiments, other power source for supplying electrical current.

Further illustrated, the tablet 1870 and/or the relay module 1851 coupled with the cable storage drum 1850 may further be wireless connected with each other as well as a remote server such as a cloud server 1899. The cloud server 1899 may optionally store camera head position data as well as related mapping data for further communication with inspection systems that may be present in the same area in the future as well as other smartphones, tablet computer, laptops, and other devices.

Further, the system 1800 may include additional camera head position tracking devices such as the utility locator device 1880. The utility locator device 1880 may include a locator element 1881 further having one or more antennas 1882 and a receiver circuitry 1883 which may, for example, include one or more buffers, amplifiers, signal conditioners, analog-to-digital (A/D) converters, multiplexers, and the like to provide filtering functionality, signal conditioning, or the like for outputs to the processing element 1893 and determine the emission location of a signal 1818 emitted by a pipe Sonde 1816 for determining a Sonde locating data 1868. Likewise, the utility locator device 1890 may determine the emission location of a signal 1825 emitted by the push-cable 1920 and/or the pipe 1820 wherein current is coupled thereto. This data may be referred to herein as "line locating data" such as a line locating data 1826 illustrated in FIG. 18B. For instance, the signal 1825 is emitted by the push-cable 1820 wherein the CCU 1860 includes signal transmitter functionality for coupling current with the push-cable 1820 sensed by the utility locator device 1890 in generating the line locating data 1826. In other embodiments, other transmitter devices (e.g., those transmitters of the incorporated patents and applications) may couple a signal onto a pipe or push-cable in generating such line locating data.

Referring back to FIG. 18B, the utility locator device 1890 may be or share aspects with those disclosed U.S. Pat. No. 7,332,901, issued Feb. 19, 2008, entitled LOCATOR WITH APPARENT DEPTH INDICATION; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,057,754, issued Jun. 16, 2015, entitled ECONOMICAL MAGNETIC LOCATOR APPARATUS AND METHOD; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 29/692,937, filed May 29, 2019, entitled BURIED OBJECT LOCATOR; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,690,795, issued Jun. 23, 2020, entitled LOCATING DEVICES, SYSTEMS, AND METHODS USING FREQUENCY SUITES FOR UTILITY DETECTION; and U.S. Pat. No. 10,809,408, issued Oct. 20, 2020, entitled DUAL SENSED LOCATING SYSTEMS AND METHODS; and/or others disclosed in the incorporated patents and applications. The content of each of these applications is incorporated by reference herein in its entirety.

The pipe Sonde 1816 may be at a known position inside the camera head 1810 or, in other embodiments, at a known portion relative to the camera head on the push-cable. The pipe Sonde 1816 may be or share aspects with those disclosed in U.S. Pat. No. 7,009,399, issued Mar. 7, 2006, entitled OMNIDIRECTIONAL SONDE AND LINE LOCATOR; U.S. Pat. No. 7,221,136, issued May 22, 2007, entitled SONDES FOR LOCATING UNDERGROUND PIPES AND CONDUITS; U.S. Pat. No. 7,298,126, issued Nov. 20, 2007, entitled SONDES FOR LOCATING UNDERGROUND PIPES AND CONDUITS; U.S. Pat. No. 7,336,078, issued Feb. 26, 2008, entitled MULTI-SENSOR MAPPING OMNIDIRECTIONAL SONDE AND LINE LOCATOR; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,864,980, issued Jan. 4, 2011, entitled SONDES FOR LOCATING UNDERGROUND PIPES AND CONDUITS; U.S. Pat. No. 8,035,390, issued Oct. 11, 2011, entitled OMNIDIRECTIONAL SONDE AND LINE LOCATOR; U.S. patent application Ser. No. 14/027,027, filed Sep. 13, 2013, entitled SONDE DEVICES INCLUDING A SECTIONAL FERRITE CORE STRUCTURE; U.S. Pat. No. 9,411,066, issued Aug. 9, 2016, entitled SONDES & METHODS FOR USE WITH BURIED LINE LOCATOR SYSTEMS; U.S. Pat. No. 9,798,033, issued Oct. 24, 2017, entitled SONDE DEVICES INCLUDING A SECTIONAL FERRITE CORE; U.S. patent application Ser. No. 16/792,047, filed Feb. 14, 2020, entitled SATELLITE AND MAGNETIC FIELD SONDE APPARATUS AND METHODS; U.S. Pat. No. 10,761,233, issued Sep. 1, 2020, entitled SONDES AND METHODS FOR USE WITH BURIED LINE LOCATOR SYSTEMS; and/or others disclosed in the incorporated patents and applications. The content of each of these applications is incorporated by reference herein in its entirety.

In order to locate the camera head 1810, the utility locator device 1880 may receive the estimated camera head position (s) 1805 via a camera head tracking element 1890 having a radio communication module 1891 (e.g., Bluetooth, Wi-Fi, ISM, or the like). A GNSS receiver and/or other positioning element 1892 may be included in determining a geolocation/position for the utility locator device 1880. The other positioning element of the GNSS receiver and/or other positioning element 1892 may, for instance, be or include gyroscopic sensors, accelerometers, magnetometers, other inertial navigation sensors, or the like. For instance, a pose or orientation in three-dimensional space may be determined via inertial navigation sensors in the GNSS receiver and/or other positioning element 1892 for the utility locator device 1880. In some embodiments, the INS may include one or more barometers (not illustrated). In some embodiments, the other positioning element of the GNSS receiver and/or other positioning element 1992 may be or include the apparatus, systems, and methods disclosed in U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,784,837, issued Oct. 10, 2017, entitled OPTICAL GROUND TRACKING APPARATUS, SYSTEMS & METHODS; U.S. patent application Ser. No. 15/811,361, filed Nov. 13, 2017, entitled OPTICAL GROUND-TRACKING APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/936,250, filed Mar. 26, 2018, entitled GROUND TRACKING APPARATUS, SYSTEMS, AND METHODS; U.S. Pat. No. 9,928,613, issued Mar. 27, 2018, entitled GROUND TRACKING APPARATUS, SYSTEMS, AND METHODS; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; and/or other disclosed in the incorporated patents and applications. The content of each of these applications is incorporated by reference herein in its entirety.

Still referring to FIG. 18B, a processing element 1893, having one or more processors, may process the camera head position data 1840 relative to the geolocation/position data of the utility locator device 1880 to locate and track the camera head 1810. As the video inspection and camera head tracking system 1800 includes a multitude of source inputs for the camera head position data 1840, via the method 1900 of FIG. 19 and, further, the method 900 of FIG. 9A, the method 920 of FIG. 9B, and the method 940 of FIG. 9C.

Referring to FIG. 18B, the utility locator device 1880 may further include a memory element 1894 having one or more non-transitory memories that may store the camera head position data 1840. As the utility locator device 1880 may have a position known via the GNSS receiver and/or other positioning element 1892 and the position of the camera head 1810 may be known via the method 400 of FIG. 4, the method 800 of FIG. 8, the method 1100 of FIG. 11, or the method 1900 of FIG. 19, the utility locator device 1880 may direct a user towards the position of the camera head 1810. For instance, the utility locator device 1880 may include a display 1895 to visually indicate direction towards the camera head. For instance, as illustrated in FIG. 18A, the utility locator device 1880 may include a display 1895 to visually indicate direction, such as with the visual indicator 1886, towards the camera head 1810 (e.g., such as the display 1310 of FIG. 13 or the display 1410 of FIG. 14). The display 1895 of the utility locator device 1880 may further include video or images from inside the pipe 1830 such as an inspection video 1887. Turning back to FIG. 18B, the utility locator device 1880 may further provide audio directions via a speaker 1896, and/or haptic feedback via a haptic feedback mechanism 1897. The utility locator device 1880 may further include a battery 1898 or, in alternative embodiments, other power source for supplying electrical current.

Further illustrated, the utility locator device 1880 and/or the relay module 1851 coupled with the cable storage drum 1850 may further be wirelessly connected with each other as well as a remote server such as a cloud server 1899. For instance, the utility locator device 1810 may communicate Sonde locating data 1868 as well as the line locating data 1826 with the tablet 1870 and other camera head position tracking devices lacking the capacity to sense the pipe Sonde 1816 signal 1818 or the signal 1825 emitted by the push-cable 1820. The cloud server 1899 may optionally store camera head position data as well as related mapping data for further communication with inspection systems that may be present in the same area in the future as well as other smartphones, tablet computer, laptops, and other devices.

Turning to FIG. 19, a method 1900 is disclosed for locating and tracking a camera head using a system of the present disclosure. In a step 1905, the method 1900 may include determining the position of the cable storage drum outside the entry point to a pipe or other cavity. In some embodiments, the position of the cable storage drum outside the entry point to a pipe or other cavity may be determined via GNSS or like positioning element providing latitude and longitude coordinates. Likewise, it should be noted not all embodiments rely upon positions or geolocations in a geographic coordinate system having latitude and longitude measurements and the camera head position data may be a distance and direction relative to the cable storage drum, entry point to the pipe or other cavity, or other reference point. In a step 1910, the method 1900 may include moving the camera head in a pipe or other cavity while determining inertial navigation data and/or visual motion data and/or other positioning data relative to the cable storage drum position. In an optional step 1915, the method 1900 may include determining push-cable payout data via a cable counting mechanism. In another option step 1920, the method 1900 may include adjusting inertial navigation data, visual motion data, and/or other positioning data relative to the cable storage drum based on push-cable payout data. In a step 1925, the method 1900 may include estimating the camera head position based on inertial navigation data and/or visual motion data and/or other positioning data relative to the cable storage drum position. For instance, the step 1925 may occur in the processing element of a cable storage drum, relay module, CCU, or other connected device (e.g., the processing element 1859 of FIG. 18B). In an optional step 1930, the method 1900 may include resolving a singular estimate of camera head position based on the method 900 of FIG. 9A, the method 920 of FIG. 9B, the method 940 of FIG. 9C, or the like. In a step 1935, the method 1900 may include communicating image data to the CCU and/or other display device for displaying video/ images generated at the camera head. In a step 1940 concurrent with the step 1935, the method 1900 may include broadcasting estimated camera head position(s) data. In a step 1945, the method may include receiving the estimated camera head position(s) at a utility locator device, tablet, smartphone, laptop, other portable computer, and/or other camera head position tracking device(s) and add to camera head position data which may include pipe Sonde data and/or line locating data from the utility locator device. In a step 1950, the method 1900 may include determining, via a GNSS or other positioning element, the position of the utility locator device, tablet, smartphone, laptop, other portable computer, and/or other camera head position tracking device(s). In a step 1955, the method 1900 may include determining a singular camera head position results from the camera head position data from multiple sources via a processing element. In a step 1960, the method 1900 may include indicating, via one or more camera head position tracking devices, the camera head position. In a step 1965 concurrent with the step 1960, the method 1900 may include displaying, via a display device, video and/or images of the interior of the pipe or cavity from the camera head. In an optional step 1970, the method 1900 may include communicating the camera head position data, singular camera head position results, and/or image data from the camera head with a remote server and/or other system devices. In another optional step 1975, the method 1900 may include storing the camera head position data from multiple sources, singular camera head position results, and image data from the camera head in a memory element having one or more non-transitory memories.

In some system embodiments, a video inspection and camera head tracking system in keeping with the present disclosure need not rely upon GNSS for determining the position of a cable storage drum or, otherwise, the entry point to a pipe or other cavity.

Figure 20A:
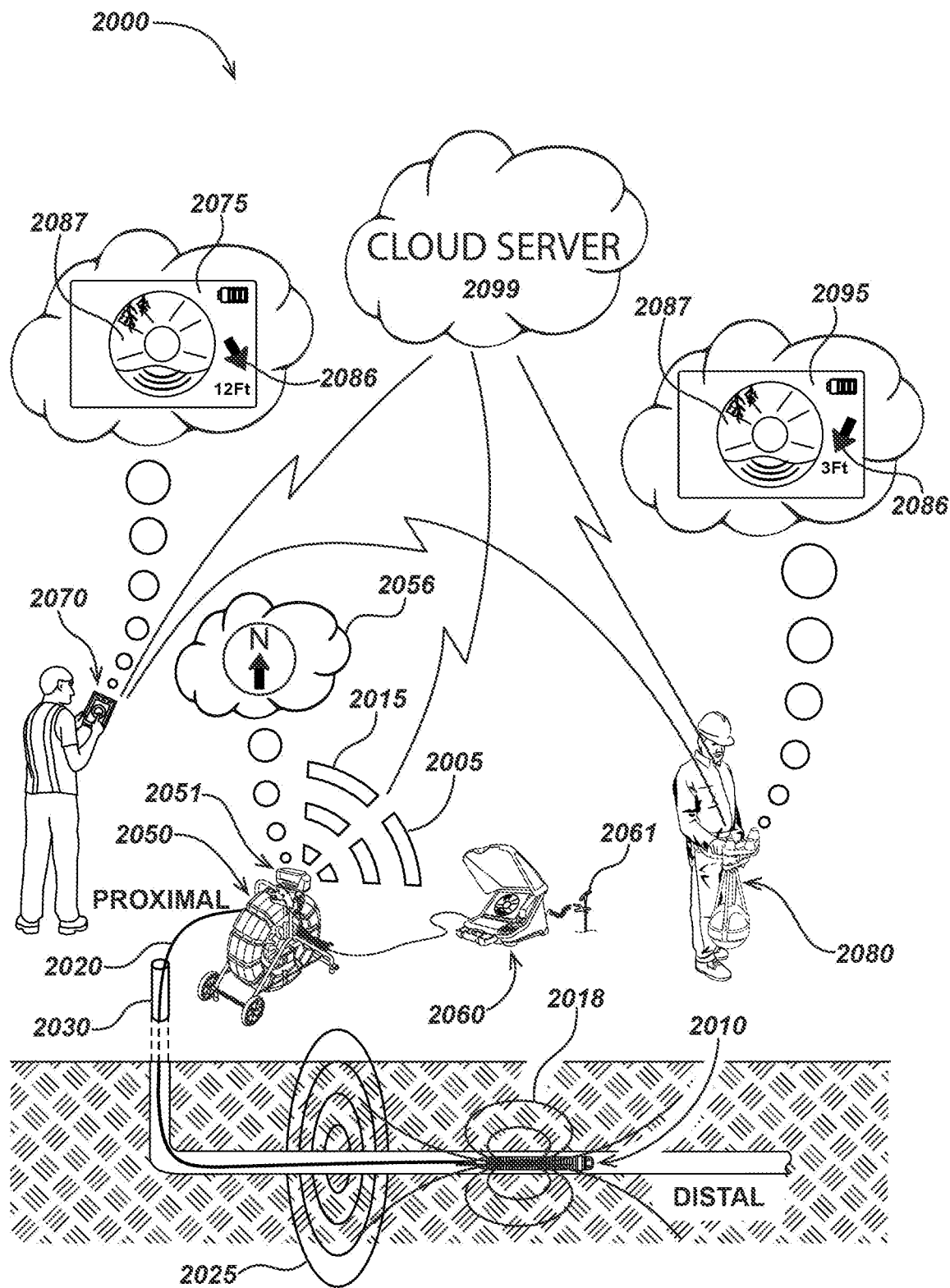
FIG. 20A is an illustration of another video inspection and camera head tracking system for use in pipe or other cavities having a cable storage drum without a GNSS.
Figure 20B:
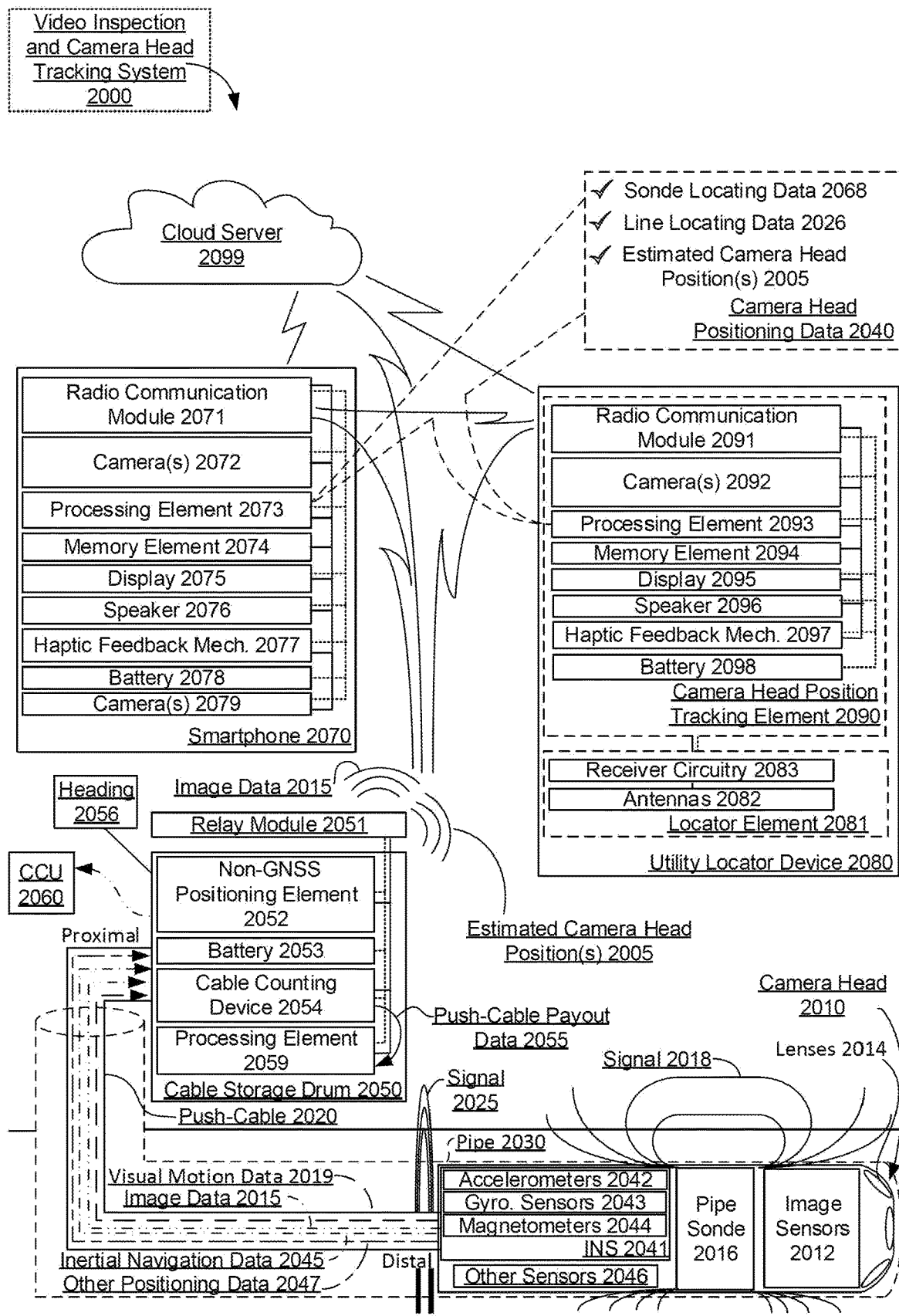
FIG. 20B is a diagram of the video inspection and camera head tracking system for use in pipe or other cavities from FIG. 20A.

As illustrated in FIGS. 20A and 20B, a video inspection and camera head tracking system 2000 is illustrated which may be used in inspecting inside of pipes and other cavities while simultaneously tracking camera head positions which may share aspects with the video inspection and camera head tracking system 200 of FIGS. 2A and 2B, the video inspection and camera head tracking system 700 of FIGS. 7A and 7B, the video inspection and camera head tracking system 1000 of FIGS. 10A and 10B, the video inspection and camera head tracking system 1500 of FIGS. 15A and 15B, and the video inspection and camera head tracking system 1800 of FIGS. 18A and 18B. The video inspection and camera head tracking system 2000 may include a camera head 2010 coupled at a distal end of a push-cable 2020 that may be moved through a pipe 2030. The camera head 2010 may be or share aspects with the cameras disclosed in U.S. Pat. No. 6,831,679, entitled VIDEO CAMERA HEAD WITH THERMAL FEEDBACK LIGHTING CONTROL issued Dec. 14, 2004; U.S. Pat. No. 8,587,648, entitled SELF-LEVELING CAMERA HEAD, issued Nov. 9, 2013; U.S. Pat. No. 9,066,446, entitled THERMAL EXTRACTION ARCHITECTURE FOR CAMERA HEAD, INSPECTION SYSTEMS, AND OTHER DEVICES AND SYSTEMS issued Jun. 23, 2015; U.S. Pat. No. 9,277,105, entitled SELF-LEVELING CAMERA HEADS, issued Mar. 1, 2016; U.S. Pat. No. 9,824,433 entitled PIPE INSPECTION SYSTEM CAMERA HEADS, issued on Nov. 21, 2017; U.S. Pat. No. 9,835,564, entitled MULTI-CAMERA PIPE INSPECTION APPARATUS, SYSTEM, AND METHODS, issued Dec. 5, 2017; U.S. Pat. No. 10,288,997, entitled ROTATING CONTACT ASSEMBLIES FOR SELF-LEVELING CAMERA HEADS, issued May 14, 2019; U.S. Pat. No. 10,715,703, entitled SELF-LEVELING CAMERA HEADS, issued Jul. 14, 2020; U.S. Pat. No. 10,848,655, entitled HEAT EXTRACTION ARCHITECTURE FOR COMPACT VIDEO CAMERA HEADS, issued Nov. 24, 2020; U.S. Pat. No. 11,209,115, entitled PIPE INSPECTION AND/OR MAPPING CAMERA HEADS, SYSTEMS, AND METHODS, issued Dec. 28, 2021; and/or other disclosed in the incorporated patents and applications. The content of each of these applications is incorporated by reference herein in its entirety.

The push-cable 2020 may be or share aspects with those disclosed in U.S. Pat. No. 5,939,679, entitled VIDEO PUSH CABLE, issued Aug. 17, 1999; U.S. patent application Ser. No. 14/970,362, entitled COAXIAL VIDEO PUSH-CABLES FOR USE IN INSPECTION SYSTEMS, filed Dec. 15, 2015; U.S. Pat. No. 9,448,376, entitled HIGH BANDWIDTH PUSH-CABLES FOR VIDEO INSPECTION SYSTEMS, issued Sep. 20, 2016; U.S. Pat. No. 9,468,954, entitled PIPE INSPECTION SYSTEM INCLUDING JETTER PUSH-CABLE, issued Oct. 18, 2016; U.S. Pat. No. 10,764,541, entitled COAXIAL VIDEO PUSH-CABLES FOR USE IN INSPECTION SYSTEMS, issued Sep. 1, 2020; and/or other disclosed in the incorporated patents and applications. The content of each of these applications is incorporated by reference herein in its entirety.

Referring to FIG. 20B, the camera head 2010 may include one or more image sensors 2012 and lenses 2014 to capture video and images from the interior of the pipe 2030. The captured video and/or images from the interior of the pipe 2030, an image data 2015, may be communicated via the push-cable 2020 to a cable storage drum 2050 coupled at the proximal end of the push-cable 2020 outside the entry point to the pipe 2030 and then further onto a CCU 2060 for displaying the video/images of the image data 2015 as well as control aspects of the camera head 2010. The CCU 2060 may be or share aspects with those disclosed in U.S. Pat. No. 10,084,945, entitled CABLE STORAGE DRUM WITH MOVEABLE CCU DOCKING APPARATUS, issued Sep. 25, 2018; U.S. patent application Ser. No. 17/190,400, filed Mar. 3, 2021, entitled DOCKABLE CAMERA REEL AND CCU SYSTEM; and/or other disclosed in the incorporated patents and applications. The content of each of these applications is incorporated by reference herein in its entirety. The CCU 2060 illustrated in FIG. 20B may optionally include a transmitter element for coupling current with the push-cable 2020 in generating a signal 2025. Further, a ground stake 2061 may be connected with the CCU 2060 for accepting ground return current. In other embodiments, a separate transmitter device may be included in a system for coupling electrical current onto a push-cable, such as the push-cable, or a pipe, such as the pipe 2030. The transmitter element in the CCU 2060 or other transmitter device that may be used with a system of the present disclosure may be or share aspects with U.S. Pat. No. 7,619,516, issued Nov. 17, 2009, entitled SINGLE AND MULTI-TRACE OMNI-DIRECTIONAL SONDE AND LINE LOCATORS AND TRANSMITTER USED THEREWITH; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTILITY LOCATOR INCLUDING A CAMERA; U.S. patent Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; and/or other disclosed in the incorporated patents and applications. The content of each of these applications is incorporated by reference herein in its entirety.

One or more INS 2041 may determine positions of the camera head 2010 relative to the cable storage drum 2050. The INS 2041 may be or include, but should not be limited to, accelerometers 2042, gyroscopic sensors 2043, and magnetometers 2044 that may measure in three dimensions for generating inertial navigation data 2045. Inertial navigation data, such as the inertial navigation data 2045 of FIG. 20B, may, in various embodiments, be included in a camera head position data 2040. In some embodiments, the INS may include one or more barometers (not illustrated). The inertial navigation data 2045 may be communicated, via the push-cable 2020, to the cable storage drum 2050 coupled at the proximal end of the push-cable 2020 outside the entry point to the pipe 2030.

The camera head 2010, via processing of the image data 2015, may further generate visual motion data 2019 that may also be included in the camera head position data 2040. For instance, adjacent video frames may be compared and, through various tracking and motion estimation algorithms, determine direction and distance for movements of the camera head 2010. In some embodiments, the image data 2012 may include or be used to detect when the camera head 2010. For instance, the image data 2012 may include or be used to detect a change in light values indicative of the camera head 2010 entering the pipe 2030. Likewise, image recognition or like techniques may be used in identifying the entry point of pipes or other cavities included in the image data 2012 or applied to the images of the image data 2012. The visual motion data 2019 may be communicated, via the push-cable 2020, to the cable storage drum 2050 coupled at the proximal end of the push-cable 2020 outside the entry point to the pipe 2030.

Further, the camera head 2010 may include one or more other sensors 2046 for generating other positioning data 2047. For instance, the other sensors 2047 may include, for instance LiDAR, acoustic motion sensors, or the like producing the other positioning data 2047 for tracking movements of the camera head 2010 relative to the cable storage drum 2050. The other positioning data 2047 may be communicated, via the push-cable 2020, to the cable storage drum 2050 coupled at the proximal end of the push-cable 2020 outside the entry point to the pipe 2030.

Referring to FIG. 20B, the cable storage drum 2050 may include a processing element 2059 having one or more processors for processing the inertial navigation data 2045, visual motion data 2019, other positioning data 2047, and push-cable payout data 2055 relative to the position of the cable storage drum 2050 and generating one or more estimated camera head positions 2005. In some embodiments, the estimated camera head position(s) 2005 may inform a user that the camera head 2010 may be at a distance and direction from the cable storage drum 2050, entry point of the pipe 2030 or other cavity, or other reference point.

Figure 21:
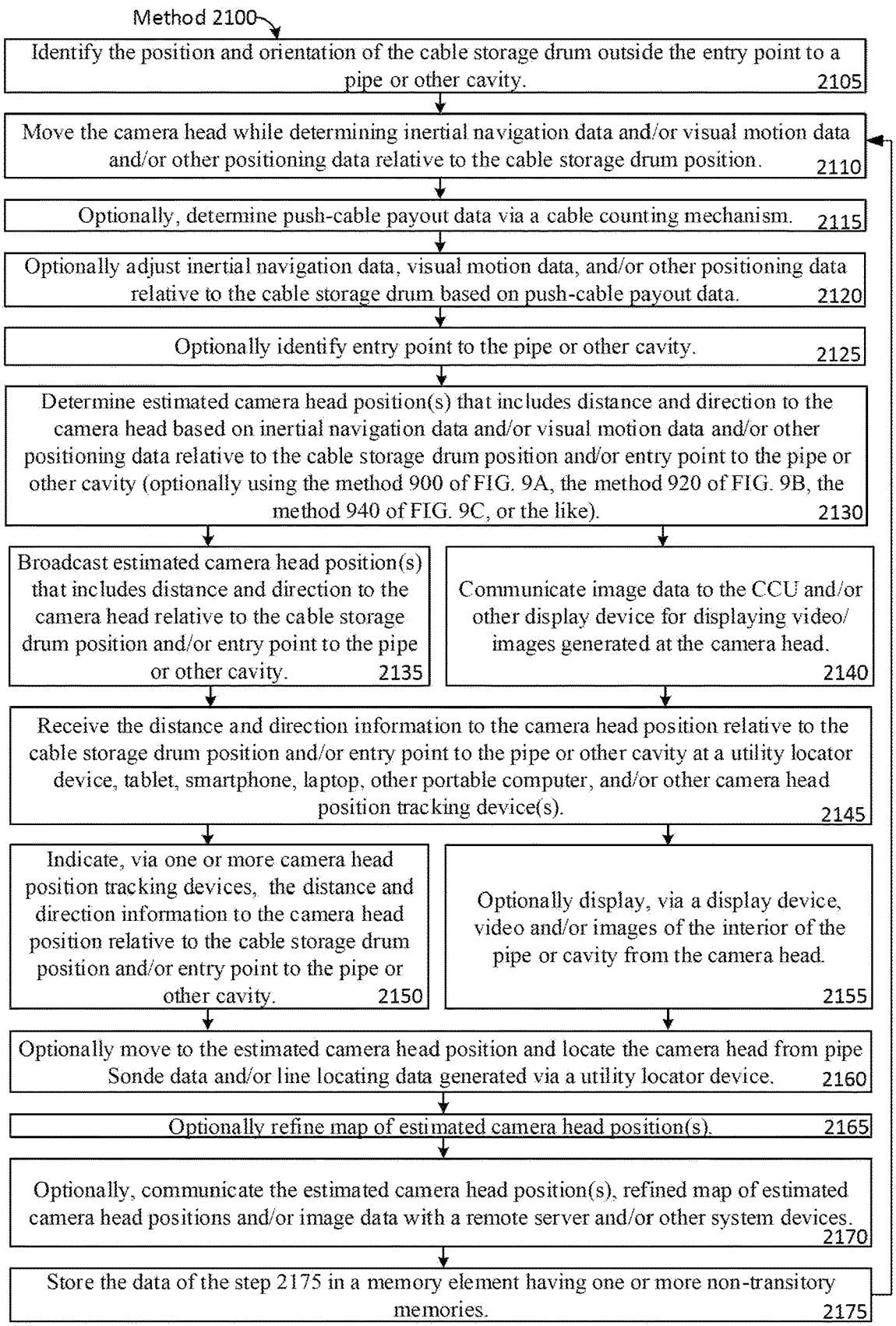
FIG. 21 is a method for generating a map from camera head movements via the video inspection and camera head tracking system.

The one or more estimated camera head position(s) 2005 or, optionally, a singular estimated camera head position result may be generated via the method 2100 of FIG. 21 and/or other methods disclosed herein. The estimated camera head positions 2005 or, optionally, a singular estimated camera head position result may further be broadcasted via a relay module or other radio communication module (e.g., Bluetooth, Wi-Fi, ISM, or the like), such as the relay module 2051. In other embodiments, the CCU 2060, the relay module 2051, and/or other connected device may process the inertial navigation data, visual motion data, other positioning data, and push-cable payout data relative to the position of the cable storage drum via the method 1900 of FIG. 19 prior to broadcasting estimated camera head position(s). The relay module 2041 may be or share aspects with those disclosed in U.S. patent application Ser. No. 17/528,956, filed Nov. 17, 2021, entitled VIDEO INSPECTION SYSTEM APPARATUS AND METHODS WITH RELAY MODULE AND CONNECTION PORTS and/or others disclosed in the incorporated patents and applications. The content of the application is incorporated by reference herein in its entirety. In other embodiments, such a radio communication module may instead or additionally be disposed in the cable storage drum or other connected ground surface device (e.g., such as the CCU 2060).

Still referring to FIG. 20B, it should be noted that the cable storage drum 2050 does not include a GNSS receiver to determine the position of the cable storage drum 2050. In system embodiments lacking GNSS in the cable storage drum, the camera head movement relative to the cable storage drum may be determined and communicated to a user with a utility locator device, smartphone, or other connected device. For instance, in the video inspection and camera head tracking system 2000 the position of the camera head 2010 may be estimated from one or more of the inertial navigation data 2045, visual motion data 2019, or other positioning data 2047 (e.g., LiDAR, acoustic motion sensors, or the like other sensors 2046 producing positioning estimations of the camera head 2010) as well as push-cable payout data 2055 and/or information from a non-GNSS positioning element 2052 in the cable storage drum 2050 (e.g., one or more compass sensors, accelerometers, gyroscopes or like orientation sensors, cameras which may capture images of the entry point of the pipe 2030, or the like) resulting in estimated camera head position(s) 2005 (e.g. via the method 2100 of FIG. 21 or other methods disclosed in the present application). The estimated camera head position(s) 2005 may, in the video inspection and camera head tracking system 2000, be relative to the cable storage drum 2050 or the entry point of the pipe 2030 or other cavity or other reference point in the locate environment. In such embodiments, the cable storage drum 2050 may have a heading 2056 (FIG. 20A) that is known or determined. For instance, the heading 2056 (FIG. 20A) may be cardinal direction based on the orientation of the cable storage drum 2050. In such embodiments, the heading 2056 (FIG. 20A) may likewise be communicated to other system devices. The estimated camera head position(s) 2005 may be in three dimensions such that camera head 2010 may be mapped from the cable storage drum 2050 or the entry point of the pipe 2030 or other cavity or other reference point. Likewise, the estimated camera head position(s) 2005 and/or map of camera head 2010 movements may be communicated to the utility locator device 2080, the smartphone 2070, the cloud server 2099, and/or other system devices not illustrated (e.g., tablets, laptop computers, CCUs, or the like).

The cable storage drum 2050 may further include a battery 2053 or, in alternative embodiments, other power source for supplying electrical current. Optionally, the cable storage drum 2050 may include a cable counting device 2054 for generating a push-cable payout data 2055 that may be a measure the length of push-cable 2020 dispensed into the pipe 2030 or another cavity. The cable counting device 2054 may be or share aspects with those disclosed in U.S. Pat. No. 8,970,211, issued Mar. 3, 2015, entitled PIPE INSPECTION CABLE COUNTER AND OVERLAY MANAGEMENT SYSTEM and/or others disclosed in the incorporated patents and applications. The content of each which is incorporated by reference herein in its entirety. In such embodiments, the push-cable payout data 2055 from the cable counting device 2054 may be used to verify the total length of movements by the inertial navigation data 2045, as disclosed in the method 500 of FIG. 5, and optionally generate a camera head range that may be communicated to a user via a display (e.g., the camera head range 330 of the display 310 illustrated in FIG. 3).

The smartphone 2070 may include a radio communication module 2071 (e.g., via Bluetooth, Wi-Fi, ISM, or the like) for receiving the estimated camera head position(s) 2005 that may be included in the camera head position data 2040. Further, the smartphone 2070 a processing element 2073, having one or more processors, may process the camera head position data 2040 to locate and track the camera head 2010. The camera head position data 2040 may include estimated camera head position(s) 2005 and, as later disclosed herein, a Sonde locating data, determined by the utility locator device 2080 from the signal 2018 emitted by the pipe Sonde 2016, and a line locating data 2026, determined by the utility locator device 2080 from the signal 2025 emitted by the push-cable 2020. The locating, tracking, and mapping of the camera head 2010 may, for instance, use the method 2100 of FIG. 21.

Still referring to FIG. 20B, the smartphone 2070 may further include a memory element 2074 having one or more non-transitory memories that may store the camera head position data 2040. As the smartphone 2070 may have a position known via the GNSS receiver and/or other positioning element 2072. The smartphone 2070 may direct a user towards the position of the camera head 2010 from the camera head position data 2040 and or map data from camera head 2010 movements. For instance, as illustrated in FIG. 20A, the smartphone 2070 may include a display 2075 to visually indicate direction, such as with the visual indicator 2086, towards the camera head 2010 position at the ground surface. In some embodiments, the direction towards the camera head 2010 position may instead or additionally be provided via audio directions, haptic feedback, or the like. The display 2095 of the smartphone 2070 may further include video or images from inside the pipe 2030 such as an inspection video 2087. Turning back to FIG. 20B, the smartphone 2070 may further include a battery 2078 or, in alternative embodiments, other power source for supplying electrical current. Further, the smartphone 2070 may include one or more cameras 2079. In some embodiments, the camera(s) 2079 may capture images and/or video of the inspection location that may further include the position of a cable storage drum relative to the entrance to a pipe or other cavity (e.g., as illustrated in the system 2200 of FIG. 22).

Further illustrated, the smartphone 2070 and/or the relay module 2051 coupled with the cable storage drum 2050 may further be wireless connected with each other as well as a remote server such as a cloud server 2099. The cloud server 2099 may optionally store camera head position data as well as related mapping data for further communication with inspection systems that may be present in the same area in the future as well as other smartphones, tablet computer, laptops, and other devices.

Still referring to FIG. 20B, the system 2000 may include additional camera head position tracking devices such as the utility locator device 2080. The utility locator device 2080 may include a locator element 2081 further having one or more antennas 2082 and a receiver circuitry 2083 which may, for example, include one or more buffers, amplifiers, signal conditioners, analog-to-digital (A/D) converters, multiplexers, and the like to provide filtering functionality, signal conditioning, or the like for outputs to the processing element 2093 and determine the emission location of a signal 2018 emitted by a pipe Sonde 2016 for determining a Sonde locating data 2068. Likewise, the utility locator device 2090 may determine the emission location of a signal 2025 emitted by the push-cable 2020 and/or the pipe 2020 wherein current is coupled thereto. This data may be referred to herein as "line locating data" such as a line locating data 2026 illustrated in FIG. 20B. For instance, the signal 2025 is emitted by the push-cable 2020 wherein the CCU 2060 includes signal transmitter functionality for coupling current with the push-cable 2020 sensed by the utility locator device

2090 in generating the line locating data 2026. In other embodiments, other transmitter devices (e.g., those transmitters of the incorporated patents and applications) may couple a signal onto a pipe or push-cable in generating such line locating data.

Referring to FIG. 20B, the utility locator device 2090 may be or share aspects with those disclosed U.S. Pat. No. 7,332,901, issued Feb. 19, 2008, entitled LOCATOR WITH APPARENT DEPTH INDICATION; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,057,754, issued Jun. 16, 2015, entitled ECONOMICAL MAGNETIC LOCATOR APPARATUS AND METHOD; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 29/692,937, filed May 29, 2019, entitled BURIED OBJECT LOCATOR; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,690,795, issued Jun. 23, 2020, entitled LOCATING DEVICES, SYSTEMS, AND METHODS USING FREQUENCY SUITES FOR UTILITY DETECTION; and U.S. Pat. No. 10,809,408, issued Oct. 20, 2020, entitled DUAL SENSED LOCATING SYSTEMS AND METHODS; and/or others disclosed in the incorporated patents and applications. The content of each of these applications is incorporated by reference herein in its entirety.

The pipe Sonde 2016 may be at a known position inside the camera head 2010 or, in other embodiments, at a known portion relative to the camera head on the push-cable. The pipe Sonde 2016 may be or share aspects with those disclosed in U.S. Pat. No. 7,009,399, issued Mar. 7, 2006, entitled OMNIDIRECTIONAL SONDE AND LINE LOCATOR; U.S. Pat. No. 7,221,136, issued May 22, 2007, entitled SONDES FOR LOCATING UNDERGROUND PIPES AND CONDUITS; U.S. Pat. No. 7,298,126, issued Nov. 20, 2007, entitled SONDES FOR LOCATING UNDERGROUND PIPES AND CONDUITS; U.S. Pat. No. 7,336,078, issued Feb. 26, 2008, entitled MULTI-SENSOR MAPPING OMNIDIRECTIONAL SONDE AND LINE LOCATOR; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,864,980, issued Jan. 4, 2011, entitled SONDES FOR LOCATING UNDERGROUND PIPES AND CONDUITS; U.S. Pat. No. 8,035,390, issued Oct. 11, 2011, entitled OMNIDIRECTIONAL SONDE AND LINE LOCATOR; U.S. patent application Ser. No. 14/027,027, filed Sep. 13, 2013, entitled SONDE DEVICES INCLUDING A SECTIONAL FERRITE CORE STRUCTURE; U.S. Pat. No. 9,411,066, issued Aug. 9, 2016, entitled SONDES & METHODS FOR USE WITH BURIED LINE LOCATOR SYSTEMS; U.S. Pat. No. 9,798,033, issued Oct. 24, 2017, entitled SONDE DEVICES INCLUDING A SECTIONAL FERRITE CORE; U.S. patent application Ser. No. 16/792,047, filed Feb. 14, 2020, entitled SATELLITE AND MAGNETIC FIELD SONDE APPARATUS AND METHODS; U.S. Pat. No. 10,761,233, issued Sep. 1, 2020, entitled SONDES AND METHODS FOR USE WITH BURIED LINE LOCATOR SYSTEMS; and/or others disclosed in the incorporated patents and applications. The content of each of these applications is incorporated by reference herein in its entirety.

In order to locate the camera head 2010, the utility locator device 2080 may be directed toward the estimated camera head position(s) 2005 (e.g., via communicating a distance and direction relative to the cable storage drum 2050, the entry point to the pipe 2030 or other cavity, or other reference point) via a camera head tracking element 2090 including a radio communication module 2091 (e.g., Bluetooth, Wi-Fi, ISM, or the like). A GNSS receiver and/or other positioning element 2092 may be included in determining a geolocation/position for the utility locator device 2080. The other positioning element of the GNSS receiver and/or other positioning element 2092 may, for instance, be or include gyroscopic sensors, accelerometers, magnetometers, other inertial navigation sensors, or the like. For instance, a pose or orientation in three-dimensional space may be determined via inertial navigation sensors in the GNSS receiver and/or other positioning element 2092 for the utility locator device 2080. In some embodiments, the INS may include one or more barometers (not illustrated). In some embodiments, the other positioning element of the GNSS receiver and/or other positioning element 2092 may be or include the apparatus, systems, and methods disclosed in U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,784,837, issued Oct. 10, 2017, entitled OPTICAL GROUND TRACKING APPARATUS, SYSTEMS & METHODS; U.S. patent application Ser. No. 15/811,361, filed Nov. 13, 2017, entitled OPTICAL GROUND-TRACKING APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/936,250, filed Mar. 26, 2018, entitled GROUND TRACKING APPARATUS, SYSTEMS, AND METHODS; U.S. Pat. No. 9,928,613, issued Mar. 27, 2018, entitled GROUND TRACKING APPARATUS, SYSTEMS, AND METHODS; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; and/or other disclosed in the incorporated patents and applications. The content of each of these applications is incorporated by reference herein in its entirety.

Still referring to FIG. 20B, a processing element 2093, having one or more processors, may process the camera head position data 2040 relative to the geolocation/position data of the utility locator device 2080 to locate and track the camera head 2010. As the video inspection and camera head tracking system 2000 includes a multitude of source inputs for the camera head position data 2040, via the method 2100 of FIG. 21.

Referring to FIG. 20B, the utility locator device 2080 may further include a memory element 2094 having one or more non-transitory memories that may store the camera head position data 2040. As the utility locator device 2080 may have a position known via the GNSS receiver and/or other positioning element 2092 and the position of the camera head 2010 may be known via the method 400 of FIG. 4, the method 800 of FIG. 8, the method 1100 of FIG. 11, the method 1900 of FIG. 19, or the method 2100 of FIG. 21, the utility locator device 2080 may direct a user towards the position of the camera head 2010 (e.g., by providing a distance and direction relative to the cable storage drum 2050 and/or the entry point of the pipe 2030 or other cavity). For instance, the utility locator device 2080 may include a display 2095 to visually indicate the distance and direction towards the camera head 2010. For instance, as illustrated in FIG. 20A, the utility locator device 2080 may include a display 2095 to visually indicate direction, such as with the visual indicator 2086, towards the camera head 2010 (e.g., such as the display 1310 of FIG. 13 or the display 1410 of FIG. 14). The display 2095 of the utility locator device 2080 may further include video or images from inside the pipe 2030 such as an inspection video 2087. Turning back to FIG. 20B, the utility locator device 2080 may further provide audio directions via a speaker 2096, and/or haptic feedback via a haptic feedback mechanism 2097. The utility locator device 2080 may further include a battery 2098 or, in alternative embodiments, other power source for supplying electrical current.

Further illustrated, the utility locator device 2080 and/or the relay module 2051 coupled with the cable storage drum 2050 may further be wirelessly connected with each other as well as a remote server such as a cloud server 2099. For instance, the utility locator device 2010 may communicate Sonde locating data 2068 as well as the line locating data 2026 with the tablet 2070 and other camera head position tracking devices lacking the capacity to sense the pipe Sonde 2016 signal 2018 or the signal 2025 emitted by the push-cable 2020. The cloud server 2099 may optionally store camera head position data as well as related mapping data for further communication with inspection systems that may be present in the same area in the future as well as other smartphones, tablet computer, laptops, and other devices.

Turning to FIG. 21, a method 2100 is disclosed for locating and tracking a camera head using a system of the present disclosure. In a step 2105, the method 2100 may include identifying the position and orientation of the cable storage drum outside the entry point to a pipe or other cavity. The step 2105 may be achieved in various ways. In some embodiments, for instance, the step 2105 may include generating photographs or video of the inspection area that includes a cable storage drum relative to the entry point to a pipe or other cavity as disclosed in the system 2200 and of FIG. 22 and the method 2300 of FIG. 23. In other embodiments, the cable storage drum may be placed at a distance and orientation according to a predetermined set up procedure such as that illustrated in the system 2400 and of FIG. 24 and the method 2500 of FIG. 25A. Further still in some embodiments, the step 2105 may include determining or estimating the orientation of a cable storage drum and the distance between the cable storage drum and the entry point to the pipe or other cavity determined sensors as disclosed in the system 2400 and of FIG. 24 and the method 2550 of FIG. 25B.

In a step 2110, the method 2100 may include moving the camera head while determining inertial navigation data and/or visual motion data and/or other positioning data relative to the cable storage drum position. The camera head may be or share aspects with the camera head 2010 of FIGS. 20A and 20B or other camera heads disclosed herein. In an optional step 2115, the method 2100 may include determining push-cable payout data via a cable counting mechanism. For instance, the cable storage drum may be or share aspects with the cable storage drum 2050 of FIGS. 20A and 20B having the cable counting device 2054 (FIG. 20B). In an optional step 2120, the method 2100 may include adjusting inertial navigation data, visual motion data, and/or other positioning data relative to the cable storage drum based on push-cable payout data. In another optional step 2125, the method 2100 may include identifying the entry point to the pipe or other cavity. For instance, the step 2125 may include utilizing image recognition to identify the entry points of pipe or other cavity and/or a predetermined level or change in illumination levels to determine when a camera head has entered. In a step 2130, the method 2100 may include determining estimated camera head position(s) that includes distance and direction to the camera head based on inertial navigation data and/or visual motion data and/or other positioning data relative to the cable storage drum position and/or entry point to the pipe or other cavity. The step 2130 may optionally be refined into a singular estimated camera head position via the method 900 of FIG. 9A, the method 920 of FIG. 9B, the method 940 of FIG. 9C, or other similar method. In a step 2135, the method 2100 may include broadcasting the estimated camera head position(s) that includes distance and direction to the camera head relative to the cable storage drum position and/or entry point to the pipe or other cavity. In a step 2140 simultaneous to the step 2135, the method 2100 may include communicating image data to the CCU and/or other display device for displaying video/images generated at the camera head. In a step 2145 subsequent to the steps 2135 and 2140, the method 2100 may include receiving the distance and direction information to the camera head position relative to the cable storage drum position and/or entry point to the pipe or other cavity at a utility locator device, tablet, smartphone, laptop, other portable computer, and/or other camera head position tracking device(s). In a step 2150, the method 2100 may include indicating, via one or more camera head position tracking devices, the distance and direction information to the camera head position relative to the cable storage drum position and/or entry point to the pipe or other cavity. In an optional step 2155 subsequent with the step 2150, the method 2100 may include displaying, via a display device, video and/or images of the interior of the pipe or cavity from the camera head. In another optional step 2160 subsequent to the steps 2150 and 2155, the method 2100 may include moving to the estimated camera head position and locating the camera head from pipe Sonde data and/or line locating data generated via a utility locator device. In another optional step 2165, the method 2100 may include refining the map of estimated camera head position(s). For instance, each movement of the camera head may be tracked resulting in a map of the movements of the camera head such as the camera head position map 1720 of FIG. 17.

Referring to FIG. 21, the method 2100 may further include another optional step 2170 communicating the estimated camera head position(s), refined map of estimated camera head positions and/or image data with a remote server and/or other system devices. In a step 2175, the method 2100 may include storing the data of the step 2175 in a memory element having one or more non-transitory memories. The method 2100 may repeat back at the step 2110 where the camera head may again be moved determining inertial navigation data and/or visual motion data and/or other positioning data relative to the cable storage drum position.

In some embodiments that do not include GNSS for determining positions, positioning information may likewise come from other sources. For instance, in some embodiments one or more devices may generate video or still images of the inspection environment that may include the orientation and position of a cable storage drum relative to the entry point to the pipe or other cavity.

Figure 22:
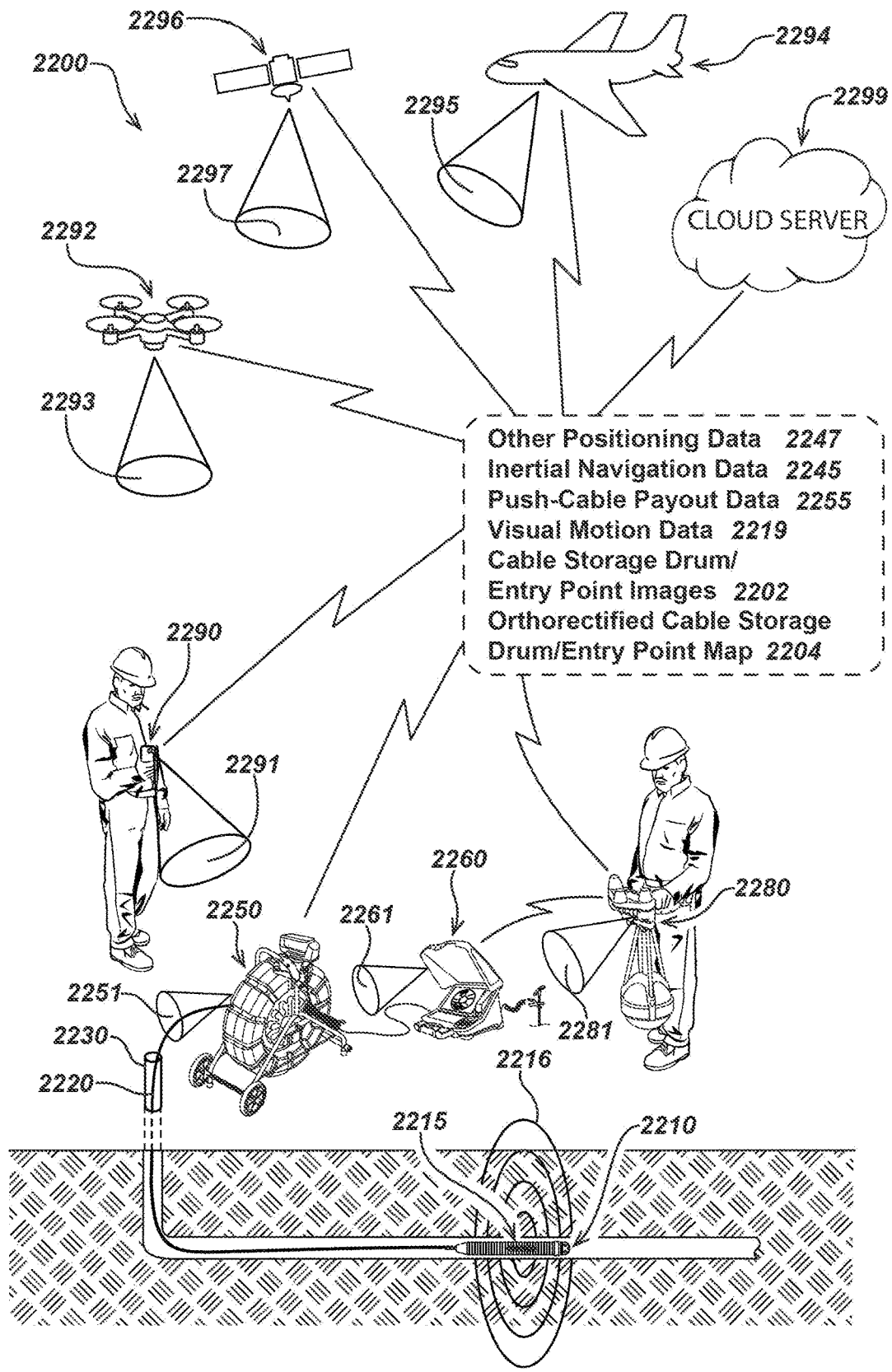
FIG. 22 is an illustration of another video inspection and camera head tracking system for use in pipe or other cavities having a cable storage drum.

Turning to FIG. 22, video or still images of the inspection environment may be generated by a variety of devices. As illustrated, a pipe inspection system 2200 is illustrated which may be or share aspects with the pipe inspection system 2000 of FIGS. 20A and 20B that may be used in inspecting inside of pipes and other cavities while simultaneously mapping the positions in three dimensions of a camera head 2210 as it is moved through a pipe 2230 or another cavity. The pipe inspection system 2200 may include a pipe Sonde 2215 positioned relative to the camera head 2210 both coupled at a distal end of the push-cable 2220. The camera head 2210 may be or share aspects with the camera head 2010 of FIGS. 20A and 21B having one or more systems and sensors for tracking positions of the camera head 2210 relative to a cable storage drum 2250 and/or the entry point of the pipe 2230 (e.g., via inertial navigation data, visual motion data, other positioning data, and/or push-cable payout data relative to the position of the cable storage drum). The cable storage drum 2250, positioned at or near an entry point to the pipe 2230 or other cavity, may couple with the proximal end of the push-cable 2220. The cable storage drum 2250 may store the push-cable 2220 while not in use and further dispense the push-cable 2220 into the pipe 2230 for deploying the camera head 2210 for inspection. The cable storage drum 2250 may be or share aspects with the cable storage drum 2050 of FIGS. 20A and 20B. Image data including video and still frames from inside the pipe 2230 or other cavity, may be generated by the camera head 2210 and be communicated via the push-cable 2220 to the cable storage drum 2250 and further onto a CCU 2260. The CCU 2260, coupled via a wired connection to the cable storage drum 2250, may display the video and/or images generated by the camera head 2210 as well as control aspects relating to the function of the camera head 2210 (e.g., controlling lights, focus, or the like). Such images and/or camera head 2210 control may instead or likewise be displayed and controlled remotely via one or more wireless coupled system devices. A utility locator device 2280, having one or more antennas and associated receiver circuitry (e.g., one or more buffers, amplifiers, signal conditioners, analog-to-digital (A/D) converters, multiplexers, and the like to provide filtering functionality, signal conditioning, or the like) may receive a signal 2216 emitted by the pipe Sonde 2215 and determine the emission location of the signal 2216 at the ground surface. In order to direct a user 2285 to a ground surface location nearest the signal 2216 and thereby the pipe Sonde 2215 and the camera head 2210, an estimated camera head 2210 position may be determined (via inertial navigation data, visual motion data, other positioning data, and/or push-cable payout data relative to the position of the cable storage drum) and communicated to the utility locator device 2280 and/or other system devices (e.g., a smartphone 2290, laptop or tablet computers, or the like). Such an estimated camera head 2210 position may be reliant on a known reference point such as that of the cable storage drum 2250 or the entry point of the pipe 2230 or other cavity. In the pipe inspection system 2200, for instance, image or video of the inspection environment that includes position and orientation of the cable storage drum 2250, the entry point to the pipe 2230, and/or other reference point may be generated via one or more system devices. As illustrated, one or more devices may generate such images or video. For instance, the utility locator device 2280 may generate one or more videos/photographs 2281, the cable storage drum 2250 may generate one or more videos/photographs 2251, and/or the CCU 2260 may generate one or more videos/photographs 2261 via one or more included cameras that includes the position and orientation of the cable storage drum 2250, the entry point to the pipe 2230, and/or other reference point. Further, such video or images may be generated by other system devices such as a smartphone 2290 generating one or more video/photographs 2291 and/or aerial images and video from a drone 2292 generating one or more video/photographs 2293 or aircraft 2294 generating one or more video/photographs 2295 and/or satellite images and video from one or more satellites 2296 generating one or more video/photographs 2297 and/or other devices not illustrated. Optionally, images and video of the inspection environment may be orthorectified to pre-existing maps of the area.

Still referring to FIG. 22, various data may be communicated with the different system devices. For instance, one or more of inertial navigation data 2245, visual motion data 2219, push-cable payout data 2255, and other positioning data 2247 may be communicated with the different system devices (e.g., between the utility locator device 2280, the smartphone 2290, the cable storage drum 2250, the CCU 2260, the drone 2292, the aircraft 2294, the satellite 2296, and/or the cloud server 2299). Likewise, the various system devices may share one or more cable storage drum/entry point images 2202 and/or orthorectified cable storage drum/entry point maps 2204.

Turning to FIG. 23, a method 2300 is disclosed to identify the position and orientation of the cable storage drum outside the entry point to a pipe or other cavity. In a step 2305, the method 2300 may include placing the cable storage drum outside the entry point to a pipe or other cavity. In a step 2310, the method may include using one or more devices to generate images and/or video of the inspection environment including the cable storage drum and entry point to the pipe or other cavity. For instance, as illustrated in FIG. 22, the utility locator device 2280 generating the videos/photographs 2281, the cable storage drum 2250 generating the videos/photographs 2251, and/or the CCU 2260 generating the videos/photographs 2281, the smartphone 2290 generating one or more video/photographs 2291 and/or aerial images and video from a drone 2292 generating one or more video/photographs 2293 or aircraft 2294 generating one or more video/photographs 2295, and/or one or more satellites 2296 generating one or more video/photographs 2297. Back to FIG. 23, the method 2300 may include an optional step 2315 orthorectifying images of the inspection environment with pre-existing maps containing the inspection environment and the inspection environment including the cable storage drum and entry point to the pipe or other cavity.

In other embodiments that do not include GNSS for determining positions, positioning information may likewise come from other sources. For instance, in some embodiments a set up procedure may be established where a user may be required to arrange the cable storage drum at a known distance and orientation relative to the entry point to the pipe or other cavity. Likewise, in some embodiments the distance and direction from a cable storage drum may be measured or estimated.

Figure 24:
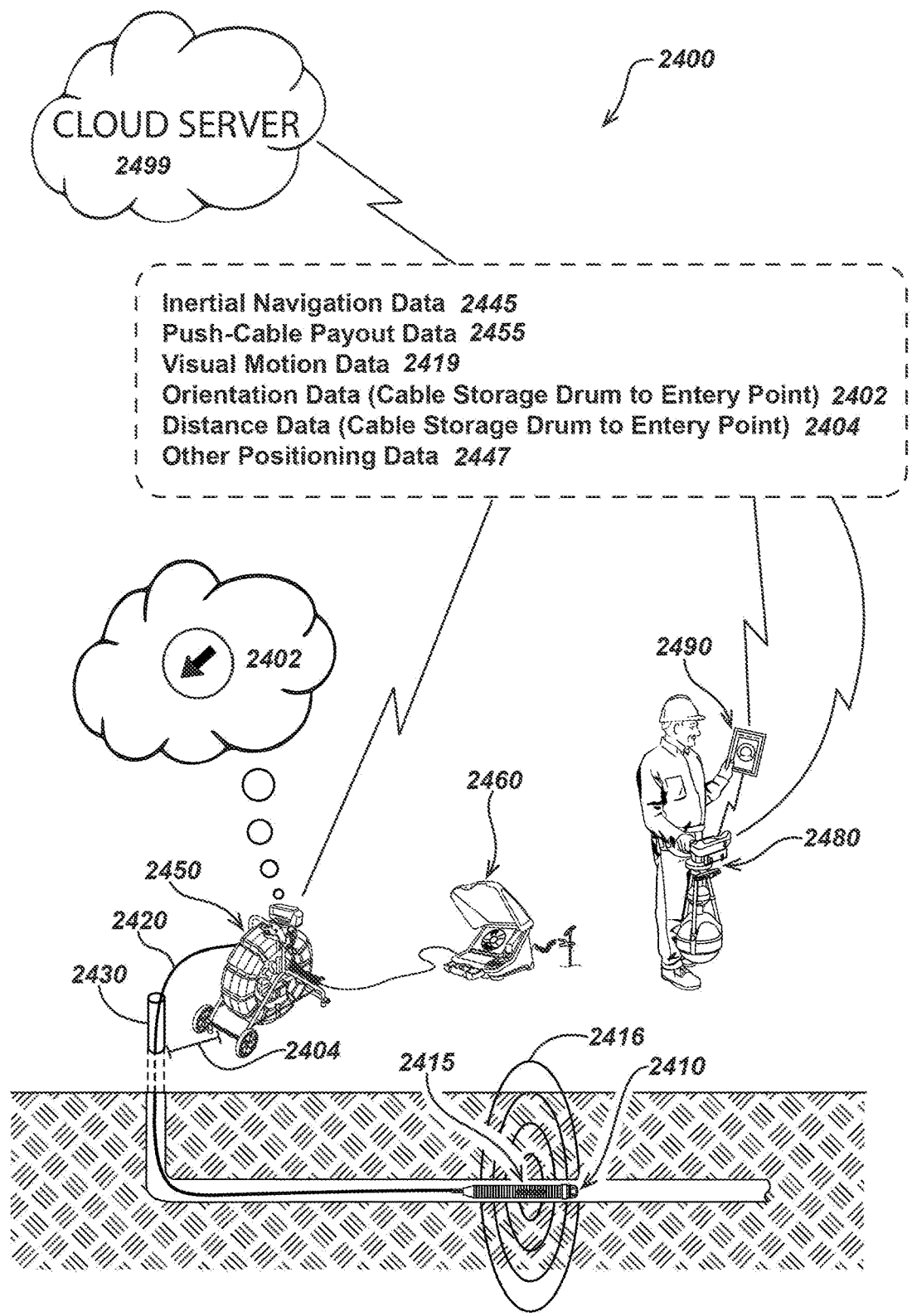
FIG. 24 is an illustration of another video inspection and camera head tracking system for use in pipe or other cavities having a cable storage drum.

Turning to FIG. 24, a pipe inspection system 2400 is illustrated which may be or share aspects with the pipe inspection system 2000 of FIGS. 20A and 20B that may be used in inspecting the inside of pipes and other cavities while simultaneously mapping the positions in three dimensions of a camera head 2410 as it is moved through a pipe 2430 or another cavity. The pipe inspection system 2400 may include a pipe Sonde 2415 positioned relative to the camera head 2410 both coupled at a distal end of the push-cable 2420. The camera head 2410 may be or share aspects with the camera head 2010 of FIGS. 20A and 21B having one or more systems and sensors for tracking positions of the camera head 2410 relative to a cable storage drum 2450 and/or the entry point of the pipe 2430 (e.g., via inertial navigation data, visual motion data, other positioning data, and/or push-cable payout data relative to the position of the cable storage drum). The cable storage drum 2450 may couple with the proximal end of the push-cable 2420 and may be positioned at or near an entry point to the pipe 2430 or another cavity. For instance, orientation data 2402 and distance data 2404 may be known as being part of a set up procedure or estimated/determined by the user or apparatus and sensors present in the system devices (e.g., in the cable storage drum 2450, compass sensors to determine orientation and LiDAR or rangefinders to measure the distance between the cable storage drum 2450 and the entry point to the pipe 2430). The cable storage drum 2450 may store the push-cable 2220 while not in use and further dispense the push-cable 2420 into the pipe 2430 for deploying the camera head 2410 for inspection. The cable storage drum 2450 may be or share aspects with the cable storage drum 2050 of FIGS. 20A and 20B. Image data including video and still frames from inside the pipe 2430 or other cavity, may be generated by the camera head 2410 and be communicated via the push-cable 2420 to the cable storage drum 2450 and further onto a CCU 2460. The CCU 2460, coupled via a wired connection to the cable storage drum 2450, may display the video and/or images generated by the camera head 4210 as well as control aspects relating to the function of the camera head 2410 (e.g., controlling lights, focus, or the like). Such images and/or camera head 2410 control may instead or likewise be displayed and controlled remotely via one or more wireless coupled system devices. A utility locator device 2480, having one or more antennas and associated receiver circuitry (e.g., one or more buffers, amplifiers, signal conditioners, analog-to-digital (A/D) converters, multiplexers, and the like to provide filtering functionality, signal conditioning, or the like) may receive a signal 2416 emitted by the pipe Sonde 2415 and determine the emission location of the signal 2416 at the ground surface. In order to direct a user 2485 to a ground surface location nearest the signal 2416 and thereby the pipe Sonde 2415 and the camera head 2410, an estimated camera head 2410 position may be determined (via inertial navigation data, visual motion data, other positioning data, and/or push-cable payout data relative to the position of the cable storage drum) and communicated to the utility locator device 2480 and/or other system devices (e.g., a tablet 2490, smartphone or tablet computers, or the like). Such an estimated camera head 2410 position may be reliant on a known reference point such as that of the cable storage drum 2450 or the entry point of the pipe 2430 or other cavity. In some such embodiments, for instance, the orientation 2403 and the distance data 2404 may be predetermined and arranged through set up procedures. In other embodiments, the cable storage drum 2450 may include one or more compass sensors to determine the orientation data 2403 and one or more LiDAR or rangefinders to measure the distance data 2404.

Still referring to FIG. 24, various data may be communicated with the different system devices. For instance, one or more of inertial navigation data 2445, visual motion data 2419, push-cable payout data 2455, and other positioning data 2447 may be communicated with the different system devices (e.g., between the utility locator device 2480, the tablet 2490, the cable storage drum 2450, the CCU 2460, and the like). Likewise, the various system devices may share the orientation data 2402 and distance data 2404 between the cable storage drum 2450 and the entry point to the pipe 2430 or another cavity.

Turning to FIG. 25A, a method 2500 is disclosed to identify the position and orientation of the cable storage drum outside the entry point to a pipe or other cavity. In a step 2505, the method 2500 may include placing the cable storage drum outside at the entry point to a pipe or other cavity. In a step 2510, the method 2500 may include adjusting the orientation and position of the cable storage drum to conform to the predetermined set up procedure parameter.

Turning to FIG. 25B, a method 2550 is disclosed to identify the position and orientation of the cable storage drum outside the entry point to a pipe or other cavity. In a step 2555 the method 2550 may include placing the cable storage drum outside at the entry point to a pipe or other cavity. In a step 2560, the method 2550 may include placing the cable storage drum outside at the entry point to a pipe or other cavity. In a step 2560, the method 2550 may include generating the orientation data and distance data by measuring or estimating the orientation of the cable storage drum relative to the entry point to a pipe or other cavity and the distance to the entry point to a pipe or other cavity. The step 2560 may include a cable storage drum that may include one or more compass sensors to determine the orientation data and one or more LiDAR or rangefinders to measure the distance data. In a step 2565, the method 2550 may include communicating orientation and distance data into the cable storage drum, CCU, or other system device.

Figure 26:
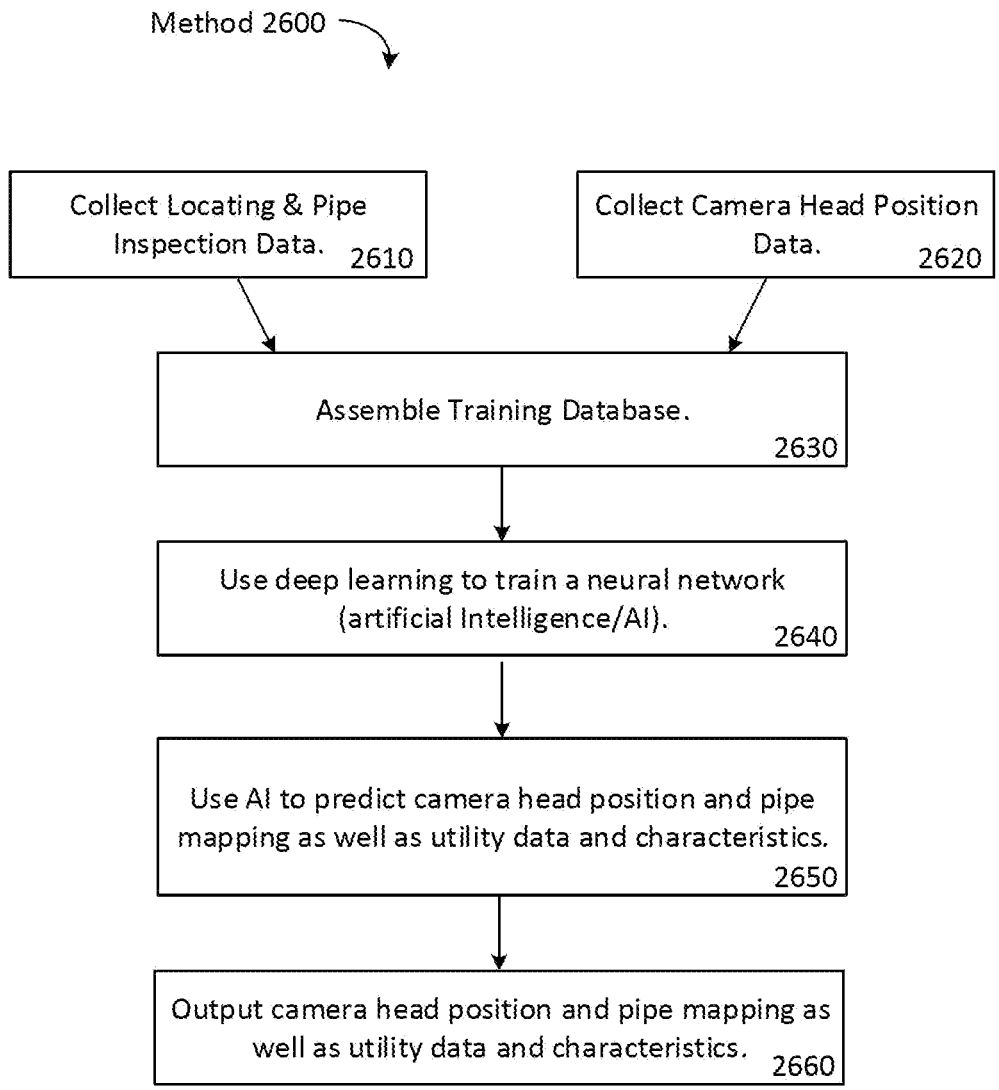
FIG. 26 is a method of providing Training Data the includes Locating and Pipe Inspection Data and Camera Head Position Data to a Neural Network to use Deep Learning/artificial intelligence to recognize patterns and make predictions related camera head positions, pipe mapping, and utility data and characteristics.

Turning to FIG. 26, a method 2600 is disclosed for providing Locating and Pipe Inspection Data and Camera Head Position Data to a Neural Network and using Deep Learning/artificial intelligence (AI) to recognize patterns and make predictions related to camera head positions, pipe mapping, and utility data and characteristics. The method 2600 may include a step 2610 collecting Locating and Pipe Inspection Data describing the positions and depths of utility lines in the ground from electromagnetic signals via a utility locator device as well as images and video generated via a pipe inspection camera. The Locating and Pipe Inspection Data may include but should not be limited to utility line positions, utility line depths, maps of the utility locating environment including utility line positions and depths, and/or identification information regarding utility line types as well as images and video and related data from a pipe inspection camera. For instance, the step 2610 may include the Locating and Pipe Inspection Data 2710 of FIG. 27A. In another step 2620, the method 2600 may include collecting Camera Head Position Data from various sensors and apparatus describing movements of a camera head. The Camera Head Position Data may include but should not be limited to pipe Sonde data, visual motion data, INS data, and other data related to movement and positions or mapping of camera heads. For instance, the step 2620 may include the Camera Head Position Data 2720 of FIG. 27B. In another step 2630, the method 2600 may include assembling a Training Database that includes Locating and Pipe Inspection Data and Camera Head Position Data. In another step 2640, the method 2600 may include using deep learning to train a Neural Network (Artificial Intelligence/AI) via the Training Database Data. In a step 2650, the method may include generating predictions regarding to camera head positions, pipe mapping, and utility data and characteristics via AI. In another step 2660, the method 2600 may include outputting predictions regarding the camera head positions, pipe mapping, and utility data and characteristics.

Figure 27A:
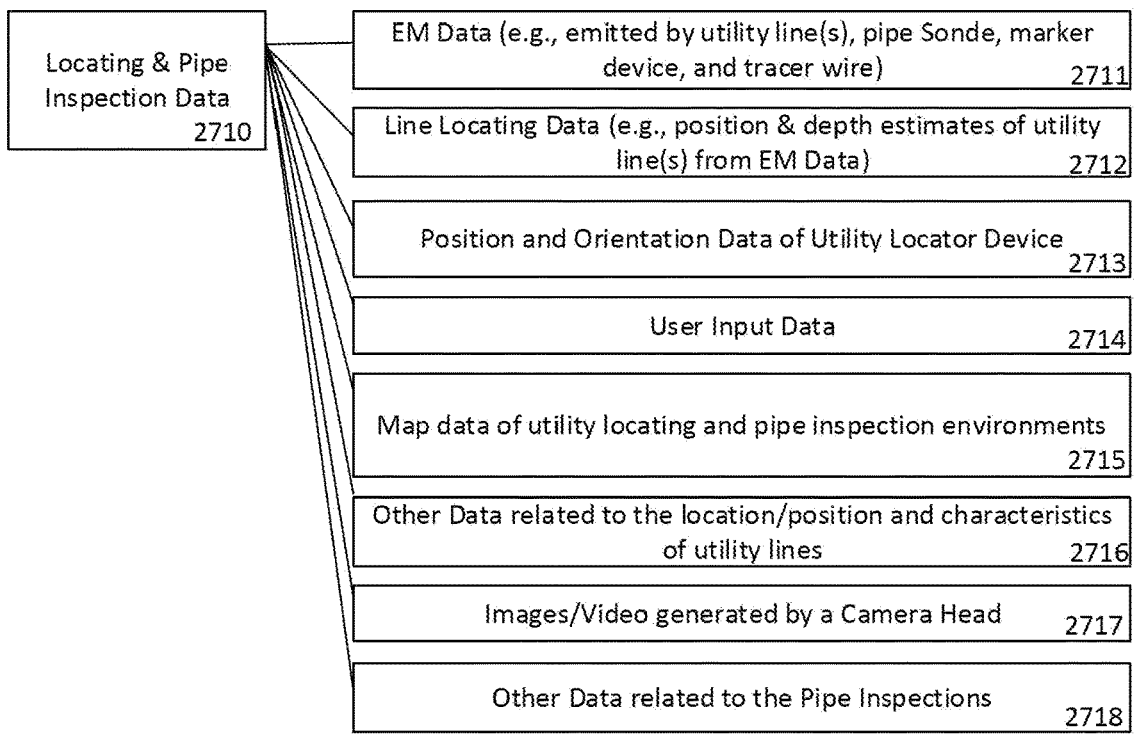
FIG. 27A is a diagram of example sources of Locating and Pipe Inspection Data that may be used to train Neural Networks.

Turning to FIG. 27A, Locating and Pipe Inspection Data 2710 is illustrated showing a plurality of example sources of data that may be used to train Neural Networks. As illustrated, the Locating and Pipe Inspection Data 2710 may include, but should not be limited to, EM Data (e.g., emitted by utility line(s), pipe Sonde, marker device, and tracer wire) 2711, Line Locating Data (e.g., position and depth estimates of utility lines from EM Data) 2712, Position and Orientation Data of the utility locator device 2713 (e.g., geolocations in the world coordinate system as determined via the GNSS Receiver/Other Positioning Element 292 of FIG. 2B, the GNSS Receiver/Other Positioning Element 792 of FIG. 7, the GNSS Receiver/Other Positioning Element 1072 of FIG. 10B, the GNSS Receiver/Other Positioning Element 1592 of FIG. 15B, GNSS Receiver/Other Positioning Element 1892 of FIG. 18B, and/or other sensors and systems for determining position and pose/orientation), user input data 2714 (e.g., position of the entry point of the pipe inspection camera head and/or other information related to utility lines, pipe inspection, mapping, or the like), Map Data covering the utility locating and pipe inspection environment 2715 (e.g., digital or other maps that include the area or areas scanned in a locating and pipe inspection operations), and/or other data related to the location/position and characteristics of utility lines 2716. Further, the Locating and Pipe Inspection Data 2710 may include images and video generated by the pipe inspection camera at the camera head 2717 and other related data from the pipe inspection 2718.

Figure 27B:
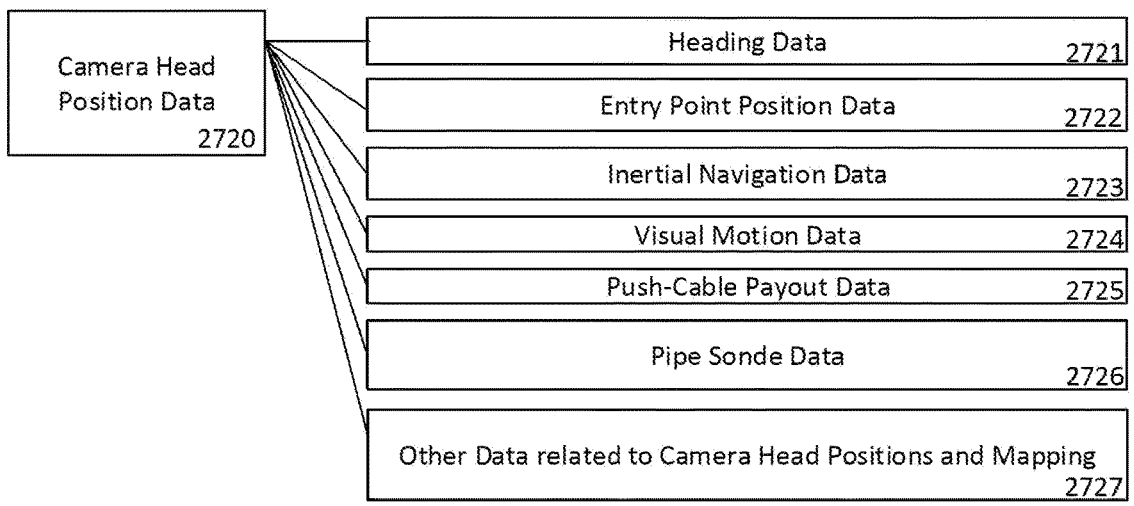
FIG. 27B is a diagram of example sources of Camera Head Position Data that may be used to train Neural Networks.

Turning to FIG. 27B, Camera Head Position Data 2720 is illustrated showing a plurality of example sources of data that may be used to train Neural Networks. As illustrated, the Camera Head Position Data 2720 may include, but should not be limited to Heading Data 2721 (e.g., data related to the position and orientation of a cable storage drum relative to the entry point of a camera head), Entry Point Position Data 2722 (e.g., GNSS or other world coordinate or other descriptor of the position an entry point such as the entry point images 2202 and the orthorectified cable storage drum/entry point map 2204 of FIG. 22), Inertial Navigation Data 2723 (e.g., the inertial navigation data 245 of FIGS. 2A and 2B, the inertial navigation data 745 of FIGS. 7A and 7B, the inertial navigation data 1045 of FIGS. 10A and 10B, the inertial navigation data 1545 of FIGS. 15A and 15B, the inertial navigation data 1845 of FIG. 18B, the inertial navigation data 2045 of FIG. 20B, the inertial navigation data 2245 of FIG. 22, the inertial navigation data 2445 of FIG. 24, and the like), Visual Motion data 2724 (e.g., the visual motion data 719 of FIGS. 7A and 7B, the visual motion data 1019 of FIGS. 10A and 10B, the visual motion data 1519 of FIGS. 15A and 15B, the visual motion data 1819 of FIG. 18B, visual motion data 2019 of FIG. 20B, the visual motion data 2219 of FIG. 22, the visual motion data 2419 of FIG. 24, and the like), Push-Cable Payout Data 2725 (e.g., the push-cable payout data 255 of FIGS. 2A and 2B, the push-cable payout data 755 of FIGS. 7A and 7B, the push-cable payout data 1055 of FIGS. 10A and 10B, the push-cable payout data 1555 of FIGS. 15A and 15B, the push-cable payout data 1885 of FIG. 18B, the push-cable payout data 2055 of FIG. 20B, the push-cable payout data 2255 of FIG. 22, the push-cable payout data 2455 of FIG. 24, and the like), Pipe Sonde Data 2726 (e.g., the Sonde locating data 268 of FIGS. 2A and 2B, the Sonde locating data 268 of FIGS. 6A and 6B, the Sonde locating data 768 of FIGS. 7A and 7B, the Sonde locating data 1068 of FIG. 10B, the Sonde locating data 1868 of FIG. 18B, the Sonde locating data 2068 of FIG. 20B, and the like), and Other Data relating to Camera Head Positions and Mapping 2727.

In one or more exemplary embodiments, the electronic features and functions described herein and associated with the positioning devices, systems, and methods may be implemented in hardware, software, firmware, or any combination thereof. If implemented in software, the functions may be stored on or encoded as one or more instructions or code on a computer-readable medium. Computer-readable medium includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, solid state drives (SSD), USB flash drives or other similar portable devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable medium. As used herein, computer program products comprising computer-readable media include all forms of computer-readable media except to the extent that such media is deemed to be non-statutory, transitory propagating signals.

Those of skill in the art would understand that information and signals, such input/output signals or data, and/or other signals/other data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled artisans may implement the described functionality in varying ways for each particular application, but such implementation decisions should not be interpreted as causing a departure from the scope of the present disclosure.

The various illustrative functions and circuits described in connection with the embodiments disclosed herein may be implemented or performed in a processing element with a general purpose processor, a digital signal processor (DSP), an application specific integrated circuit (ASIC), a field programmable gate array (FPGA) or other programmable logic device, discrete gate or transistor logic, discrete hardware components, memory devices, and/or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one aspect, the aforementioned means may be a module comprising a processing element including a processor or processors, associated memory and/or other electronics in which embodiments of the invention reside, such as to implement signal reception, signal processing, switching, signal transmission, or other functions to process and/or condition transmitter outputs, locator inputs, filter received signals, and/or provide other electronic functions described herein. These may be, for example, modules or apparatus residing in buried object integrated locators, marker devices, marker device marker excitation devices or receiver devices, and/or other related equipment, devices, or systems. Processing elements, as used herein, may also include networked computers or computing systems, cloud-based computing, machine learning, and Artificial Intelligence (AI) systems. It is foreseeable that other processing systems, methods, and devices not listed here could be used by one of ordinary skill in the art to accomplish processing, computing, and memory tasks and functions.

The features described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known or developed in the art. An exemplary storage medium is coupled to the processor such that the processor can read information from, and write information to, the storage medium. In the alternative, the storage medium may be integral to the processor.

The scope of the present disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the scope of the present disclosure is not intended to be limited to the aspects shown herein but is to be accorded the widest scope consistent with the appended claims and their equivalents.

We claim:

1. A video inspection and camera head tracking system for use in a pipe or other cavity, comprising:
a push-cable;
a cable storage drum at a known geolocation/position outside an entry point to a pipe, wherein the cable storage drum stores and dispenses the push-cable;
a camera head having one or more image sensors for generating image data, wherein the camera head is coupled at a distal end of the push-cable;
one or more camera head position elements to determine the position of the camera head relative to the cable storage drum position;
a radio communication module coupled with the cable storage drum, wherein the radio communication module wirelessly communicates the camera head position data from the camera head position element(s) to one or more camera head position tracking devices;
a camera head position tracking device for determining a position of the camera head, wherein the camera head position tracking device communicates the camera head position to a user; and
a display device to receive the image data and display the video and still images from the interior of the pipe or cavity.

2. The system of claim 1, further including a pipe Sonde in or near the camera head for emitting a dipole electromagnetic signal detectable at the ground surface.

3. The system of claim 1, wherein the camera head position tracking device is or includes a utility locator device having one or more antennas and associated receiver circuitry for receiving electromagnetic signals emitted a pipe Sonde and determine the position of the pipe Sonde in the ground.

4. The system of claim 1, wherein the camera head position tracking device and display device are the same device.

5. The system of claim 1, wherein the geolocation/position of the cable storage drum is determined by user input.

6. The system of claim 1, wherein the geolocation/position of the cable storage drum is determined by one or more global navigation satellite systems (GNSS) receivers.

7. The system of claim 1, including one or more cameras in various system devices to generate images for determining the position and orientation of the cable storage drum relative to the entry point of a pipe or other cavity.

8. The method of claim 1, including one or more sensors and apparatus in measuring the position and orientation of the cable storage drum relative to the entry point of a pipe or other cavity.

9. The method of claim 1, wherein the geolocation/position of the cable storage drum relative to the entry point of a pipe or other cavity is predetermine in a set up procedure.

10. The system of claim 1, wherein the display device includes a camera control unit (CCU).

11. The system of claim 1, wherein the display device includes a laptop computer, tablet, smartphone, or other portable computing device.

12. The system of claim 1, wherein the display device is a utility locator device.

13. The system of claim 1, further including a cable counting device in the cable storage drum for measuring the length of push-cable dispensed.

14. The system of claim 1, wherein the camera head position tracking device includes a graphical user interface (GUI) for graphically representing the position of the camera head.

15. The system of claim 1, wherein the camera head position tracking device includes a speaker for audio directions guiding the user to the camera head.

16. The system of claim 1, wherein the camera head position tracking device includes a haptic feedback mechanism for haptic feedback guiding the user to the camera head.

17. The system of claim 1, further including a remote server to store camera head positions and associated inspection video.

18. The system of claim 1, wherein the radio communication module includes Bluetooth, Wi-Fi, ISM, or other radio technology.

19. The system of claim 1, further including one or more inertial navigation system (INS) sensors in the camera head for determining movements of the camera head.

20. The system of claim 19, wherein INS includes one or more three axis accelerometers, gyroscopic sensors, magnetometers, or other inertial navigation sensors.

21. The system of claim 19, wherein the INS sensors includes a barometer.

22. The system of claim 1, wherein motion estimation algorithms calculate the camera head movements from adjacent video frames in the image data.

23. The system of claim 1, further including LiDAR, acoustic motion sensors, or other sensors for tracking movements of the camera head.

* * * * *